(12) United States Patent
Kondo et al.

(10) Patent No.: US 7,822,120 B2
(45) Date of Patent: Oct. 26, 2010

(54) MOVING PICTURE ENCODING METHOD, MOVING PICTURE DECODING METHOD, AND RECORDING MEDIUM

(75) Inventors: Satoshi Kondo, Yawata (JP); Shinya Kadono, Nishinomiya (JP); Makoto Hagai, Moriguchi (JP); Kiyofumi Abe, Kadoma (JP)

(73) Assignee: Panasonic Corporation, Osaka (JP)

( * ) Notice: Subject to any disclaimer, the term of this patent is extended or adjusted under 35 U.S.C. 154(b) by 1201 days.

(21) Appl. No.: 10/490,366

(22) PCT Filed: Jun. 17, 2003

(86) PCT No.: PCT/JP03/07640

§ 371 (c)(1),
(2), (4) Date: Mar. 23, 2004

(87) PCT Pub. No.: WO2004/012459

PCT Pub. Date: Feb. 5, 2004

(65) Prior Publication Data

US 2004/0264570 A1    Dec. 30, 2004

(30) Foreign Application Priority Data

| Jul. 26, 2002 | (JP) | ............................... 2002-218001 |
| Aug. 7, 2002 | (JP) | ............................... 2002-229487 |
| Oct. 2, 2002 | (JP) | ............................... 2002-289421 |
| Oct. 18, 2002 | (JP) | ............................... 2002-305143 |

(51) Int. Cl.
*H04N 7/12* (2006.01)
*H04N 11/02* (2006.01)
*H04N 11/04* (2006.01)

(52) U.S. Cl. ........................... 375/240.16; 375/240.12; 375/240.15

(58) Field of Classification Search ............ 375/240.12, 375/240.15, 240.16, 240.17
See application file for complete search history.

(56) References Cited

U.S. PATENT DOCUMENTS 5,093,720 A * 3/1992 Krause et al. ............... 348/452

FOREIGN PATENT DOCUMENTS

| JP | 11-75191 | 3/1999 |
| JP | 2001-177836 | 6/2001 |
| JP | 2002-165109 | 6/2002 |

OTHER PUBLICATIONS

H.26L Test Model Long Term No. 6(TML-6) draft 0. [Online], ITU-Telecommunications Standardization Sector Study Group 16 Video Coding Experts Group (VCEG), 2001. [retrieved on May 28, 2003], pp. 28-33.

*Primary Examiner*—Andy S Rao
*Assistant Examiner*—Chikaodili E Anyikire
(74) *Attorney, Agent, or Firm*—Wenderoth, Lind & Ponack, L.L.P.

(57) ABSTRACT

In coding a picture to be used as a reference picture by another picture, a motion vector used in inter picture predictive coding is stored into the motion vector storage unit (116). However, the storage of a motion vector is controlled by the coding control unit (110) in such a way that motion vectors of pictures, fewer in number than the number of reference pictures, are stored into the storage unit (116). In the case where direct mode is used in coding a B-picture, if the motion vector to be referred to in coding in direct mode is stored in the motion vector storage unit (116), coding is performed using such motion vector. Further, in the case where the motion vector is not stored in the storage unit (116), coding is performed with the motion vector as "0", and using a motion vector of a neighboring block.

19 Claims, 29 Drawing Sheets

U.S. PATENT DOCUMENTS

| | | | | | |
|---|---|---|---|---|---|
| 5,164,828 | A | * | 11/1992 | Tahara et al. | 375/240.13 |
| 5,400,087 | A | * | 3/1995 | Uramoto et al. | 348/699 |
| 5,638,127 | A | * | 6/1997 | Murakami et al. | 348/412.1 |
| 5,973,743 | A | * | 10/1999 | Han | 375/240.13 |
| 6,122,319 | A | * | 9/2000 | Lee et al. | 375/240.16 |
| 6,456,660 | B1 | * | 9/2002 | Yokoyama | 375/240.16 |
| 2003/0099294 | A1 | * | 5/2003 | Wang et al. | 375/240.15 |
| 2004/0190614 | A1 | * | 9/2004 | Schlockermann et al. | 375/240.12 |

OTHER PUBLICATIONS

MPEG -4, Sep. 30, 1998, pp. 44-49.

S. Kadono, S. Kondo, and K. Abe, entitled "*Error Robustness Memory Management Control Operation*", ISO/IEC JTC1/SC29/WG11 and ITU-T SG16 Q.6, JVT-D031, Jul. 22, 2002, pp. 1-7, XP002354616.

Satoshi Kondo et al., entitled "*Proposal of Minor Changes to Multi-Frame Buffering Syntax for Improving Coding Efficiency of B-Pictures*", ISO/IEC JTC1/SC29/WG11 and ITU-T Sg16 Q.6, JVT-B057, Jan. 29, 2002, pp. 1-10, XP002249662.

H. Kimata, entitled "*GMVC and GMC Switched by MV*", ISO/IEC JTC1/SC29/WG11 and ITU-T SG16 Q.6, JVT$_{13}$ B046, Jan. 29, 2002, pp. 1-2, XP002354617.

A. M. Tourapis et al., entitled "*Direct Prediction for Predictive (P) and Bidirectionally Predictive (B) Frames in Video Coding*", ISO/IEC JTC1/SC29/WG11 and ITU-T SG16 Q.6, JVT-C128, May 6, 2002, pp. 1-11, XP002354618.

"Text of Committee Draft of Joint Video Specification (ITU-T REC. H-264 ISO/IEC 14496-10 AVC) MPEG02/N4810", ISO/IEC JTC1/SC29/WG11 MPEG02/N4810, May 2002, pp. I-X, 1-133, XP001074690.

S. Kadono and S. Kondo, entitled "*Memory Reduction for Temporal Technique of Direct Mode*", ISO/IEC JTC1/SC/29/WG11 and ITU-T SG16 Q.6, JVT-E076, Oct. 9, 2002, pp. 1-12, XP002354619.

Supplementary European Search Report issued Mar. 3, 2008 in European Application No. 03 73 3462.

Karsten Sühring et al: "JM2.1 video coding reference software, extract from source code module "lencod.c"" ISO/MPEG & ITU-T Joint Video Team (JVT), [Online] May 27, 2002, pp. 1-7, XP002469654, Geneva, Switzerland, Retrieved from the Internet: URL:http://iphome.hhi.de/suehring/tml/download/old_jm/jm21.zip> [retrieved on Feb. 14, 2008].

A. M. Tourapis et al: "Timestamp Independent Motion Vector Prediction for P and B frames with Division Elimination", ISO/IEC JTC1/SC29/WG11 and ITU-T SG16 Q.6, Jul. 22, 2002, pp. 1-18, XP002469655, Klagenfurt, Austria.

Limin Wang et al.: "Adaptive frame/field coding for JVT video", ISO/IEC JTC1/SC29/WG11 and ITU-T SG16 Q.6, JVT-B071, Jan. 29, 2002-Feb. 1, 2002, pp. 1-23, XP030005071, Geneva, Switzerland.

Thomas Wiegand: "Multi-picture handling", ISO/IEC JTC1/SC29/WG11 and ITU-T SG16 Q.6, JVT-DO18, Jul. 22, 2002, pp. 1-5, XP030005293, Klagenfurth, Austria.

\* cited by examiner

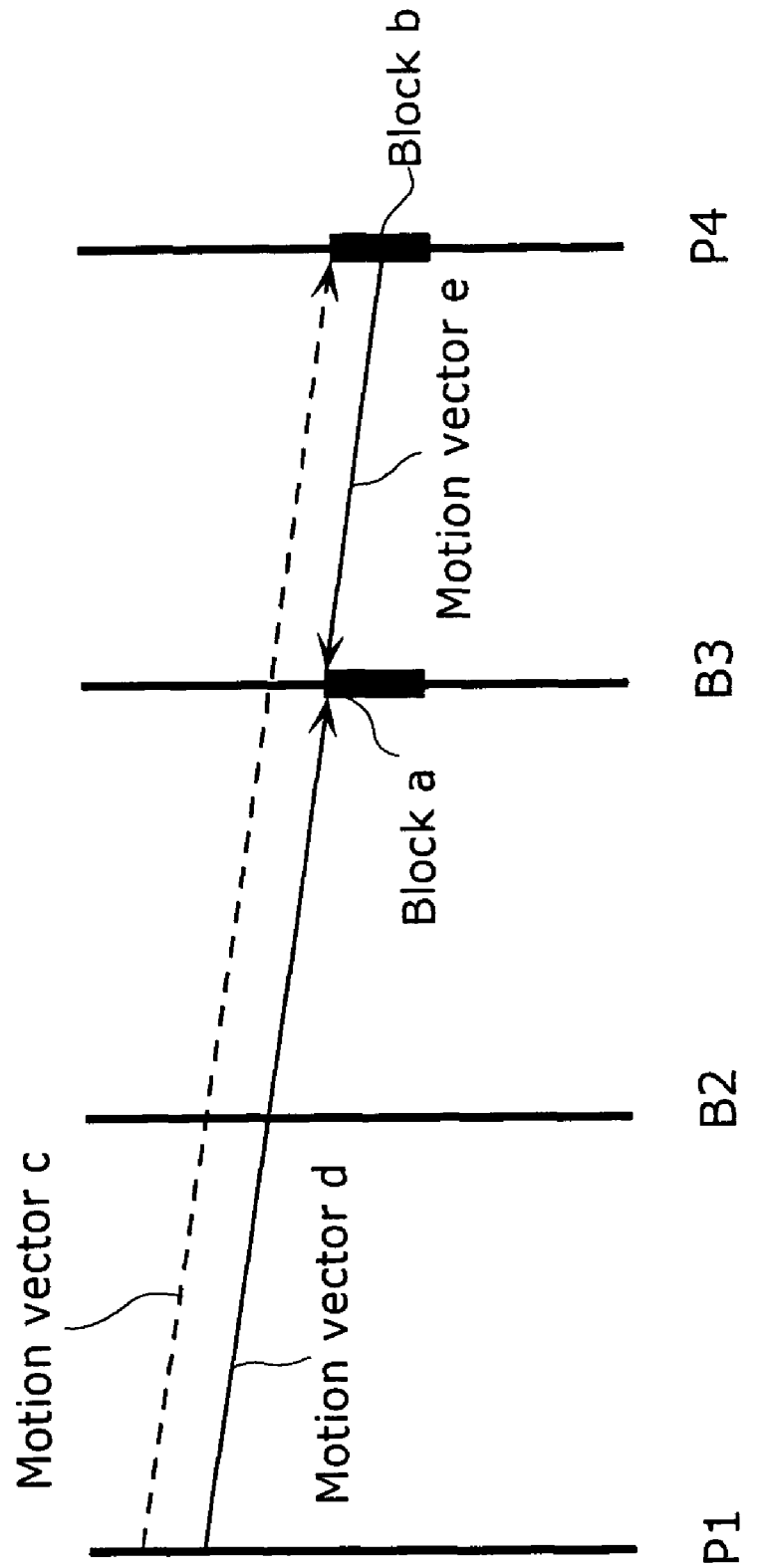

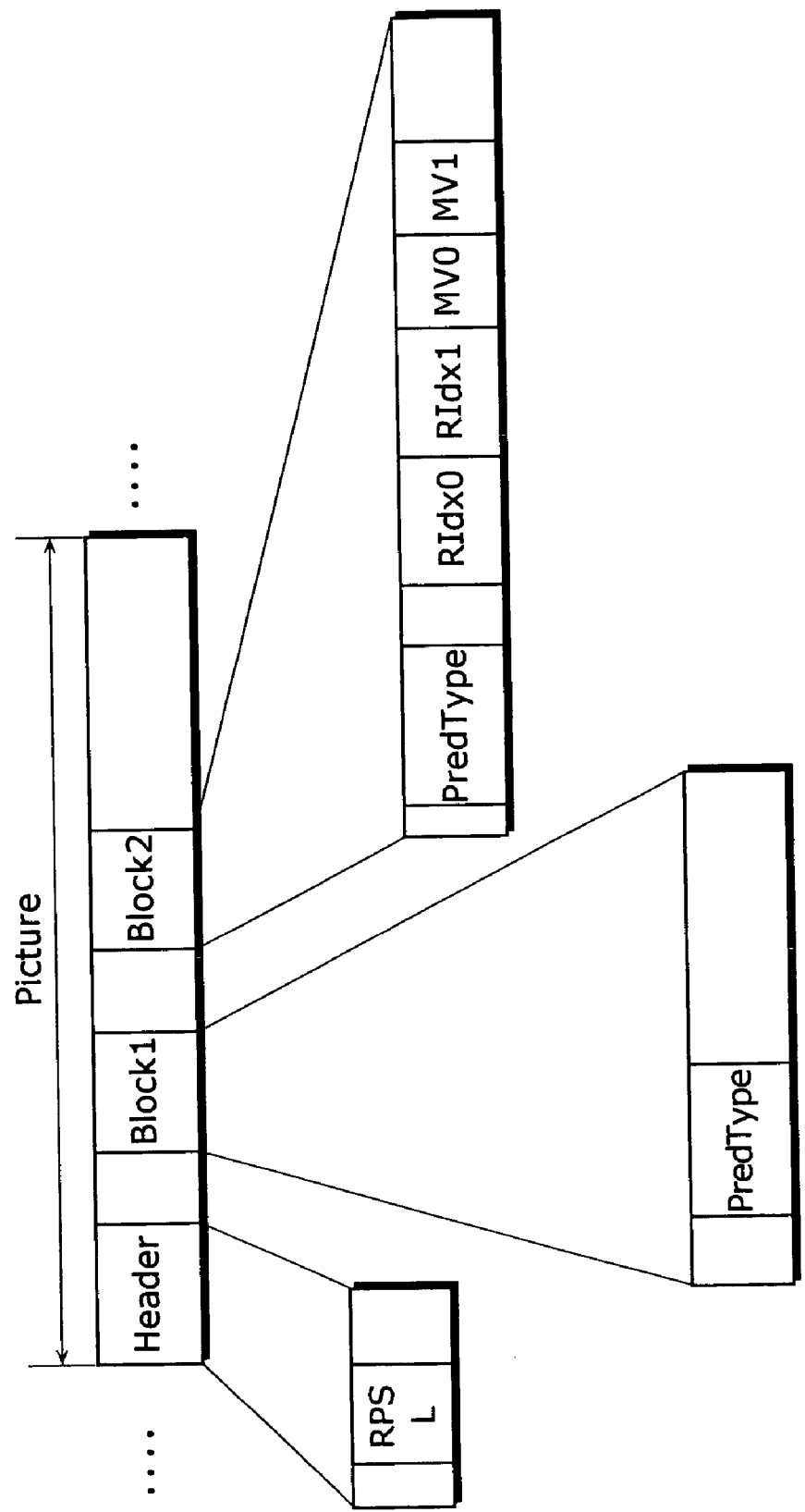

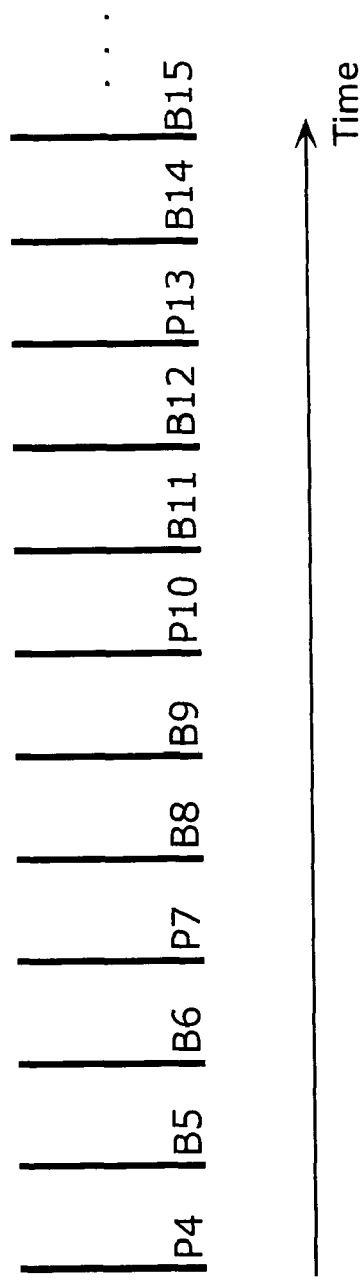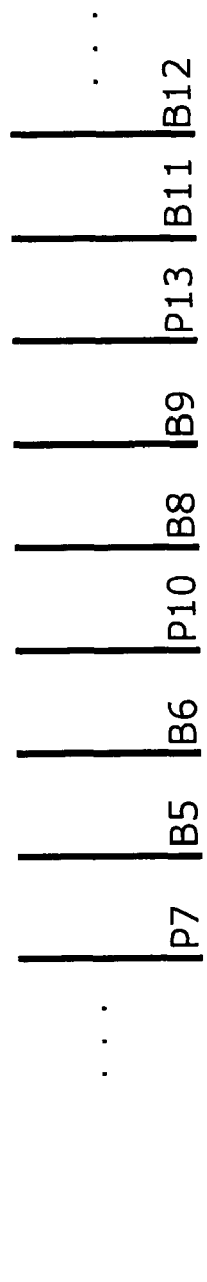
FIG. 6A
FIG. 6B

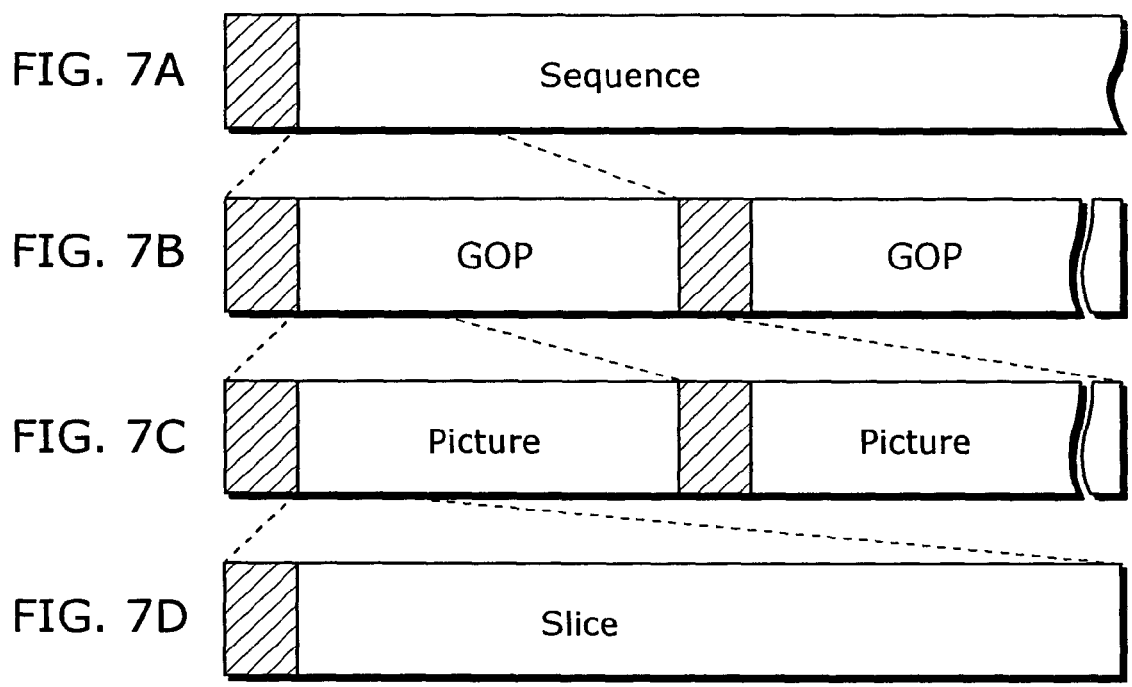

MOVING PICTURE ENCODING METHOD, MOVING PICTURE DECODING METHOD, AND RECORDING MEDIUM

TECHNICAL FIELD

The present invention relates to a picture coding method for the efficient compression of moving pictures and a picture decoding method for correctly decoding the compressed moving pictures, and particularly to a picture coding method and picture decoding method using direct mode for processing.

BACKGROUND ART

In the age of multimedia which integrally handles audio, video and other information, existing information media, i.e., newspaper, magazine, television, radio, telephone and other means through which information is conveyed to people, have recently come to be included in the scope of multimedia. Generally, multimedia refers to something that is represented by associating not only characters, but also graphics, sound, and especially images, and the like, together, but in order to include the aforementioned existing information media in the scope of multimedia, it becomes a prerequisite to represent such information in digital form.

However, if we appraise the amount of information carried by each of the aforementioned information media as the amount of digital information, while the amount of information for 1 character in the case of text is 1 to 2 bytes, the amount of information required for voice is 64Kbits per second (telephone quality), and 100Mbits or over per second becomes necessary for moving pictures (current television reception quality), it is not realistic for the aforementioned information media to handle such an enormous amount of information as it is in digital form. For example, although video phones are already in actual use via Integrated Services Digital Network (ISDN) which offers a transmission speed of 64Kbps/s to 1.5Mbps/s, it is not practical to transmit video shot by television cameras directly through ISDN.

Against this backdrop, information compression techniques have become required, and for example, in the case of the video phone, the H.261 and H.263 standards for moving picture compression technology, internationally standardized by the International Telecommunication Union—Telecommunication Standardization Sector (ITU-T), are being employed. Moreover, with MPEG-1 standard information compression techniques, it has also become possible to store video information onto normal music compact discs (CD) together with audio information.

Here, Moving Picture Experts Group (MPEG) is an international standard for moving picture signal compression, and MPEG-1 is a standard for compressing moving picture signals up to 1.5Mbps, in other words, compressing television signals up to approximately a hundredth of the original size. Moreover, since transmission speed within the scope of the MPEG-1 standard is limited primarily to about 1.5Mbps, the use of MPEG-2, which was standardized to satisfy demands for further improved picture quality, allows moving picture signals to be compressed to 2 to 15Mbps. Furthermore, at present, MPEG-4, which has exceeded MPEG-1 and MPEG-2 compression ratios, and also enables coding, decoding and operating on a per-object base, and realizes the new functions required for the multimedia age, has been standardized by the work group (ISO/IEC JTC1/SC29/WG11) that has promoted the standardization of MPEG-1 and MPEG-2. MPEG-4 was initially aimed at standardizing a low bit rate coding method, but at present, this has been expanded to the standardization of a more versatile coding method further including high bit rate coding for interlaced images, and others.

As for B-picture (hereinafter referred to as "picture", whenever a still picture, which is one picture within a moving picture, can either be a "frame" or "field") coding in the case of moving picture coding methods for MPEG-4, H.26L, and others, a coding mode known as Direct Mode can be selected. (See MPEG-4 visual written standards (1999, ISO/IEC 14496-2:1999 Information technology—Coding of audio-visual objects—Part 2: Visual, p.154)). FIG. 1 is a diagram showing an example of an inter picture prediction method in an existing direct mode. FIG. 1 shall be referred to in explaining an inter picture prediction coding method in direct mode. It is now assumed that a block "a" of a picture B3 is coded/decoded in direct mode. In this case, when the picture B3 is coded/decoded in the H.26L standard, the motion vectors of a block, co-located with the block "a", within the reference picture whose second reference index (a reference index is also referred to as a "relative index". A reference index will be discussed later) is "0", shall be used. Here, it is assumed that with regard to the picture B3, a picture P4 is the reference picture whose second reference index is "0". In this case, a motion vector "c" of the block "b" within the picture P 4 shall be used. The motion vector "c" is the motion vector used during the coding/decoding of the block "b", and refers to a picture P1. For the block "a", a bi-prediction from the reference pictures P1 and P4 is carried out using a motion vector parallel to the motion vector "c". The motion vectors in this case where the block "a" is coded/decoded shall be a motion vector "d" for the picture P1, and a motion vector "e" for the picture 4.

FIG. 2 is a chart showing an example of the assignment of picture numbers, as well as reference indices for each picture inputted. Picture number and reference indices are numbers for uniquely identifying reference pictures stored in the reference picture memory. For each picture stored in memory as a reference picture, a number incrementing by the value of "1" is assigned as a picture number.

FIG. 3 is a conceptual diagram showing the format of a picture coded signal in an existing moving picture coding, moving picture decoding method. "Picture" stands for a coded signal for one picture, "Header" is a header coded signal included in a picture head, "Block 1" is the coded signal of a block coded by direct mode, "Block 2" is the coded signal of a block by an interpolation (motion compensation) prediction other than direct mode, "Rldx0" and "Rldx1" are reference indices, "MV0" and "MV 1" represent motion vectors. For the interpolation (motion compensation) predictive block, Block 2, the two reference indices for indicating the two reference pictures (a first reference picture and a second reference picture) used for interpolation (motion compensation), Rldx0 and Rldx1, are contained, in this order, within a coded signal. Which of the reference indices Rldx0 or Rldx1 shall be used can be determined based on PredType. For example, in the case where PredType has indicated that a picture shall be referred bi-directionally, Rldx0 and Rldx1 are applied. Where it is indicated that a picture shall be uni-directionally referred, either Rldx0 or Rldx1 is applied, and in the case where direct mode is indicated, neither Rldx0 nor Rldx1 is applied. The reference index Rldx1, which indicates the first reference picture, shall be known as the first reference index and, the reference index Rldx1, indicating the second reference picture, shall be known as the second reference index. The first and second reference pictures are identified based on the position of data in a bit stream.

From here, FIG. 2A is referred to in explaining a method for assigning the first and second reference indices.

For the value of the first reference index, first, values starting from "0" shall be assigned to reference pictures having a display time earlier than a current picture to be coded/decoded, in the order of proximity to the current picture to be coded/decoded. When all the reference pictures having a display time earlier than the current picture to be coded/decoded have been assigned values starting from "0", the continuing values are then assigned to the reference pictures having a display time later than the current picture to be coded/decoded, in the order of proximity to the current picture to be coded/decoded.

For the value of the second reference index, first, values starting from "0" shall be assigned to reference pictures having a display time later than the current picture to be coded/decoded, in the order of proximity to the current picture to be coded/decoded. When all the reference pictures having a display time later than the current picture to be coded/decoded have been assigned values starting from "0", the continuing values are then assigned to the reference pictures having a display time earlier than the current picture to be coded/decoded, in the order of proximity to the current picture to be coded/decoded.

In FIG. 2A, where a first reference index RIdx0 is "0" and a second reference index RIdx1 is "1", the first reference picture is a B-picture with a picture number "14", and the second reference picture is a B-picture with a picture number "13".

A reference index within a block is expressed by variable length code words, where the smaller the value of the reference index is, the shorter the code length of the code assigned is. Since, normally, the possibility of the picture closest to the current picture to be coded/decoded being chosen as a reference picture for inter picture prediction is high, coding efficiency will increase if the reference index values are assigned in the order of proximity to the current picture to be coded/decoded, as described above.

On the other hand, by indicating a change (remapping) in the assignment of reference indices using the buffer control signal within the coded signal (See FIG. 3, RPSL within Header), it is possible to arbitrarily change the reference picture assignment for the reference indices. Accordingly, with this change of assignment, it now becomes acceptable to appoint any reference picture within the picture memory, as the reference picture with a second reference index as "0". For example, as shown in FIG. 2B, it is also possible to change the reference index assignment for picture numbers, so as to allow a reference picture with a second reference index as "0" to become the reference picture having a display time immediately preceding the current picture to be coded/decoded.

In addition, in the example given in FIG. 2A and FIG. 2B, a case where a B-picture is referred to during the coding/decoding of another picture is shown, but in general, coding is more often performed under the conditions listed below.

(1) A B-picture is not to be referred to by another picture.
(2) For each block of a B-picture, motion compensation is performed with reference to two pictures which are arbitrarily chosen as reference pictures from among the N (N being a positive integer) number of P-pictures (or I-pictures) immediately preceding in display order and, a single P-picture (or I-picture) immediately subsequent in display order.

FIG. 4A is a diagram showing an example default setting of reference indices for a current picture to be coded B11, where a B-picture is coded with four preceding (N=4) P-pictures and a single, subsequent P-picture as reference pictures. In FIG. 4A, the difference with the example shown in FIG. 2A is that, as B-pictures are not referred to by other pictures, no reference indices are assigned to B-pictures and, only P-pictures (and I-pictures) are assigned reference indices. For example, since the picture B11 can use the four P-pictures immediately preceding it in display order, and the single P-picture immediately subsequent as reference pictures, reference indices will only be assigned to a picture P0, a picture P1, a picture P4, a picture P7, as well as a picture P10.

In the example shown in FIG. 4A, for the picture B11, the reference picture with a first reference index as "0" is the picture P7, and the reference picture with a second reference index as "0" is the picture P10. The picture P10 is located after the picture B11 in display order, and is the closest P-picture to the picture B11. Even under the above-mentioned conditions, it is possible to flexibly change the assignment of reference pictures for reference indices. FIG. 4B is a diagram showing an example of the reference indices for the picture B11 in the case where a remapping has been performed on the reference indices shown in FIG. 4A. As shown in FIG. 4B, in the H.26L standard, it is possible to re-assign the value "0" of the first reference index assigned to the picture P7 in the default setting, to the picture P1, and likewise, to re-assign the value "0" for the second reference index assigned to the picture P10 in the default setting, to the picture P0. It is possible to remap reference indices freely based on the coding efficiency, and other factors, of the subject B-picture.

In this manner, since it is possible to freely change the assignment of reference indices for reference pictures, a change can be normally done so that, the picture that is chosen to be the reference picture for improving the coding efficiency of a current picture to be coded, can be assigned an even smaller reference index. In other words, since a reference index within a block is expressed by variable length code words, where the code length of the code to be assigned becomes shorter as the value becomes smaller, the assignment of an even smaller reference index to a picture to which reference allows improvement of coding efficiency reduces the amount of coding for a reference index, thus allowing a further improvement in coding efficiency.

In the above-mentioned existing method, the motion vector of the reference picture with a second reference index as "0" is used for processing a block in a B-picture in direct mode. As such, during the process of coding/decoding a B-picture, it becomes necessary to store the motion vector of the reference picture with a second reference index as "0". However, during the decoding process, in particular, until the processing of the bit stream of a current B-picture to be decoded is started, it is not known which reference picture is the picture with a second reference index as "0". This is because it is possible to arbitrarily change the assignment of reference indices for the reference pictures, through the explicit instruction of the buffer control signal (See FIG. 3, RPSL within Header). Accordingly, in the process of coding/decoding a B-picture, it becomes necessary to store the motion vectors of all reference pictures. As such, in an existing method, as picture size gets larger, and, as reference pictures increase in number, there is a problem of an explosive expansion of memory size needed for storing motion vectors.

The present invention is conceived to solve the above-mentioned problem, and the object thereof is to provide a moving picture coding method and a moving picture decoding method for direct mode, that enables reduction of memory size for motion vectors.

DISCLOSURE OF INVENTION

In order to solve this problem, the moving picture coding method according to the present invention is a moving picture coding method for coding a moving picture, the moving picture being a sequence of pictures, each of which is made up of a plurality of blocks, the method including: a step of coding a moving picture on a per-block basis with motion compensation using a motion vector, and generating a bit stream; a step of generating limitation information indicating a limitation on storage of at least one motion vector used in motion compensation; and a step of coding the generated limitation information. As a result, it is possible to show a limitation on the storage of motion vector used in performing motion compensation on a current block to be coded within a picture containing a plurality of blocks.

Furthermore, another moving picture coding method in the present invention is a moving picture coding method for coding a moving picture with motion compensation using a motion vector, the moving picture being a sequence of pictures, each of which is made up of a plurality of blocks, the method including: a determination step of determining a coding mode for a current block to be coded; a judgment step of judging whether or not a motion vector of a coded picture identified by a reference index is stored in a storage unit, in the case where the coding mode for the current block to be coded is direct mode; and a compensation step of performing motion compensation on a current block to be coded using a motion vector used in coding a neighboring block of the current block to be coded within the same picture containing the current block to be coded, in the case where the motion vector of the coded picture identified by the reference index is judged as not being stored in the storage unit. Here, direct mode is a coding mode for performing motion compensation on the current block to be coded using a motion vector used in coding of a block within a coded picture. The reference index is an index assigned to the coded picture for selecting a reference picture to be referred to in performing motion compensation on the current block to be coded, from among a plurality of coded pictures stored in the storage unit. As a result, it is possible to perform motion compensation on the current block to be coded even if the motion vector necessary for performing motion compensation in direct mode is not in the storage unit.

Moreover, the above-mentioned moving picture coding method may further include another compensation step of performing motion compensation on the current block to be coded with the motion vector of the current block to be coded as "0", in the case where the motion vector of the coded picture identified by the reference index is judged as not being stored in the storage unit. As a result, it is possible to perform motion compensation on the current block to be coded even if the motion vector necessary for performing motion compensation in direct mode is not in the storage unit.

Furthermore, the above-mentioned moving picture coding method may further include still another compensation step of performing motion compensation on the current block to be coded using the motion vector stored in the storage unit, in the case where the motion vector of the coded picture identified by the reference index is judged as being stored in the storage unit. As a result, it is possible to perform motion compensation on a current block to be coded based on the judgment of whether the motion vector necessary for performing motion compensation in direct mode is stored or not.

Also, still another moving picture coding method in the present invention is a moving picture coding method for coding a moving picture, the moving picture being a sequence of pictures, each of which is made up of a plurality of blocks, the method including: a step of coding a moving picture on a per-block basis with motion compensation using a motion vector, and generating a bit stream; a first output step of generating limitation information indicating a limitation on storage of at least one motion vector used in motion compensation; a second output step of generating storage information, in the case where a picture referred to by the current block to be coded is a B-picture, said storage information indicating that a motion vector used in coding of said B-picture, is not to be stored into a storage unit; and a step of coding the generated limitation information and the generated storage information. Here, the B-picture is a picture on which motion compensation is performed on a per-block basis referring to, at most, two pictures. As a result, it is possible to indicate a limitation on the storage of motion vectors used in performing motion compensation on a current block to be coded within a picture containing a plurality of blocks, and indicate, according to type, the motion vectors that are not to be stored.

In the step of coding the limitation information and the storage information in the above-mentioned moving picture coding method, said limitation information and said storage information may be coded as header information within the bit stream. The above-mentioned moving picture coding method further includes a step of storing, into a storage area, a motion vector of a P-picture coded immediately before a picture containing the current block to be coded, in coding order, without storing, into the storage area, the motion vector used in coding the B-picture, based on the storage information. Here, the P-picture may be a picture on which predictive coding is performed on a per-block basis referring to, at most, one coded picture. As a result, it is possible to indicate a limitation on the storage of motion vectors used in performing motion compensation on a current block to be coded within a picture containing a plurality of blocks, and indicate, according to type, the motion vectors that are not to be stored.

Still another moving picture coding method in the present invention is a moving picture coding method for coding a moving picture with motion compensation using a motion vector, the moving picture being a sequence of pictures, each of which is made up of a plurality of blocks, the method including: a step of judging whether a current picture to be coded is a top field or a bottom field, in the case where said current picture to be coded is one of the fields of an interlaced picture, composed of said top field and said bottom field; and a step of storing, into a top field storage area, the motion vector used in motion compensation of the current picture to be coded, in the case where said current picture to be coded is judged to be the top field, and storing, into a bottom field storage area, the motion vector used in motion compensation of the current picture to be coded, in the case where said current picture to be coded is judged to be the bottom field. As a result, it is possible to store motion vectors of fields, on a per-parity basis.

In the above-mentioned coding method, the motion vector to be stored into the top field storage area and the motion vector to be stored into the bottom field storage area may be the motion vectors used in coding of the top field and the bottom field belonging to the same frame. As a result, it is possible to store the motion vectors used in coding fields belonging to the same frame.

Furthermore, the above-mentioned coding method may further include a step of storing the motion vectors used in motion compensation of the current picture to be coded, into the top field storage area and the bottom field storage area, in the case where the current picture to be coded is coded in a frame structure. As a result, it is possible to store, into both the top field storage area and the bottom field storage area, the motion vectors used in the motion compensation of a current picture in the frame structure.

In order to solve the above-mentioned problem, the moving picture decoding method according to the present invention is a moving picture decoding method for decoding a moving picture with motion compensation using a motion vector, the moving picture being a sequence of pictures, each of which is made up of a plurality of blocks, the method including: a step of inputting a bit stream containing limitation information indicating a limitation on storage of at least one motion vector used in motion compensation of a current block to be decoded; a step of extracting the limitation information after decoding the bit stream; and a step of storing said at least one motion vector into a storage area based on the limitation information. As a result, it is possible to limit the storage of motion vector used in performing motion compensation on a current block to be coded within a picture containing a plurality of blocks.

Also, another moving picture decoding method in the present invention is a moving picture decoding method for decoding a moving picture with motion compensation using a motion vector, the moving picture being a sequence of pictures, each of which is made up of a plurality of blocks, the method including: a step of inputting a bit stream containing coding mode information indicating a coding mode of a current block to be decoded; a step of extracting the coding mode information after decoding the bit stream; a judgment step of judging whether or not a motion vector used in decoding a decoded picture identified by a reference index, is stored in a storage unit, in the case where the coding mode information indicates direct mode; and a compensation step of performing motion compensation on the current block to be decoded using a motion vector used in decoding a neighboring block of the current block to be decoded within the same picture containing the current block to be decoded, in the case where the motion vector of the decoded picture identified by the reference index is judged as not being stored in the storage unit. Here, the direct mode is a coding mode for performing motion compensation on the current block to be decoded using a motion vector used in decoding a block, co-located with the current block to be decoded, within a picture being referred to. The reference index is an index assigned to the decoded picture for selecting the reference picture to be referred to for performing motion compensation on the current block to be decoded, from among a plurality of decoded pictures stored in the storage unit. As a result, it is possible to perform motion compensation on the current block to be decoded even when the motion vector necessary for performing motion compensation in direct mode is not in the storage unit.

Also, in addition, the above-mentioned moving picture decoding method may further include another compensation step of performing motion compensation on the current block to be decoded with the motion vector of the current block to be decoded as "0", in the case where the motion vector of the decoded picture identified by the reference index is judged as not being stored in the storage unit. As a result, it is possible to perform motion compensation on the current block to be decoded even when the motion vector necessary for performing motion compensation in direct mode is not in the storage unit.

Furthermore, the above-mentioned decoding method may further include still another compensation step of performing motion compensation on the current block to be decoded using the motion vector stored in the storage unit, in the case where the motion vector used in decoding the decoded picture identified by the reference index, is judged as being stored in the storage unit. As a result, it is possible to perform motion compensation on a current block to be decoded based on the judgment of whether the motion vector necessary for performing motion compensation in direct mode is stored or not.

Still another decoding method in the present invention is a moving picture decoding method for decoding a moving picture with motion compensation using a motion vector, the moving picture being a sequence of pictures, each of which is made up of a plurality of blocks, the method including: an input step of inputting a bit stream containing limitation information and storage information, said limitation information indicating a limitation on storage of at least one motion vector used in motion compensation of a current block to be decoded, and said storage information indicating that a motion vector used in decoding a B-picture is not stored in the storage unit when a picture referred to by the current block to be decoded is the B-picture; an extraction step of extracting said limitation data and said storage data after decoding the bit stream; and a storage step of storing, into the storage unit, the motion vector, based on the limitation information, without storing, into the storage unit, the motion vector used in decoding the B-picture, based on the storage information. Here, the B-picture is a picture on which motion compensation is performed on a per-block basis referring to, at most, 2 decoded pictures. As a result, it is possible to determine whether a motion vector is to be stored or not, based on the extracted limitation information and storage information.

Furthermore, in the above-mentioned storage step, a motion vector of a P-picture decoded immediately before a picture containing the current block to be decoded, in decoding order, is stored into the storage area, without storing the motion vector used in decoding the B-picture into the storage area, based on the storage information. The P-picture may be a picture on which motion compensation is performed on a per-block basis referring to, at most, one decoded picture. As a result, it is possible to determine whether a motion vector is to be stored or not, based on the extracted limitation information and storage information.

Also, still another decoding method in the present invention is a moving picture decoding method for decoding a moving picture with motion compensation using a motion vector, the moving picture being a sequence of pictures, each of which is made up of a plurality of blocks, the method including: a step of judging whether a current picture to be decoded is a top field or a bottom field, in the case where said current picture to be decoded is one of the fields of an interlaced picture, composed of said top field and said bottom field; and a step of storing, into a top field storage area, the motion vector used in motion compensation of the current picture to be decoded, in the case where said current picture to be decoded is judged to be the top field, and storing, into a bottom field storage area, the motion vector used in motion compensation of the current picture to be decoded, in the case where said current picture to be decoded is judged to be the bottom field. As a result, it is possible to store motion vectors of fields, on a per-parity basis.

As mentioned above, according to the moving picture coding method and the moving picture decoding method in the present invention, it is possible to generate a bit stream with a higher coding efficiency, while reducing the memory size for storing motion vectors necessary for coding in direct mode. Thus the practical value of the present invention is high.

BRIEF DESCRIPTION OF DRAWINGS

FIG. 1 is a diagram showing an example of an inter picture prediction method in an existing direct mode.

FIG. 3 is a conceptual diagram showing the format of a picture coded signal in an existing moving picture coding, moving picture decoding method.

FIG. 6A is a diagram showing the sequence of pictures inputted as input pictures into the moving picture coding apparatus in FIG. 5.

FIG. 6B is a diagram showing the sequence of pictures when the sequence of pictures indicated in FIG. 6A is reordered into coding order.

FIG. 7A to 7D are diagrams showing an example of a bit stream generated by the bit stream generation unit shown in FIG. 5.

FIG. 7A is a diagram showing an example of a bit stream in which information regarding the storage size of motion vectors is described in a sequence header.

FIG. 7B is a diagram showing an example of a bit stream in which information regarding the storage size of motion vectors is described in a Group of Pictures (GOP) header.

FIG. 7C is a diagram showing an example of a bit stream in which information regarding the storage size of motion vectors is described in a picture header.

FIG. 7D is a diagram showing an example a bit stream in which information regarding the storage size of motion vectors is described in a slice header.

BEST MODE FOR CARRYING OUT THE INVENTION

Hereinafter, the embodiments of the present invention will be explained with reference to FIG. 5 to FIG. 29.

First Embodiment

Figure 5:
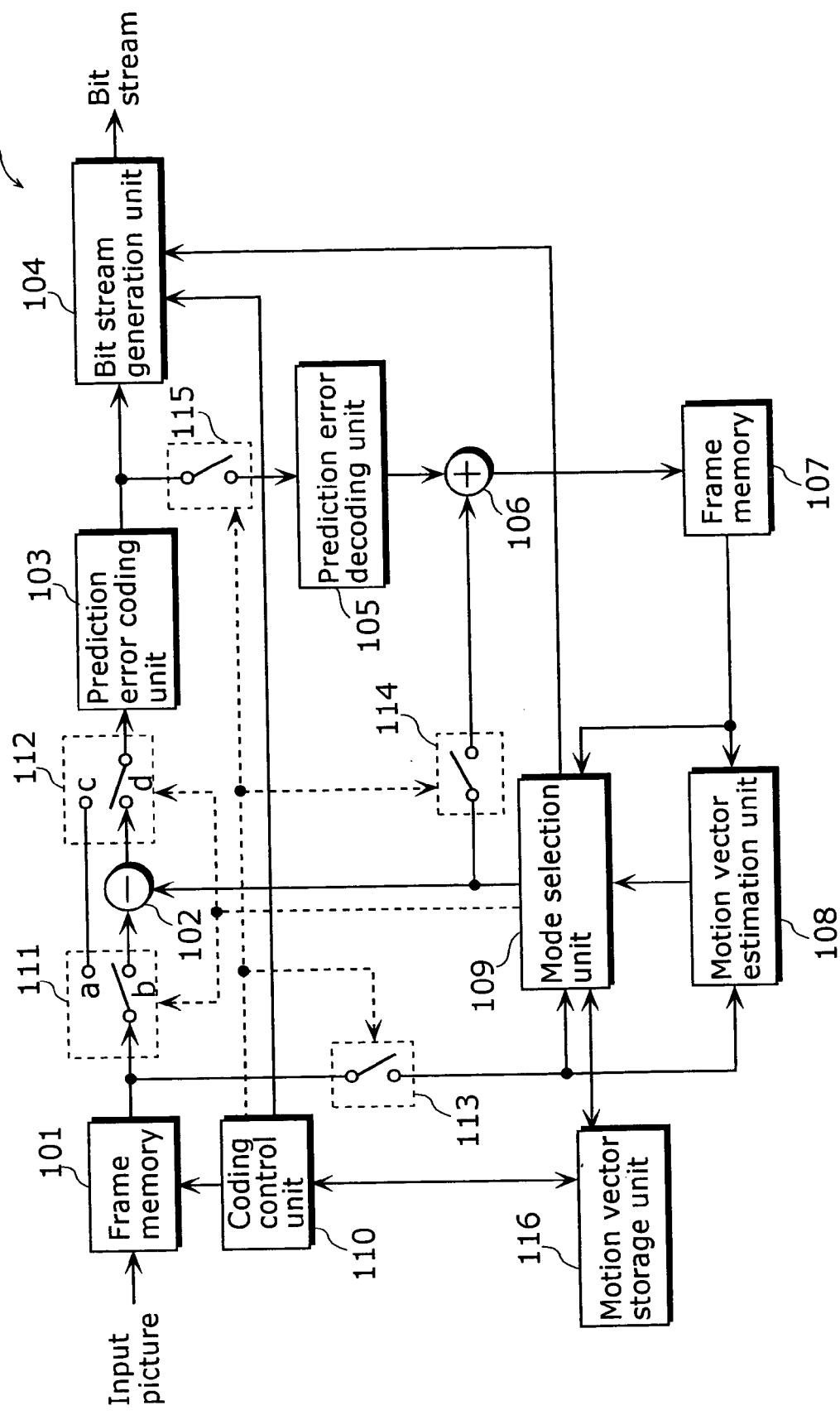
FIG. 5 is a block diagram showing the configuration of a moving picture coding apparatus in the first embodiment of the present invention.

FIG. 5 is a block diagram showing the configuration of a moving picture coding apparatus 100 in the first embodiment of the present invention. The moving picture coding apparatus 100 is a moving picture coding apparatus that, during the coding of each picture, only stores in memory the motion vectors estimated from a reference picture coded immediately before a current picture to be coded and, when during the coding of a B-picture in direct mode, the vector to be referred is not stored within the memory, codes using a different method from an existing direct mode. The apparatus includes a frame memory 101, a difference calculation unit 102, a prediction error coding unit 103, a bit stream generation unit 104, a prediction error decoding unit 105, an addition unit 106, a frame memory 107, a motion vector estimation unit 108, a mode selection unit 109, a coding control unit 110, switches 111 to 115, and a motion vector storage unit 116. The frame memory 101 is a picture memory for holding inputted pictures on a per-picture basis, and provides a storage area where pictures inputted in display order are reordered into coding order. The difference calculation unit 102 calculates for output, a prediction error, which is the difference between an image read out on a per-block basis for a picture within the frame memory 101 and, an image from one block read out based on a motion vector from a reference picture within the frame memory 107. The prediction error coding unit 103 performs a frequency transformation and quantization on the prediction error obtained by the difference calculation unit 102, for output. In this quantization by the prediction error coding unit 103, cases wherein processes that become irreversible due to rounding off of division results, and the like, are included. After converting the quantized result from prediction error coding unit 103 into variable length code, the bit stream generation unit 104 converts the variable length code into the coded bit stream format for output, attaching added information such as header information which describes the related information of the coded prediction error, and generates a bit stream. The prediction error decoding unit 105 undertakes a variable length decoding of the coded result from the prediction error coding unit 103. Then, after inverse quantization, the prediction error decoding unit 105 performs an inverse frequency transformation and outputs the decoded prediction error. The addition unit 106 adds the block of the aforementioned reference image to the block of the prediction error which is the decoded result from the prediction error decoding unit 105, then outputs the image for one decoded block. The frame memory 107 is a picture memory for accumulating the images of respective decoded blocks, and for storing reference images on a per-picture basis.

The motion vector estimation unit 108 estimates a motion vector of a current picture by blocks of predetermined size. The mode selection unit 109 uses the current block read out from the frame memory 101 and the motion vector estimated for the current block as reference, and selects whether to calculate the motion vectors of a current block by direct mode or by another mode. In the case where direct mode is chosen, the mode selection unit 109 calculates the motion vector of the current block using the motion vector of the reference picture subsequent in display order to the current picture to be coded, stored in the motion vector storage unit 116. The mode selection unit 109 reads out from the frame memory 107, the block of the reference image indicated by the motion vector, which is the result of the calculation, and outputs this to the difference calculation unit 102 and the addition unit 106. The coding control unit 110 rearranges the inputted pictures stored in display order within the frame memory 101 into coding order, and, reads out the block, which becomes the unit for the coding process, in coding order starting from the current picture to be coded. Moreover, coding control unit 110 assigns reference indices to each reference picture and manages the reference index list, which is a listing of the reference indices assigned. In addition, the coding control unit 110 stores into the motion vector storage unit 116, only the motion vector of the reference picture coded immediately before the current picture to be coded, then creates information indicating the storage size of the motion vectors stored in the motion vector storage unit 116. The motion vector storage unit 116 provides a storage area for the storage of the motion vector obtained from reference picture coded immediately before the current picture to be coded.

From hereon, the operation of the moving picture coding apparatus 100, as configured above, shall be explained. An input picture for the moving picture coding apparatus 100, shown in FIG. 5, is inputted into the frame memory 101 in display order, on a per-picture basis. FIG. 6A is a diagram showing the sequence of pictures inputted as input pictures into the moving picture coding apparatus 100 in FIG. 5. The sequence of pictures inputted into the frame memory 101 is indicated in FIG. 6A. In FIG. 6A, vertical lines indicate pictures, and an alphabet and a number at the lower right of each picture indicate a picture type (I, P or B) and a picture number in display order. Each picture inputted into frame memory 101 shall be reordered into coding order. The reordering into coding order is performed based on the reference relations in inter picture predictive coding, that is, with reordering done so that the picture used as a reference picture is coded before the current picture to be coded. FIG. 6B is a diagram showing the sequence of pictures when the sequence of pictures indicated in FIG. 6A is reordered into coding order. For example, a P-picture shall use as reference, any one picture from among three neighboring I-pictures, or P-pictures, that precede in display order. In other words, each block to be coded within the current P-picture to be coded shall refer to a single reference picture appearing ahead in display order, with a motion compensation being performed. And, for each block, this single picture can be selected arbitrarily from among three neighboring I-pictures, or P-pictures, preceding in display order. In addition, a B-picture shall use as reference pictures three nearby I-pictures, or P-pictures, that precede in display order, and one nearby I-picture, or P-picture appearing subsequently in display order. Accordingly, for each block to be coded within the current B-picture to be coded, motion compensation is performed in reference to two reference pictures. And, for every block, these two pictures can be arbitrarily selected from among three nearby I-pictures, or P-pictures, that precede display order, and one nearby I-picture, or P-picture appearing subsequently in display order. As such, it becomes necessary to code the single nearby I-picture, or P-picture, subsequent to the current B-picture in display order, at a point prior to coding a B-picture. In this case, the result of reordering the pictures in FIG. 6A shall be like that shown in FIG. 6B. Taking a B-picture, a picture B5, as an example, the P-picture (or I-picture) subsequent to the picture B5 in display order, which is also the closest picture to the picture B5, the picture P7, shall be coded prior to the coding of the picture B5.

It is assumed that the pictures reordered in the frame memory 101 are read out on a macroblock basis. Here, a macroblock is 16 horizontal×16 vertical pixels in size. It is also assumed that motion compensation is performed on a per-block basis (set herein as 8 pixels×8 pixels in size). From this point, the coding process for the picture P13 and the picture B11 shall be discussed in sequence. Moreover, it is also assumed that in the present embodiment, the coding control unit 110 manages the reference indices.

(Coding Process for Picture P13)

Since the picture P13 is a P-picture, inter picture predictive coding is performed using forward reference. The reference pictures in this case are the picture P10, the picture P7, and the picture P4. These reference pictures are already coded, and the decoded pictures thereof are stored in the frame memory 107.

The coding control unit 110 determines the picture type (I, P or B) to be used for coding an inputted picture, and controls the switches 113, 114 and 115 depending on the picture type. Here, a picture type is generally determined using a method for assigning a picture type periodically, for example. The reordering of pictures into coding order within the frame memory 101 is carried out based on the picture type determined.

When coding a P-picture, the coding control unit 110 controls the switches 113, 114 and 115 to be ON. Therefore, macroblocks in the picture P13 which are read out from the frame memory 101 are inputted into the motion vector estimation unit 108, the mode selection unit 109 and the difference calculation unit 102.

The motion vector estimation unit 108 estimates the motion vector of each block in the macroblock using the decoded image data of the picture P10 stored in the frame memory 107 as a reference picture, and outputs the estimated motion vectors to the mode selection unit 109.

The mode selection unit 109 determines the coding mode of the macroblock using the motion vectors estimated by the motion vector estimation unit 108. Here, coding mode refers to the method in which a macroblock is to be coded. For example, in the case of a P-picture, the coding method to be used can be determined from among the following: intra picture coding, inter picture predictive coding using motion vectors, and inter picture predictive coding without the use of motion vectors (treating a motion vector as "0", or selecting a motion vector from surrounding blocks). In determining a coding mode, the method with the least coding errors within a small bit size is generally selected.

The coding mode determined by the mode selection unit 109 is outputted to the bit stream generation unit 104. In addition, in the case where the current picture is the picture used as a reference picture during the coding of another picture and, the coding mode determined by the mode selection unit 109 is an inter picture predictive coding mode, the mode selection unit 109 stores the motion vector to be used in that inter picture predictive coding into the motion vector storage unit 116. However, the motion vector is stored into the motion vector storage unit 116 under the control of the coding control unit 110, as described later. Moreover, a motion vector is outputted from the mode selection unit 109 into the bit stream generation unit 104.

Hereinafter, the storage operation of a motion vector from mode selection unit 109 into the motion vector 116 shall be explained. The number of motion vectors stored in motion vector storage unit 116 shall be designated by the coding control unit 110. A P-picture is coded using three preceding pictures as reference pictures. However, here, the motion vectors of a number of pictures which are fewer in number than the number of reference pictures, are stored in the motion vector storage unit 116. For example, it is assumed here that the motion vector of only one picture is stored. In this case, with regard to the motion vector to be stored, a method of storing exists wherein, among reference pictures, the motion vector of the reference picture coded just before the current picture in coding order is stored. Here, motion vectors already stored in the motion vector storage unit 116 may be deleted upon the start of coding of the current picture. And, it is also possible to overwrite the motion vectors, in the order of blocks to be coded, at the time a coding method is determined. Furthermore, the amount of motion vectors to be stored may be determined based on the size of the area (memory) contained in the decoding apparatus, in which the motion vectors are stored. As to the motion vectors to be stored in the motion vector storage unit 116, it may be done in such a way that the motion vectors of I-pictures only, P-pictures only, or I-pictures and P-pictures only will be stored. In addition to these, in a picture being coded, the motion vectors of a predetermined number of blocks, or of all blocks, coded ahead of the current block using an inter picture prediction other than direct mode, may be stored. Here, information on motion vectors to be stored with regard to an I-picture refers to information indicating that a motion vector is not stored (as I-pictures are not subject to motion compensation). And, as to motion vectors to be stored in the motion vector storage unit 116, whether, a few pictures, starting from the picture closest to the current picture to be coded in display order are stored, or a few pictures, starting from the picture closest (from a picture coming subsequently, in stream sequence) to the current picture to be coded in coding order (stream sequence), are stored, either case is acceptable. In the case where a B-picture refers to two subsequent P-pictures, since the pictures are temporally apart although close in coding (or decoding) order, there is a high possibility that as to picture content, they may not be considered as being close (not suitable for motion compensation). As such, in the case where a B-picture refers to a plurality of subsequent P-pictures, there are cases where storing motion vectors, starting from the motion vector closest to the current picture to be coded in display order, is advantageous. On the other hand, there is the merit of being able to simplify memory management when storing motion vectors, from the motion vector of the picture closest to the current picture (from a subsequent picture in stream sequence), in coding order (stream sequence).

Furthermore, the number of motion vectors (for example, the number of reference pictures, the number of macroblocks) that are stored in the motion vector storage unit 116, as designated by the coding control unit 110, is outputted into the bit stream generation unit 104.

Next, as shown in FIG. 5, the reference image based on the coding mode determined by the mode selection unit 109 is outputted to the difference calculation unit 102 and to the addition unit 106. However, in the case where intra picture coding is selected, a reference image is not outputted. In addition, the coding control unit 110 controls the switch 111 to switch to a terminal "a", and the switch 112 to terminal "c", in the case where intra picture coding is selected by the mode control unit 109. And, in the case where inter picture predictive coding is selected, the coding control unit 110 controls the switch 111 to connect to a terminal "b" and the switch 112 to terminal "d".

Hereinafter, the case where inter picture predictive coding is selected by the mode selection unit 109 shall be explained.

Apart from macroblock image data, reference images from the mode selection unit 109 are inputted into the difference calculation unit 102. The difference calculation unit 102 calculates the difference between the macroblock image data and a reference image, and generates a prediction error image for output.

The prediction error image is inputted to the prediction error coding unit 103. The prediction error coding unit 103 performs frequency transformation, quantization, and other coding processes on the prediction error image, from which coded data is generated for output. Here, frequency transformation and quantization processes can be done in units of 8 horizontal×8 vertical pixels, for example. The coded data obtained from the prediction error coding unit 103 is inputted to the bit stream generation unit 104 and the prediction error decoding unit 105.

The bit stream generation unit 104 performs variable length coding, and so on, on the inputted coded data. It then generates a bit stream by adding the motion vector information, coding mode information, other header information, and so on, obtained from the mode selection unit 109. In this case, information concerning the storage size of motion vectors determined by the coding control unit 110 (i.e., the number of reference pictures, the number of macroblocks) is described within the header information. This description should also be placed in a header of the entire bit stream (sequence header), a header for a plurality of pictures forming a "group of pictures" (GOP header), a picture header, a slice header, and others. And, in the case where the information regarding the storage size of motion vectors is already shared by the coding apparatus and the decoding apparatus, the information regarding the storage size of a motion vector may or may not be coded. FIG. 7A to 7D are diagrams showing an example of a bit stream generated by the bit stream generation unit 104 shown in FIG. 5. In the following diagrams, each shaded area represents a header. FIG. 7A is a diagram showing an example of a bit stream in which information regarding the storage size of motion vectors is described in a sequence header. FIG. 7B is a diagram showing an example of a bit stream in which information regarding the storage size of motion vectors is described in a GOP header. FIG. 7C is a diagram showing an example of a bit stream in which information regarding the storage size of motion vectors is described in a picture header. FIG. 7D is a diagram showing an example of a bit stream in which information regarding the storage size of motion vectors is described in a slice header. Furthermore, it is possible to describe this information only once in the header of the entire bit stream. And, it is also possible to describe the same information repeatedly, into the header for GOP (GOP header), the picture header, as well as the slice header, and others.

Moreover, the aforementioned information regarding the storage size of motion vectors shall not be limited to the number of reference pictures or the number of macroblocks. For example, it may simply be information indicating a limitation set on the storage size of a motion vector, or information indicating a limitation on data to be stored into a memory, and so on.

The prediction error decoding unit 105 performs inverse quantization, inverse frequency transformation, and other decoding processes on coded data inputted, and generates a decoded error image for output. The decoded error image is added to a predictive image by the addition unit 106, to form a decoded image to be stored in the frame memory 107.

The coding for the remaining macroblocks of the picture 13 shall be performed under the same process. Then, after processing of all the macroblocks of the picture P13 is completed, the coding process for the picture B11 shall be performed.

(Coding of Picture B11)

Since the picture B11 is a B-picture, inter picture predictive coding using bi-prediction reference shall be performed. In this case, the reference pictures shall be the picture P10, the picture P7, and the picture P4 that precede the picture B11 in display order, and the picture P13 appearing after the picture B11 in display order. When coding the picture B11, the coding control unit 110 controls the switch 113 to be ON and the switches 114 and 115 to be OFF. Therefore, the macroblocks in the picture B11 which are read out from the frame memory 101 are inputted to the motion vector estimation unit 108, the mode selection unit 109 and the difference calculation unit 102.

The motion vector estimation unit 108 estimates the forward motion vectors and the backward motion vectors of each block in a macroblock using the decoded picture data of the picture P10, the picture P7, and the picture P4 stored in the frame memory 107 as forward reference pictures and the decoded picture data of the picture P13 as a backward reference picture.

The mode selection unit 109 determines a coding mode of the macroblock using the motion vectors estimated by the motion vector estimation unit 108. Here, a coding mode for a B-picture may be selected from coding modes such as, intra picture coding, inter picture predictive coding using forward motion vectors, inter picture predictive coding using backward motion vectors, inter picture predictive coding using bi-predictive motion vectors, or direct mode, for example.

Figure 8:
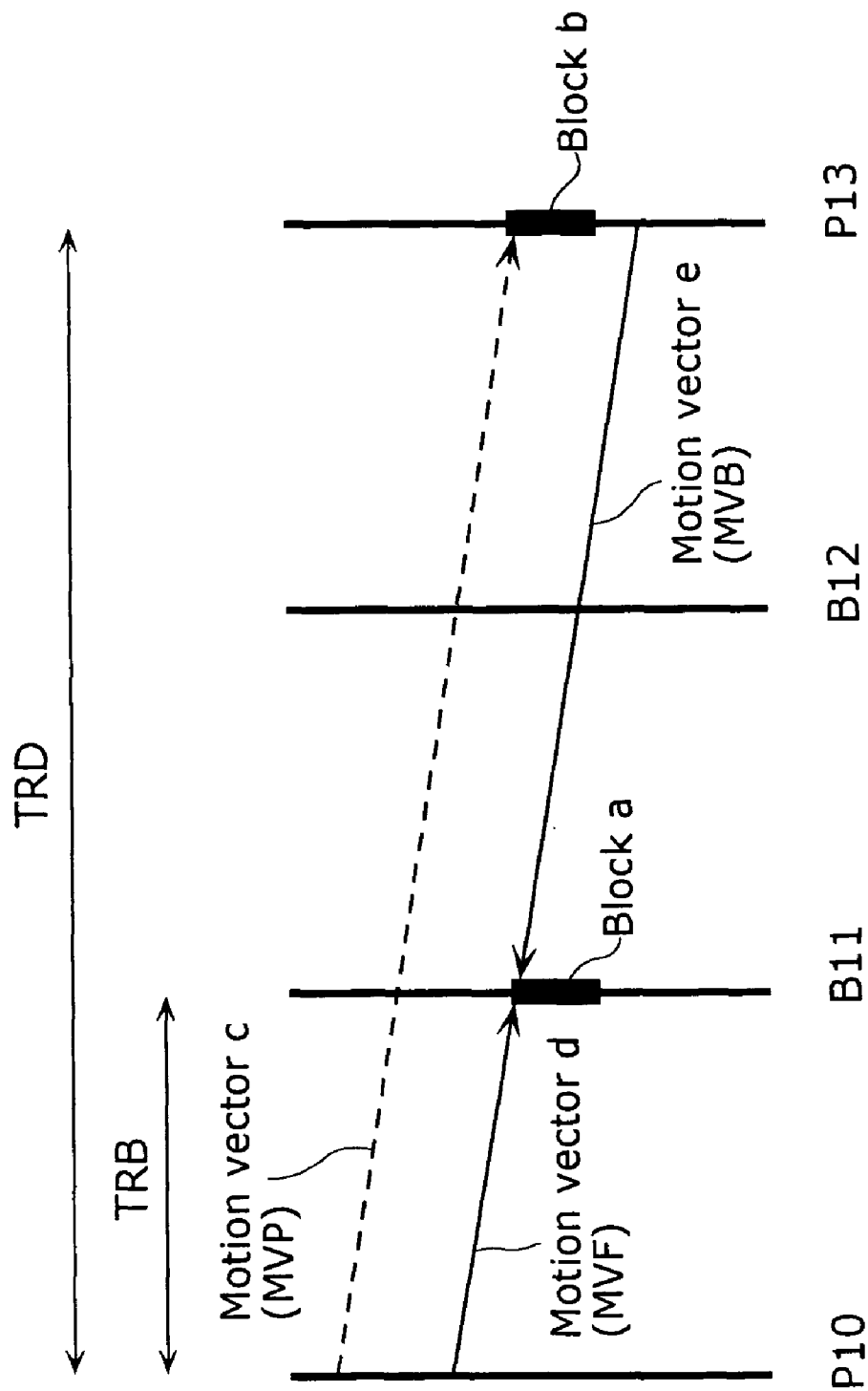
FIG. 8 is a diagram showing an example of a calculation method in the case where a motion vector of a current block is calculated using direct mode.

Here, the case where coding by direct mode shall be explained. FIG. 8 is a diagram showing an example of a calculation method in the case where a motion vector of a current block is calculated using direct mode. In FIG. 8, it is assumed that the current block to be coded is a block "a" within a picture B11. The motion vector of a block, co-located with the block "a", within the reference picture whose second reference index is "0" for the picture B11, shall be used in coding the block "a" in direct mode.

First, the case where the reference picture with a second reference index as "0" for the picture B-11 is a picture P13 shall be explained. In order to identify which picture a particular motion vector belongs to, the motion vectors stored in motion vector storage unit 116 are stored with correspondence to picture numbers. The mode selection unit 109 searches for the picture number "13" corresponding to the reference picture with the second reference index as "0" for picture B11, within the reference index list of the picture B11. It then determines whether the motion vectors of the reference picture of the picture number "13" is stored within the motion vector storage unit 116 or not. As the picture P13 is the reference picture coded closest to the picture B11 in coding order, the motion vectors used for the coding of each block of the picture P13, are stored in the motion vector storage unit 116. As such, when the block "a" is coded in direct mode, the motion vector of a block "b" within the picture P13 shall be used. A motion vector "c" is the motion vector used during the coding of the block "b", and is stored in the motion vector storage unit 116. The motion vector "c" refers to the picture P10. For the block "a", a bi-prediction is performed from the picture P10 and the picture P13, using the motion vectors generated from the motion vector "c". The motion vectors used during the coding of the block "a", in this case are, a motion vector "d" from the picture P10, and a motion vector "e" from the picture P13.

Here, the first method in generating the motion vector for the block "a" from the motion vector "c" is the method of scaling using the temporal distance between pictures. Now, if we assume the size of the forward motion vector "d" is MVF, the size of the backward motion vector "e" is MVB, the size of the motion vector "c" is MVP, the temporal distance between the reference picture (the picture P13) of the current picture (the picture B11) with a second reference index as "0", and the picture (the picture P10) used as reference by the block of the said reference picture (the picture P13) is TRD, and the temporal distance between the current picture (the picture B11) and the picture (the picture P10) used as reference by the block of the reference picture (the picture P13) is TRB, the motion vector MVF and the motion vector MVB are calculated by Equation 1 and Equation 2, respectively.

$$MVF = MVP \times TRB/TRD \quad \text{(Equation 1)}$$

$$MVB = (TRB - TRD) \times MV/TRD \quad \text{(Equation 2)}$$

where MVF, MVB respectively represent a combination of the horizontal components and vertical components of the motion vectors.

Furthermore, the second method for generating the motion vector of the block "a" from the motion vector "c" is the method where scaling is carried out on the motion vector "c" using a predetermined scaling coefficient. The scaling coefficient to be used here may be adjusted on a multi-block basis or a multi-picture basis. Moreover, this scaling coefficient is determined uniquely in a system and may be shared by the coding side and the decoding side, and, by description as header information within a bit stream, may also be shared by the coding side and decoding side.

Next, the case wherein the reference picture of a second reference index as "0" is a reference picture other than the picture P13 shall be explained. For example, it is possible to have a case where any one among the pictures, the picture P10, the picture P7, and the picture P4 as being the reference picture of the second reference index having a value as "0" for the picture B11. For reference pictures other than the picture P13, the motion vectors used during the coding of each block for these pictures are not stored into the motion vector storage unit 116, because in coding order, such pictures are not reference pictures coded closest to the picture B 11. As such, even if the block "a" shall be coded in direct mode, the motion vectors of the reference picture of the second reference index with a value "0" cannot be used.

Figure 9:
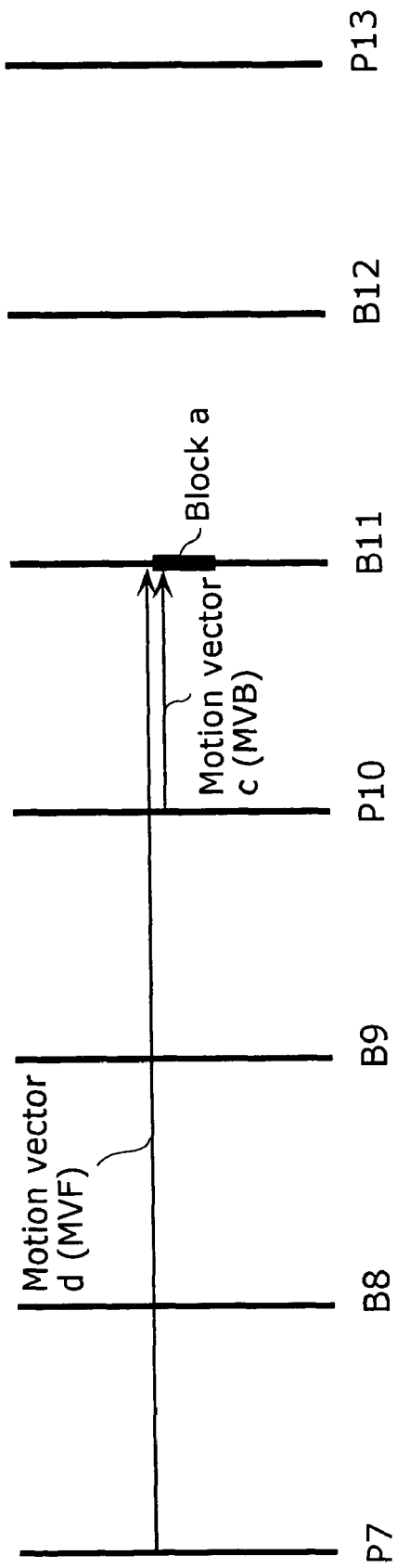
FIG. 9 is a diagram showing an example of a bi-prediction in the case where, during the coding of a B-picture in direct mode, the motion vector of the reference picture with a second reference index as "0" cannot be used.

The first processing method in direct mode for this case is a bi-prediction method with the motion vector as "0". As reference pictures in this case, for example, for the picture B11, the picture with a first reference picture as "0" and the picture with a second reference index as "0" can be used. FIG. 9 is a diagram showing an example of a bi-prediction in the case where, during the coding of a B-picture in direct mode, the motion vector of the reference picture with a second reference index as "0" cannot be used. For example, in the case where the picture with a first reference index as "0" is a picture P7, and the picture with a second reference index as "0" is a picture P10, a bi-prediction can be performed for a block "a", as shown in FIG. 9. Motion compensation shall be performed on the block "a", referring to co-located blocks within the picture P7 and the picture P10.

Figure 10:
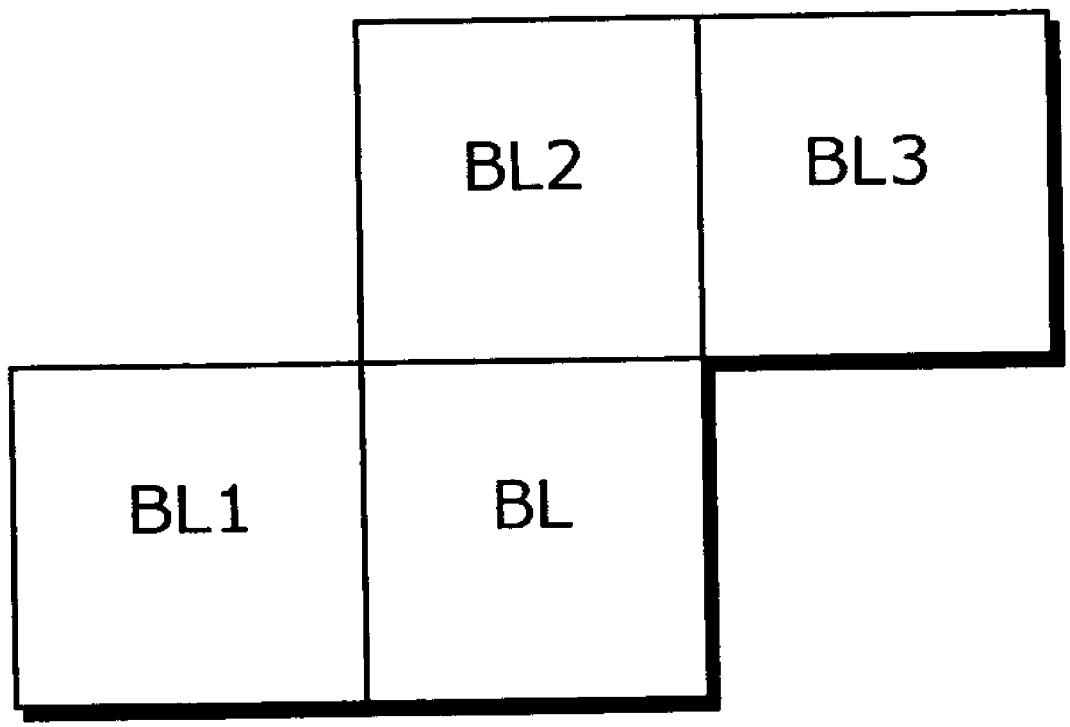
FIG. 10 is a diagram showing another example of a bi-prediction in the case where, during the coding of a B-picture in direct mode, the motion vector of the reference picture with a second reference index as "0" cannot be used.

In addition, the second processing method in direct mode is a method using the motion vectors of surrounding blocks within the same picture. However, in this case, it is assumed that the motion vectors of the blocks surrounding the current block are stored by the mode selection unit 109 into the motion vector storage unit 116. In this method, as shown in FIG. 10, in the case where a block BL is coded in direct mode, the motion vectors used during the coding of three surrounding blocks, a block BL1, a block BL2, and a block BL3, shall be used to determine the motion vector to be used for the coding of the block BL. In determining the motion vectors, a method that calculates the median or average of the motion vectors of the three surrounding blocks, with regard to forward motion vectors and backward motion vectors respectively, can be used, for example. Likewise, a method that calculates the median or average of the motion vectors of the three surrounding blocks, with regard to the motion vector referring to the first reference picture and the motion vector referring to the second reference picture respectively, can also be used.

Now, as shown in FIG. 5, the coding mode determined by the mode selection unit 109 is outputted to the bit stream generation unit 104. In addition, the reference image based on the coding mode determined by the mode selection unit 109 is outputted to the difference calculation unit 102 and the addition unit 106. However, in the case where intra picture coding is selected, a reference image shall not be outputted. Moreover, in the case where intra picture coding is selected by the mode selection unit 109, the coding control unit 110 controls the switch 111 to connect to the terminal "a", and the switch 112 to the terminal "c". In the case where inter picture predictive coding is selected, the coding control unit 110 controls the switch 111 to connect to the terminal "b", and the switch 112 to the terminal "d". The case were the mode selection unit 109 has selected inter picture prediction shall be explained below.

A reference image is inputted from the mode selection unit 109 into the difference calculation unit 102. The difference calculation unit 102 calculates the difference between a macroblock of picture B11 and the reference image, and generates a prediction error image for output.

The prediction error image is inputted to the prediction error coding unit 103. Frequency transformation, quantization and other coding processes are performed on the inputted prediction error image by the prediction error coding unit 103 and coded data is generated for output. The coded data outputted by the prediction error coding unit 103 is inputted to the bit stream generation unit 104.

The bit stream generation unit 104 performs variable length coding, and so on, on the inputted coded data and, adding information obtained from mode selection unit 109 such as, motion vector information, coding mode information, other header information, and so on, generates a bit stream. However, with regard to macroblocks coded in direct mode, motion vector information is not added to the bit stream.

The remaining macroblocks of the picture B11 are coded through the same process. And, when processing for all the macroblocks of the picture B11 are completed, the coding process for the picture B-12 shall be performed.

As discussed so far, in the moving picture coding method in the present invention, a limitation is set on the number (i.e., how many pictures-worth) of motion vectors to be stored with regard to motion vectors used during coding in direct mode. And, the information (limitation information, as well as storage information as defined within the claims) indicating the addition of this limitation shall be described as header information within a bit stream. Moreover, during coding in the direct mode, in the case where the motion vector to be used shall be stored in a memory, the said motion vector shall be used. On the other hand, in the case where the motion vector to be used shall not be stored in memory, coding can be performed, with the motion vector of the current block as "0", or by using the motion vectors used during the coding of previously coded blocks surrounding the current block, within the same picture.

Through processes such as this, the storage size of motion vectors that need to be stored for coding in direct mode is reduced, and reduction of hardware and software memory size becomes possible. Furthermore, even in the case where a motion vector to be used in coding in direct mode is not available, it is possible to perform coding in direct mode using an alternative method. And, as explained above, since the present invention can be implemented regardless of the picture with a second reference index as "0", there is no need to redefine the setting for a picture with a second reference index as "0", and design complications can be avoided.

Furthermore, although the present embodiment has been explained on the assumption that the coding process for macroblocks is performed in units of 16 horizontal×16 vertical pixels, motion compensation in blocks of 8 horizontal×8 vertical pixels, and the coding of predictive error images of blocks in units of 8 horizontal×8 vertical pixels, the units for the said processes may be of a different pixel size.

Moreover, although in the explanation using FIG. 10 in the present embodiment, the method of determining the motion vector to be used in direct mode where the motion vectors of three previously coded surrounding blocks are to be used is explained, a different value and method may be used as to the number of the said surrounding blocks, and the method of determining the prediction value. For example, a method, using as prediction value, the motion vector of a block located adjacently to the left of the current block, as well as other methods are available.

Note that in the present embodiment, the case where a P-picture uses as reference, any one picture from among three neighboring I-pictures, or P-pictures, which appear ahead in display order is explained. Likewise, the case where a B-picture uses any one picture from among three neighboring I-pictures, or P-pictures, which appear ahead in display order as a forward reference picture, and a single neighboring I-picture or P-picture appearing subsequently in display order, as a backward reference picture, is also explained. However, it is possible for the number of such reference pictures to be different.

Also, although the case wherein a B-picture is not used as a reference picture is explained in the present embodiment, a case where a B-picture is used as a reference picture is possible. In the case where a B-picture is used as a reference picture, since there is a need to store the resultant picture from the local decoding of a B-picture, as a reference picture, into the frame memory 107, the controlling of the switch 114 and the switch 115 by the coding control unit 110 shall be the same as in the case of the coding of a P-picture in the present embodiment. And, even in the case where a B-picture is used as the reference picture, wherein the B-picture shall not be the picture with the second reference index as "0" for other pictures, the motion vectors used during the coding of the B-picture need not be stored into the motion vector storage unit 116. This is because, in the case where a B-picture cannot be the picture with a second reference index as "0", the picture with a second reference index as "0" can only be either an I-picture or a P-picture. Accordingly, in this case, only the motion vectors used during the coding of an I-picture or P-picture need to be stored into the motion vector storage unit 116. In so doing, the motion vectors used in the coding of the picture with a second reference as "0" for the current picture to be coded in direct mode may be used, allowing an improvement in coding efficiency. Here, the decision as to whether the motion vectors used during the coding of a B-picture shall to be stored in the motion vector storage unit 116 or not, may be pre-determined in the coding apparatus-side and decoding apparatus-side. Likewise, the coding apparatus-side may also determine the storage and describe the information in the header section of the bit stream. In the case where the storage is determined by the coding apparatus-side, the determination is done by the coding control unit 110, and the information may be described within a header by bit stream generation unit 104.

In addition, in pre-determining within the coding apparatus-side and decoding apparatus-side, whether the motion vectors used during the coding of a picture shall be stored in motion vector storage unit 116 or not, it is possible not to have the bit stream generation unit 104 describe such determination information within a header.

Furthermore, with regard to the motion vectors to be stored for direct mode, the case where the motion vectors used during the coding of a single reference picture coded immediately before the current picture in coding order is stored, is explained in the present embodiment. However, the storage of motion vectors of reference pictures, differing in number than as described here, is possible.

Moreover, it is possible to assign directly to the decoding apparatus which among the motion vectors shall be stored or not. For example, by designating the picture numbers of the pictures to which the storage or non-storage of their motion vectors will be assigned, within the header of the picture where the storage or non-storage of it's motion vector shall be designated, or within the header of another picture, it is possible to instruct the decoding apparatus as to which pictures' motion vectors are stored and which pictures' motion vectors are not stored. For example, in the case where the reference picture with a second reference index as "0" during the coding of the picture B11 is known to be the picture P10, instructions are given for the motion vectors of the picture P10 to be stored, and for the motion vector of the picture P13 not to be stored. As a result, the motion vector of the picture P10 (the picture with a second reference index as "0") is stored in the motion vector storage unit 116 and, it is possible to use the motion vector of the reference picture with a second reference index as "0" in direct mode. Here, it will be advantageous to describe the information determining which motion vectors are to be retained, as header information within a bit stream. One example is to describe (i.e., as "0", or "1") the information indicating whether the motion vectors for each picture shall be stored or not, within a header in a bit stream. A different example would be to describe (i.e., if not for storage "0", or as accompanying information on a particular picture "3", in a case indicating the need to re-store on the third picture following the particular picture) the information indicating the period for storing motion vectors. With the use of these methods, the flexible management of motion vector storage becomes possible, allowing for improvements in coding efficiency.

Second Embodiment

Figure 11:
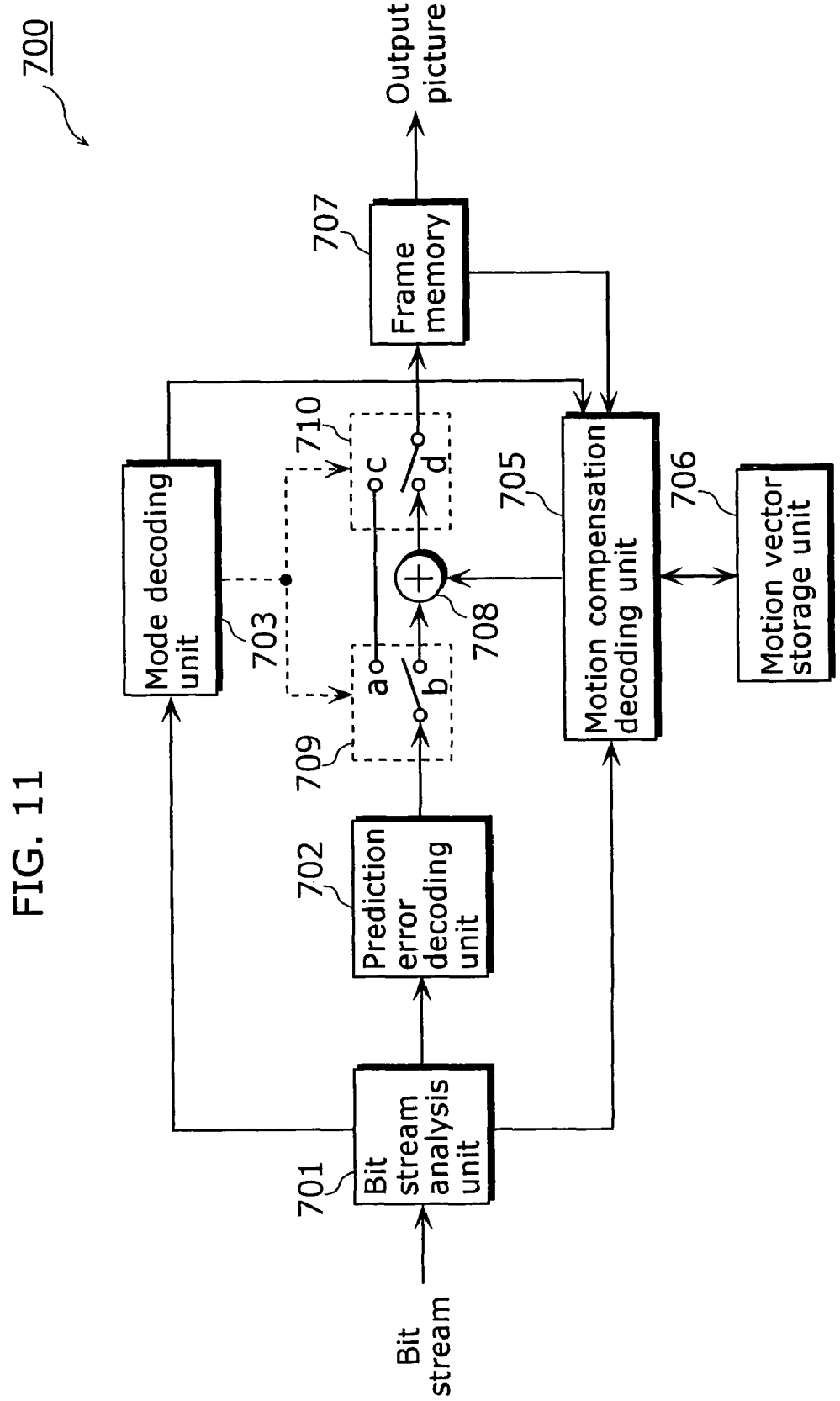
FIG. 11 is a block diagram showing the configuration of the moving picture decoding apparatus in the second embodiment.

A moving picture decoding apparatus 700 in the second embodiment of the present invention will be explained with reference to FIG. 11. FIG. 11 is a block diagram showing the configuration of the moving picture decoding apparatus 700 in the second embodiment. The moving picture decoding apparatus 700 is a moving picture decoding apparatus that stores the motion vectors of reference pictures into the memory according to the motion vector storage method described as header information within a bit stream, and decodes current pictures for decoding. It includes a bit stream analysis unit 701, a prediction error decoding unit 702, a mode decoding unit 703, a motion compensation decoding unit 705, a motion vector storage unit 706, a frame memory 707, an addition unit 708, a switch 709 and a switch 710.

Figure 12A:
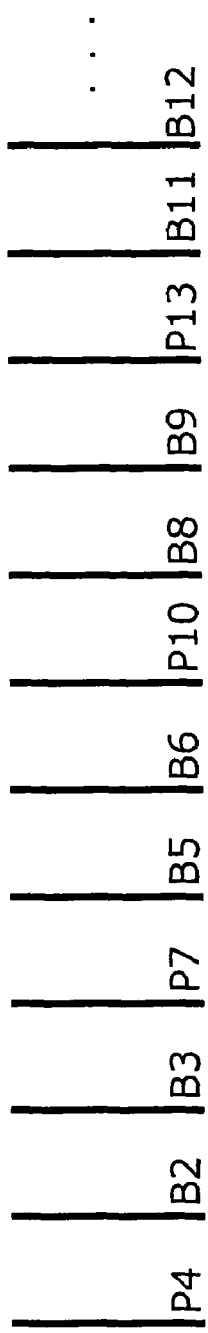
FIG. 12A is a diagram showing the sequence of pictures included within a bit stream.
Figure 12B:
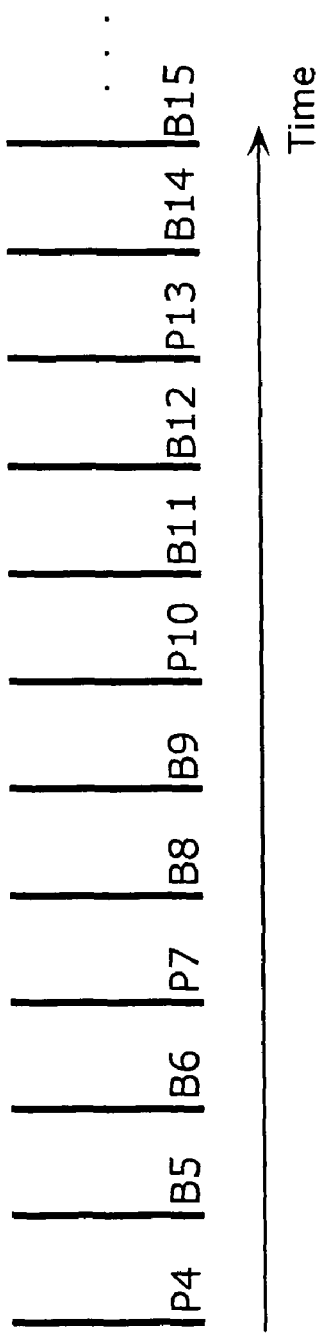
FIG. 12B is a diagram showing the sequence of the pictures shown in FIG. 12A, when reordered into decoding order.

FIG. 12A is a diagram showing the sequence of pictures included within a bit stream. FIG. 12B is a diagram showing the sequence of the pictures shown in FIG. 12A, when reordered into decoding order. The pictures within a bit stream shall be inputted into the moving picture decoding apparatus 700 in the sequence shown in FIG. 12A. Here it is assumed that a P-picture is coded using as reference, any one picture from among three neighboring I-pictures, or P-pictures, appearing ahead in display order, and that a B-picture is coded using any one picture from among three neighboring I-pictures, or P-pictures, appearing ahead in display order, and a single neighboring I-picture or P-picture appearing subsequently in display order, as reference pictures. Hereinafter, the decoding process of a picture P13 and a picture B11 shall be explained in sequence, as cases in point in the decoding of a P-picture and a B-picture. Furthermore, it is assumed that the bit stream analysis unit 701 manages reference indices in the present embodiment.

(Decoding of Picture P13)

Bit streams, being the input for the moving picture decoding apparatus 700, are first inputted into the bit stream analysis unit 701. The bit stream analysis unit 701 extracts various data from the inputted bit stream. Here, various data includes information on coding mode, motion vector information indicating coded motion vectors, and so on. The extracted coding mode information is outputted to the mode decoding unit 703. The extracted motion vector information is outputted to the motion compensation decoding unit 705. Further, the extracted coded prediction error data is outputted to the prediction error decoding unit 702.

The mode decoding unit 703 controls the switch 709 and the switch 710 with reference to the coding mode information extracted from the bit stream. If the coding mode selected is intra picture coding, the mode decoding unit 703 controls the switch 709 to connect to a terminal "a" and the switch 710 to a terminal "c", and if the coding mode is inter picture predictive coding, it controls the switch 709 to connect to a terminal "b" and the switch 710 to a terminal "d".

In addition, the mode decoding unit 703 outputs the mode selection information to the motion compensation decoding unit 705. Hereinafter, the case where the mode selected is inter picture predictive coding shall be explained.

The prediction error decoding unit 702 decodes the inputted coded prediction error data and generates a prediction error image. The prediction error image generated is outputted to the switch 709. Here, as the switch 709 is connected to the terminal "b", the prediction error image is outputted to the addition unit 708.

The motion compensation decoding unit 705 decodes the motion vector information, which is the coded motion vector inputted from the bit stream analysis unit 701. And based on the decoded reference picture number and the motion vector, the motion compensation decoding unit 705 obtains a motion compensation image (block) from the frame memory 707. The motion compensation image, which is generated in this manner, is outputted to the addition unit 708.

Furthermore, in the case where the decoding of a picture used as a reference picture during the decoding of another picture is performed, the motion compensation decoding unit 705 stores the motion vectors into the motion vector storage unit 706. Here, since a P-picture shall be used as a reference picture, the motion vector obtained during the decoding of the picture P13 shall be stored in the motion vector storage unit 706. However, the storage of motion vectors into the motion vector storage unit 706 is controlled based on the header information in the bit stream.

Now, the operation of the motion vector storage unit 706 shall be explained. The number of motion vectors to be stored in the motion vector storage unit 706 is described within a header in a bit stream. This header information is extracted by the bit stream analysis unit 701 and outputted to the motion compensation decoding unit 705. Here, it is assumed that it is described within the header that the motion vectors of only one picture shall be stored. In this case, with regard to the amount of motion vectors to be stored, there is a method for storing the motion vectors of recently decoded reference pictures in coding order. Here, at the start of the decoding of the current picture, it is possible to delete the motion vectors already stored in the motion vector storage unit 706, and each time a motion vector is obtained during the decoding of a block, the motion vectors can be overwritten in sequence.

The inputted prediction error image and motion compensation image are added by the addition unit 708, and a decoded image is generated. The decoded image generated is outputted to the frame memory 707 via the switch 710.

As in the manner stated above, the macroblocks of the picture P13 are decoded one by one. Once all the macroblocks of the picture P13 are decoded, the decoding of picture B11 shall be performed.

(Decoding of Picture B11)

Since the operations of the bit stream analysis unit 701, the mode decoding unit 703, and the prediction error decoding unit 702 are the same as in the decoding of picture P13, the explanation shall not be repeated.

The motion compensation decoding unit 705 decodes the coded motion vectors inputted from the bit stream analysis unit 701, then, obtains a motion compensation image (block) from the frame memory 707, based on the decoded motion vectors.

Here, the case where the coding mode obtained by the mode decoding unit 703 is a direct mode shall be explained. FIG. 8 is a diagram showing the pictures P10 to P13, as arranged in temporal order, where the current block to be decoded is assumed to be the block "a". In the case where the block "a" shall be decoded in direct mode, the motion vector of the block, co-located with the block "a", within the reference picture with a second reference index as "0" shall be used.

First, the case where the reference picture, with a second reference index as "0", is the picture P13 shall be explained. As shown above in the decoding of the picture P13, here it is described within the header that the motion vectors of only one picture shall be stored. And, among the reference pictures, the motion vectors of the reference picture coded immediately before the current picture in decoding order, is stored. Moreover, since in decoding order, the picture P13 is the reference picture decoded most immediately before the picture B11, the motion vectors obtained during the decoding of each block of the picture P13 are stored in the motion vector storage unit 706. As such, during the decoding of the block "a" in direct mode, the motion vector of the block "b" in the picture P13 shall be used. The motion vector "c" is the motion vector used during the decoding of the block "b", and is stored in the motion vector storage unit 706. The motion vector "c" uses the picture P10 as reference. For the block "a", a bi-prediction is performed from the reference pictures, the picture P10 and the picture P13, using the motion vectors generated from the motion vector "c". The motion vectors used in this case of coding of the block "a" are the motion vector "d" from the picture P10, and the motion vector "e" from the picture P13.

Here, the first method in generating the motion vector of the block "a" from the motion vector "c" is the method of scaling using the temporal distance between pictures. Now, if we assume the size of the forward motion vector "d" is MVF, the size of the backward motion vector "e" is MVB, the size of the motion vector "c" is MVP, the temporal distance between the reference picture (the picture P13) with a second reference index as "0" for the current picture (the picture B11), and the picture (the picture P10) used as reference by the block of said reference picture with a second reference index as "0", is TRD, and the temporal distance between the current picture (the picture B11) and the picture (the picture P10) used as reference by the block of the reference picture with a second reference index as "0", is TRB, the motion vector MVF and the motion vector MVB are respectively calculated by Equation 1 and Equation 2.

In addition, the second method for generating the motion vector of the block "a" from the motion vector "c" is the method where scaling is carried out on the motion vector "c" using a predetermined scaling coefficient. The scaling coefficient to be used here may be adjusted on a multi-block basis or a multi-picture basis. Moreover, this scaling coefficient is determined uniquely in a system and may be shared by the coding side and the decoding side. This scaling coefficient is described as header information within a bit stream and may also be used upon extraction by the bit stream analysis unit 701.

Next, the case wherein the reference picture of the second reference index as "0" is a reference picture other than the picture P13 shall be explained. For example, it is possible to have a case where any one among the pictures P10, the picture P7, and the picture P4 as being the reference picture of the second reference index having a value as "0" for the picture B11. For reference pictures other than the picture 13, the motion vectors used during the decoding of each block for these pictures are not stored into the motion vector storage unit 706 because in decoding order, such pictures are not reference pictures decoded most immediately before the picture B11 (in finding out which picture a motion vector stored in the motion vector storage unit 706 belongs to, or which picture the picture having a reference index as "0" is, respective picture numbers are obtained, and a decision is made by comparing the respective picture numbers obtained). As such, during the decoding of the block "a" in direct mode, the motion vectors of the reference picture of the second reference index with a value as "0" cannot be used.

The first processing method in direct mode for this case is a bi-prediction method with the motion vector as "0". For reference pictures in this case, for example, in terms of the picture B11, the picture with a first reference picture as "0" and the picture with a second reference index as "0" can be used. For example, in the case where the picture with a first reference index as "0" is the picture P7, and the picture with a second reference index as "0" is the picture P10, a bi-prediction can be performed for the block "a", as shown in FIG. 9.

In addition, the second processing method in direct mode is a method using the motion vectors of surrounding blocks within the same picture. In this case, as shown in FIG. 10, in the case where the block BL is decoded in direct mode, a method is available wherein the motion vectors used during the decoding of three surrounding blocks, the block BL1, the block BL2, and the block BL3, shall be used to determine the motion vector to be used during the decoding of the block BL. Here, as a method for determining the motion vector to be used in decoding, for example, a method of calculating the median or average of the motion vectors of the three surrounding blocks for each forward motion vector and backward motion vector respectively, is available, among others. Moreover, it is assumed that the motion vectors of the surrounding blocks in this case are stored by the motion compensation decoding unit 705 into the motion vector storage unit 706. The motion compensation image, generated in this manner, is outputted to the addition unit 708.

The inputted prediction error image and motion compensation image are added by the addition unit 708, and a decoded image is generated. The decoded image generated is outputted to the frame memory 707 via the switch 710.

As in the manner stated above, the macroblocks of the picture B11 are decoded one by one. Once all the macroblocks of the picture B11 are decoded, the decoding of picture B12 shall be performed. Furthermore, the decoded pictures are sequentially outputted from the frame memory 707 as output pictures, as shown in FIG. 12B.

As explained so far, in the moving picture decoding method in the present invention, a bit stream is inputted with regard to the motion vectors to be used during coding in direct mode, said bit stream being coded with a limitation set on the number (i.e., how many pictures-worth) of motion vectors to be stored. This bit stream is then decoded. During this decoding, the information indicating the addition of a limitation is extracted from the header information of the bit stream, and decoding is carried out based on the extracted information. In addition, during decoding in direct mode, in the case where the motion vector to be used shall be stored into the memory, such motion vector shall be used. And, in the case where the motion vector to be used shall not be stored into the memory, decoding is performed with either the motion vector being treated as 0, or by using the motion vectors used during the decoding of the surrounding blocks within the same picture.

Through these procedures, the bit stream coded with a limitation set on the number of motion vectors to be used during coding in direct mode, can be decoded accurately. Also, the storage size of the vectors to be stored for direct mode, as well as hardware and software memory size can be reduced. Furthermore, even in the case where a motion vector to be used in direct mode is not available, direct mode may be implemented using an alternative method. And, as explained above, since the present invention can be implemented regardless of the picture with a second reference index as "0", there is no need to redefine the setting for a picture with a second reference index as "0", and design complications can be avoided.

Moreover, although in the explanation using FIG. 10 in the present embodiment, the method of determining the motion vector to be used in direct mode where the motion vectors of three previously decoded surrounding blocks are to be used is explained, a different value and method may be used as to the number of the said surrounding blocks, and the method of determining the prediction value. For example, a method, using as prediction value, the motion vector of a block located adjacently to the left of the current block, as well as other methods, are available.

In addition, although in the present embodiment, the case wherein a P-picture uses as reference, any one picture from among three neighboring I-pictures, or P-pictures, which appear ahead in display order, as well as the case wherein a B-picture uses any one picture from among three neighboring I-pictures, or P-pictures, which appear ahead in display order as a forward reference picture, and a single neighboring I-picture or P-picture appearing subsequently in display order, as a backward reference picture, are explained, it is possible for the number of such reference pictures to be different. Moreover, it is also possible to have a B-picture being used as a reference picture.

Also, although the case wherein a B-picture is not used as a reference picture is explained in the present embodiment, a case where a B-picture is used as a reference picture is possible. In the case where a B-picture is used as a reference picture, the resultant picture from the decoding of a B-picture shall be stored as a reference picture in the frame memory 707. Furthermore, even in the case where a B-picture is used as a reference picture, the motion vectors used during the decoding of a B-picture need not be stored in the motion vector storage unit 706. Whether the motion vectors used during the decoding of a B-picture shall to be stored in the motion vector storage unit 706 or not, may be pre-determined in the coding apparatus-side and decoding apparatus-side, or determined in the coding apparatus-side, where it is also possible to determine this decision through the extraction of information described in the header section of the bit stream.

Furthermore, in the present embodiment, and with regard to the motion vectors to be stored for direct mode, the case where the motion vector used during the decoding of a single reference picture decoded immediately before the current picture in decoding order, is stored is explained. However, the storage of motion vectors of a different number of reference pictures is possible.

Moreover, it is possible to directly assign which ones, among motion vectors, are to be stored or not. For example, by designating the picture numbers of the pictures to which the storage or non-storage of their motion vectors will be assigned, within the header of the picture where the storage or non-storage of it's motion vector shall be designated, or within the header of another picture, which pictures' motion vectors shall be stored and which pictures' motion vectors shall not be stored are assumed to be designated within the header. Accordingly, such instruction information may be extracted from the header information within a bit stream. Now, in the case where it is instructed that the motion vector of the picture P10 is to be stored and the motion vector of the picture P13 is not to be stored, the motion vectors of the picture P10 shall be stored into the motion vector storage unit 706, at the point of decoding of the picture B11. Here, in the decoding of the picture B11, assuming that the reference picture with a second reference index as "0" is the picture P10, it is possible to use the motion vectors used during the decoding of the reference picture with a second reference index as "0" in the direct mode. With the use of such methods, the more flexible management of motion vector storage becomes possible.

Moreover, it is possible to store the motion vectors used during the decoding, by the decoding apparatus, of a P-picture coded by the coding apparatus immediately before the current picture in stream order, namely, in coding order, from among reference pictures referred to by the picture containing the current block to be decoded. However, as mentioned above, it is also possible to store the motion vectors used during the decoding of the P-picture immediately preceding or a P-picture preceding the current picture in display order, among reference pictures referred to by the picture containing the current block to be decoded. The decoded pictures shall be outputted sequentially from the frame memory 707 as output pictures, after being reordered into display order, based on the times of the pictures stored in the frame memory 707. In addition, the time carried by the respective pictures may be obtained, for example, from the time information outputted by a system for transmitting the pictures via a transmission channel for packets, or the like, or from the time information within the format for multiplexing video streams and audio streams, or from the time information within a video stream format. Moreover, such time information may either be the absolute time identifying the time of each picture or the relative time identifying the temporal relation between pictures.

In this way, the motion vector used during the decoding of P-picture immediately preceding or a P-picture preceding the current picture in display order from among reference pictures referred to by a picture containing the current block to be decoded shall be stored and, by storing the motion vector used during the decoding of a reference picture temporally near the picture containing the current block to be decoded, the possibility of improving the accuracy of motion compensation is increased.

Third Embodiment

Figure 13:
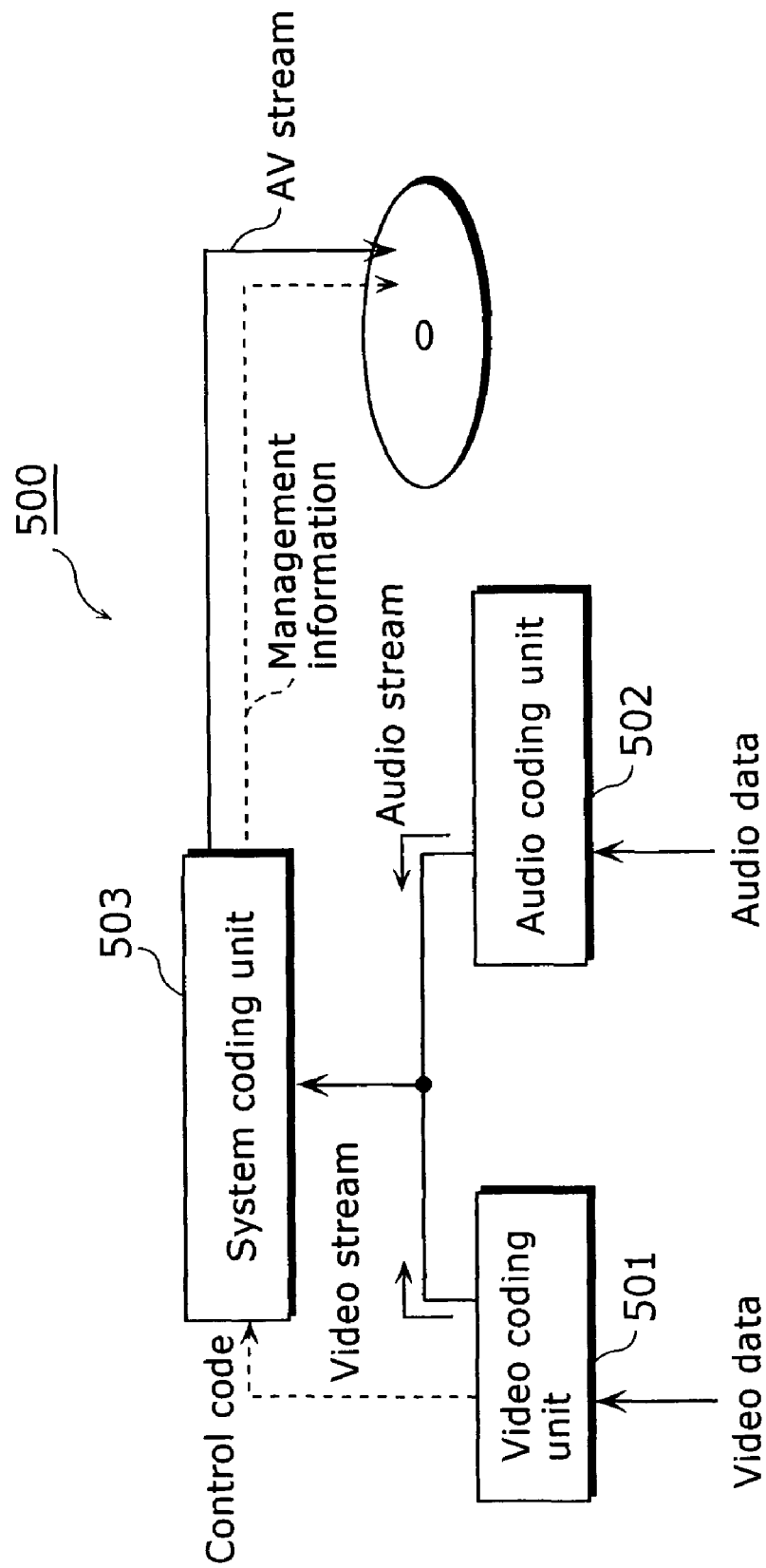
FIG. 13 is a block diagram showing the outline configuration of a recording apparatus, for recording onto a recording medium such as DVD, the management information for managing the reproduction of data from the recording medium and coded Audio Visual (AV) data.

In the aforementioned first embodiment, the case where the information regarding the storage size of motion vectors is described in a header within a bit stream is discussed. However, the description of such information should not be limited to the header within a bit stream. For example, such information may be described in the management information, not included within a bit stream. Hereinafter, the moving picture coding apparatus, as well as the recording apparatus in the third embodiment of this present invention shall be explained, with reference to FIG. 13 to FIG. 17. FIG. 13 is a block diagram showing the outline configuration of a recording apparatus 500, for recording onto a recording medium such as DVD, the management information for managing the reproduction of data from the recording medium and coded Audio Visual (AV) data. The recording apparatus 500 is a recording apparatus that codes and records video data accompanied by sound onto a recording medium, and includes a video coding unit 501, an audio coding unit 502, as well as a system coding 503. The video coding unit 501 is a moving picture coding apparatus for coding inputted video data. The audio coding unit 502 is an audio coding apparatus for coding inputted audio data. The system coding unit 503 multiplexes a video stream and an audio stream, to generate an AV stream which is recorded on a recording medium. In addition, after recording the AV stream, the system coding unit 503, following input from an input unit, or the like, not shown in the diagram, generates management information, and records the management information generated onto the recording medium, on an area other than where the AV stream is recorded.

Figure 14:
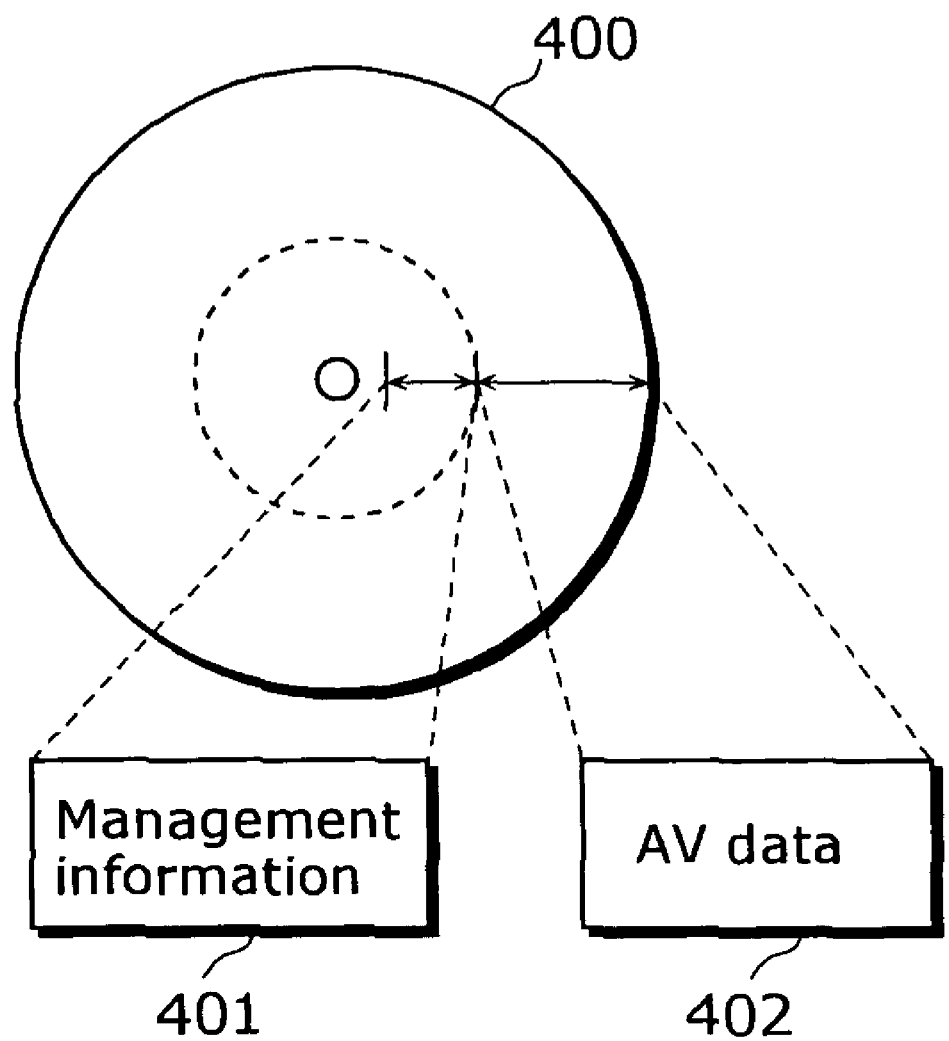
FIG. 14 is an illustration showing an example of a recording medium 400 such as DVD, on which the management information and Audio Video (AV) streams generated by the system coding unit shown in FIG. 13 are recorded.

Hereinafter, the operation of the recording apparatus 500, as configured above, shall be explained. The video data inputted into the recording apparatus 500 is inputted into the video coding unit 501, and the inputted audio data is inputted into the audio coding unit 502. The video data inputted into the video coding unit 501 and the audio data inputted into the audio coding unit 502 are coded in real-time and in synchronization between the video coding unit 501 and the audio coding unit 502. The bit stream generated from the video coding unit 501 is outputted, as a video stream, to the system coding unit 503. The bit stream coded by the audio coding unit 502 is outputted, as an audio stream, to the system coding unit 503. The system coding unit 503 multiplexes the video stream inputted from the video coding unit 501 and the audio stream inputted from the audio coding unit 502 and generates an AV stream. The AV stream generated is recorded, in real-time, onto a recording medium. When the recording of the AV stream onto the recording medium is completed, the system coding unit 503 reads out the control codes generated by the video coding unit 501 and generates management information which includes the control codes read out. The system coding unit 503 then records this management information onto the recording medium, on an area different from where the AV stream is recorded. FIG. 14 is an illustration showing an example of a recording medium 400 such as DVD, in which the management information and Audio Video (AV) streams generated by the system coding unit 503, shown in FIG. 13, are recorded. As shown in FIG. 14, data is recorded concentrically within the recording medium 400, with the management information 401 and AV data 402 being recorded on different areas within the recording medium 400. In general, the AV data 402 is recorded in an area towards the outer radius, and the management information 401, on an area towards the inner radius of the recording medium 400.

Figure 15:
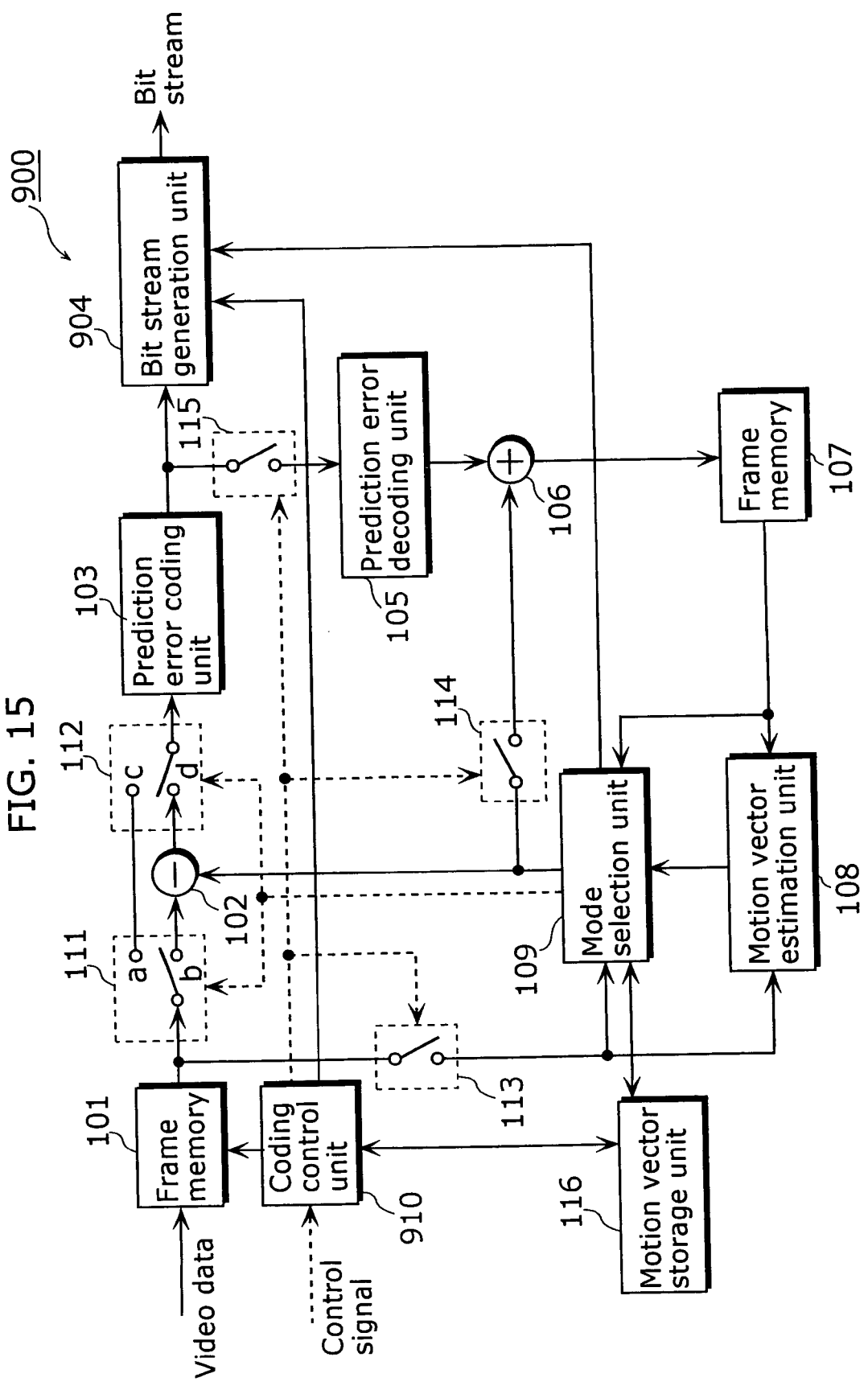
FIG. 15 is a block diagram showing the configuration of a moving picture coding apparatus included within the recording apparatus shown in FIG. 13.

FIG. 15 is a block diagram showing the configuration of a moving picture coding apparatus 900 included within the recording apparatus 500 shown in FIG. 13. The moving picture coding apparatus 900 corresponds to the video coding unit 501 indicated in FIG. 13. The moving picture coding apparatus 900 is a moving picture coding apparatus that outputs, on a different timing, and as different data from the bit stream mentioned earlier, control codes (control information as defined within the claims) which indicate that a limitation is set on the data to be stored within the motion vector storage unit. The moving picture coding apparatus 900 includes a frame memory 101, a difference calculation unit 102, a prediction error coding unit 103, a prediction error decoding unit 105, an addition unit 106, a frame memory 107, a motion vector estimation unit 108, a mode selection unit 109, switches 111 to 115, a motion vector storage unit 116, a bit stream generation unit 904, as well as a coding control unit 910. In the same diagram, since the structural components that are the same as those in the moving picture coding apparatus 100 shown in FIG. 5 are already explained, the same reference numbers shall be assigned and the explanations shall not be repeated. However, here, unlike in the first embodiment, during the coding of a B-picture, the motion vector estimation unit 108 searches motion vectors using as reference four I-pictures, or P-pictures, appearing ahead of the current picture to be coded in display order, as well as one I-picture, or P-picture appearing after the current picture to be coded in display order. After performing variable length coding on the quantized result from prediction error coding unit 103, the bit stream generation unit 904 converts the variable length codes into the coded bit stream format for output, attaching added information such as header information which describes the related information of the coded prediction error, and generates a bit stream. Furthermore, the bit stream generation unit 904 associates the control codes generated by the coding control unit 910 with the bit streams and holds it. The bit stream generation unit 904 outputs the control codes on a different timing from the bit stream. More specifically, the control codes are outputted according to external output instructions (i.e., the system coding unit 503 of the recording apparatus 500 shown in FIG. 13). A control signal for synchronization is inputted into the control coding unit 910 from an external source, in order to code video data and audio data in real time, in synchronization with the audio coding unit 502. The coding control unit 910 controls the mode selection unit 109 to store in the motion vector storage unit 116 only the motion vectors of the reference picture appearing immediately after the current picture to be coded in display order, in other words, the motion vectors of the reference picture coded immediately before the current picture to be coded. The coding control unit 109 then generates control codes indicating the setting of some limitation on the data to be stored within the memory. The coding control unit 910 may generate control codes at any timing, although generation at the start, or immediately after, the coding process is desirable. In addition, the coding control unit 910 may store the control codes internally, beforehand.

Figures 16A, 16B:
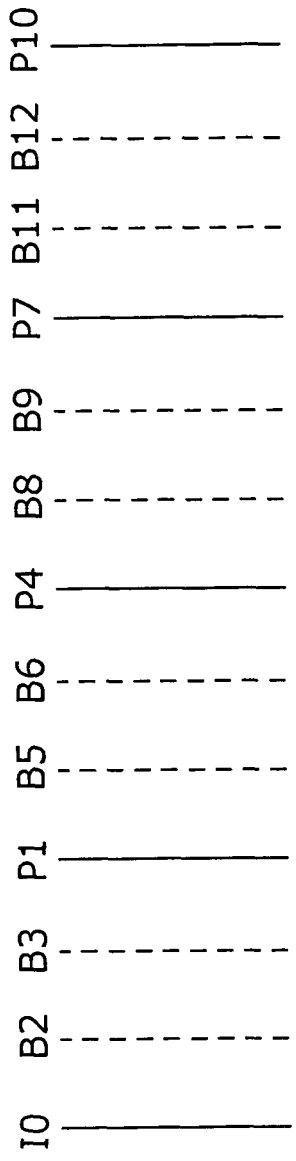
FIG. 16A is a diagram showing pictures inputted in display order, and their respective coding order.
FIG. 16B is a diagram showing the reference pictures and motion vectors stored into the memory following the coding of each picture in the existing MPEG-4 format.
Figures 17A, 17B:
FIG. 17A is a diagram showing pictures inputted in display order, and their respective coding order.
FIG. 17B is a diagram showing the reference pictures and motion vectors stored into the memory following the coding of each picture in the moving picture coding apparatus shown in FIG. 15.

Hereinafter, the storage of reference pictures, as well as motion vectors into the memory by the moving picture coding apparatus 900, as configured above, shall be explained in comparison with the existing MPEG-4 coding format. FIG. 16A is a diagram showing pictures inputted in display order, and their respective coding order. FIG. 16B is a diagram showing the reference pictures and motion vectors stored into the memory following the coding of each picture in the existing MPEG-4 format. FIG. 17A is a diagram showing pictures inputted in display order, and their respective coding order. FIG. 17B is a diagram showing the reference pictures and motion vectors stored into the memory following the coding of each picture in the moving picture coding apparatus 900 shown in FIG. 15. Here, in either case, it is assumed that B-pictures shall not be referred to by other pictures, and that only I-pictures and P-pictures shall be referred to by other pictures. In other words, I-pictures and P-pictures may become the reference pictures of other pictures but B-pictures cannot become the reference pictures of other pictures. Moreover, FIG. 17A and FIG. 16A are identical diagrams.

In FIG. 17A and FIG. 16A, each picture included in the inputted pictures is represented by a vertical line. B-pictures, which will not be referred to by other pictures, are represented by broken lines. In addition, the "B", as well as "P", assigned to each picture indicates the picture type, and the number on the right indicates the coding order of each picture. In other words, as shown in FIG. 16A and FIG. 17A, pictures within the inputted pictures are inputted and displayed in the following order: I0→B2→B3→P1→ B5→B6→ P4→B8→ B9→P7→B11→B12→P10. In contrast, since a B-picture refers to a picture appearing subsequently in display order, before coding a B-picture, an I-picture or a P-picture appearing after the (current) B-picture in display order, must be coded first. Accordingly, the pictures within the inputted pictures shall be coded in the following order: I0→P1→B2→B3→P4→B5→B6 P7→B8→B9→P10→ B11→B12. Assuming that, in display order, a B-picture precedes the picture I0, after the coding of the picture I0, such B-picture shall be coded prior to coding the picture P1.

In the existing MPEG-4, the pixel values of the two reference pictures coded immediately before the current picture to be coded, and the motion vectors used for the motion compensation of such reference pictures, shall be stored within the memory. In general, as shown in FIG. 16B, the pixel values of the two reference pictures coded immediately before the current picture to be coded, and the motion vectors of one reference picture coded later, among the two reference pictures mentioned, are stored within the memory. In addition, in the existing MPEG-4, a P-picture is coded using a single, preceding reference picture appearing immediately before it in display order, as reference, while in coding a B-picture, a single preceding reference picture appearing immediately before, and a single subsequent reference picture appearing immediately after, the current picture to be coded in display order, are both used as reference pictures. For example, when the current picture to be coded is the picture B6, the two reference pictures coded immediately before the current picture to be coded are the picture P1 and the picture P4, with the reference picture coded later among the two being the picture P4. Accordingly, when the current picture to be coded is the picture B6, the pixel values of the picture P1, and the picture P4, and the motion vectors obtained from the coding of the picture P4, are stored. The picture B6 shall be coded using the picture P1 and picture P4, stored within the memory, as reference pictures. The picture P1 is the reference picture immediately preceding the picture B6 in display order, and the picture P4 is the reference picture immediately following the picture B6 in display order. Furthermore, during the coding in direct mode of a current block to be coded within the picture B6, the motion vectors of a block, co-located with the current block to be coded, within the reference picture immediately following the picture B6 in display order (in other words, the picture P4), are stored within the memory, and shall be used to perform motion compensation. However, since the picture B6 is not referred to by other pictures, its pixel values, as well as motion vectors are not stored within the memory, and the memory is not updated.

When the picture P7 is the current picture to be coded, it is coded using either the picture P1 or the picture P4, stored within the memory, as a reference picture. Since the picture P7 may be referred to by other pictures, its pixel values and motion vectors shall be stored within the memory. In this instance, the pixel values and motion vectors stored within the memory are updated in accordance with the coding and decoding of the picture P7. Among the pixel values of the picture P1 and the picture P4 stored within memory prior to the coding of the picture P7, the pixel values of the older picture, the picture P1, are removed, and the new pixel values of the picture P7 are stored. In addition, the motion vectors of the picture P4 stored within the memory are removed, and the new motion vectors of the picture P7 are stored.

When the picture B8 is coded, two pictures, the picture P4 appearing before the picture B8, and the picture P7 appearing after the picture B8 in display order, are referred to. When a current block within the picture B8 is to be coded in direct mode, motion compensation is performed using the motion vector of a block, co-located with the current block, within the reference picture immediately following the picture B8 in display order (the picture P7). The pixel values of the two pictures (the picture P4, as well as the picture P7) referred to by the picture B8, and the motion vector of the picture P7 for use in direct mode, are stored within the memory. In addition, since the picture B8 is not referred to by other pictures, the data within the memory is not updated.

In coding the picture B9, as in the coding of the picture B8, it is coded using the two pictures stored within the memory as reference pictures. Likewise, when coding a current block within the picture B9 in direct mode, it is also coded using the motion vectors of the picture P7 stored within the memory.

In this manner, by storing into the memory the pixel values of the two reference pictures, and the motion vectors of only the reference picture appearing subsequently among the two reference pictures mentioned above, even during the coding in direct mode of a current block within a B-picture, the coding can be performed without problems, in the existing MPEG-4. However, in the MPEG-4 format, since the reference pictures are fixed or few in number, the search area for finding a reference block that further improves coding efficiency for the current block is limited. As a result, coding efficiency is restricted, and satisfying the demands for low bit rate, high picture quality moving picture transmission becomes difficult. For this reason, in the H.26L standard, the number of reference pictures, being the search area, is increased, and the reference pictures actually used as reference by each current block are set to be identified by reference indices. Then, as shown in FIG. 3, for each current block within a B-picture, the first reference index and second reference index, identifying the reference pictures used as reference, are set to be described within a bit stream. On the other hand, the assignment of reference indices for each reference picture, as previously explained, is set by default, to assign the value "0" to the reference picture appearing immediately before and the reference picture appearing immediately after the current picture to be coded in display order, and to assign reference indices increasing in value as the reference picture appears further off in display order, from the current picture to be coded. In this default setting, the reference index with a smaller value may be used to identify the reference picture that is closer in display order, to the picture containing the current block. However, the value of the reference index used in identifying reference pictures increases as the reference picture appears further away in display order, from the picture containing the current block. As a result, in the case where reference pictures appearing far away in display order, from the picture containing the current block are referred to by a large number of current blocks, within the default settings, reference indices with large values shall be described within the bit streams of a large number of blocks, thereby increasing the data size of bit streams, which is not desirable. Accordingly, remapping is accepted to allow the assignment of smaller reference index values to reference pictures that better increase coding efficiency for each picture.

In the present embodiment, a P-picture uses as reference pictures, four I-pictures or P-pictures appearing ahead of the current picture to be coded in display order, and a B-picture uses as reference, four I-pictures or P-pictures appearing ahead of the current picture to be coded in display order, and a single I-picture or P-picture appearing after the current picture to be coded in display order. As shown in FIG. 17B, for the coding of a B-picture in the present embodiment, the pixel values of the five reference pictures coded immediately before each picture, are stored within the memory, and the motion vector of only the reference picture coded immediately before the current picture to be coded is stored. For example, every time the motion vector estimation unit 108 estimates motion vectors for each current block in the current picture to be coded, the mode selection unit 109 temporarily stores the estimated motion vectors in an area different from the motion vector storage unit 116 where other motion vectors are already stored. In the case where the subject current picture to be coded is a P-picture, the mode selection unit 109 overwrites the previously stored motion vectors with the motion vectors stored temporarily in a different storage area. In addition, at the start of coding for the next current block to be coded, the motion vectors of a new current picture to be coded are overwritten into the storage area where the motion vectors of the most recently coded picture are temporarily stored, with the overwritten motion vectors being stored temporarily. However, in the case where the subject current picture to be coded is not a P-picture, the mode selection unit 109 deletes the motion vectors temporarily stored in the motion vector storage unit 116 after coding of all blocks of a current picture to be coded, for example. The method for deleting the motion vectors temporarily stored within the motion vector storage unit 116 may be a method that erases motion vectors stored temporarily from the motion vector storage unit 116, or a method that directly overwrites the motion vectors of the next current picture to be coded into the storage area where motion vectors are temporarily stored. Through these methods, the mode selection unit 109 controls the storage size of motion vectors stored in the motion vector storage unit 116. Furthermore, in the coding of a B-picture in direct mode, in the case where the motion vectors of the second reference index having a value as "0" is not stored in the memory, the method already explained in the first embodiment shall be used to perform motion compensation.

In FIG. 17B, for example, in the case where the current picture to be coded is the picture B6, the picture I0, the picture P1, and the picture P4, are coded first before the picture B6. Accordingly, at the time the picture B6 is coded, the pixel values of the picture I0, the picture P1, as well as the picture P4, are stored within the memory. In addition, if there are I-pictures or P-pictures coded prior to the picture I0, the pixel values of the two pictures coded immediately before the picture I0 are stored within the memory. The picture B6 is coded, using as reference, two reference pictures from among the reference pictures stored within the memory. Moreover, the motion vectors of the reference picture coded immediately before the picture B6, namely the picture P4, are stored within the memory. In the case where a current block within the picture B6 is coded in direct mode, if the reference picture with the second reference index as "0" for the picture B6 is the picture P4, the mode selection unit 109 performs motion compensation on the current block using the motion vectors stored within the memory. Furthermore, if the reference picture with the second reference index as "0" is not the picture P4, for example, the motion vectors for the current block is assumed as "0", the reference picture with the first reference index value as "0" for the picture B6, and the reference picture with the second reference index as "0" for the picture B6, shall be used as reference and bi-predictive motion compensation is performed.

When the current picture to be coded is the picture P7, the picture P7 is coded using as reference pictures, the three reference pictures coded immediately before, and stored within the memory (the picture I0, the picture P1, and the picture P4). Since the picture P7 may be referred to by other pictures, following the coding and decoding of the picture P7, the pixel values of the oldest reference picture stored within the memory are removed, and the new pixel values of the picture P7 are stored. In addition, the motion vectors of the picture P4 stored within the memory are removed, and the new motion vectors for the picture P7 are stored.

Next, when the picture B8 is coded, two out of the five reference pictures stored within the memory are used as reference pictures, and the coding of the picture B8 is performed. In addition, in the case where a current block within the picture B8 is coded in direct mode, if the reference picture with the second reference index as "0" for the picture B8 is the picture P7, the mode selection unit 109 uses the motion vectors of the picture P7 stored within the memory to perform motion compensation for the current block. If the reference picture with a second reference index as "0" for the picture B8 is not the picture P7, the motion vectors of the current block is assumed as "0", and two reference pictures (the picture P4 and the picture P7), the reference picture with the first reference index value as "0" and the reference picture with the second reference index as "0" for the picture B6, shall be used as reference, and bi-predictive motion compensation is performed. Since the picture B8 is not referred to by other pictures, it is not stored in memory and the data within the memory is not updated. In the case where the picture B9 is coded, the coding shall be the same as in the case of coding for the picture B8.

In this manner, according to the aforementioned third embodiment, by limiting the motion vectors to be stored within the memory for the coding of a B-picture in direct mode to the motion vectors of the single reference picture coded immediately before the B-picture, it is possible to provide a moving picture coding apparatus that enables the improvement of coding efficiency while controlling the memory capacity required for the coding of moving pictures.

Figure 18:
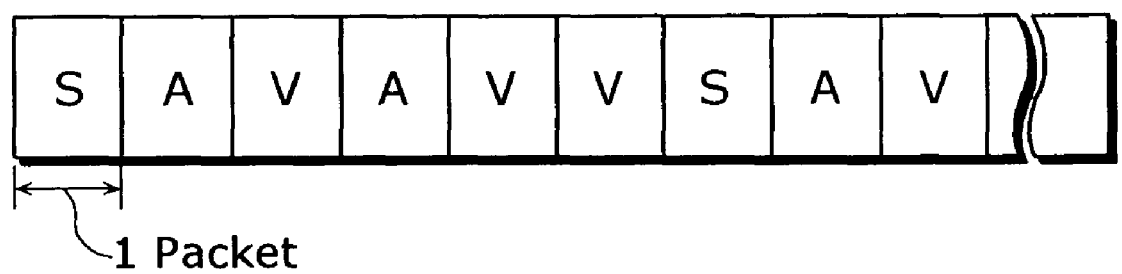
FIG. 18 is a diagram showing an example of a data stream sent out during digital television broadcasts.

Furthermore, in the above-mentioned third embodiment, the moving picture coding apparatus 900 generates video data, as well as control codes for recording on the recording medium 400. However, this may not be limited to generation for recording on a recording medium. For example, the generation of video streams distributed for digital television broadcasts, and so on, and management information for the management of the reproduction of such video streams, is also possible. FIG. 18 is a diagram showing an example of a broadcasting packet sent out during digital television broadcasts. In the same diagram, parts represented by an "S", "A", and "V", indicate management information, audio data, and video data packets, respectively. In digital television broadcasts, coded data such as video streams, as well as audio streams, are partitioned into packets of appropriate data lengths (i.e., 188 bytes for an MPEG-2 transport stream), and transmitted on a per-packet basis. Audio data packets, as well as video data packets are inserted throughout with management information packets, and transmitted. The bit streams generated by the moving picture coding apparatus 900 are transmitted as video data packets, like those mentioned above. Moreover, the control codes generated by the coding control unit 910 are described within the management information and transmitted as management information packets. In this manner, by transmitting the bit streams generated by the moving picture coding apparatus 900 as video data packets, and transmitting the control codes generated by the coding control unit 910 as management information packets, the reproduction of moving pictures of high picture quality and high coding efficiency while economizing on memory usage becomes possible, even in a reproduction apparatus such as a set top box (STB) and a digital television that receives digital television broadcasts and reproduces video data.

Furthermore, in the above-mentioned third embodiment, control codes are explained under the assumption that they are information indicating that some limitation has been set on the data to be stored within the memory. In the present invention, however, control codes are not limited to being such, and may also be information merely indicating that a bit stream generated, was coded under some form of limitation. In addition, the control codes may also be flags, or the like, indicating, for example "no limitations" when the value is "0", and "with limitations" when the value is "1". Moreover, the control codes may also be codes indicating "with limitations", in the presence of descriptions in a specified area within management information, or "no limitations", in the absence of such descriptions. Of course, it goes without saying that, by referring to a table stored in the memory beforehand, the control codes may also be ones that enable the identification of multiple types of processing, such as the presence of some limitation set on data to be stored in memory, or the number of P-pictures coded immediately before the current picture to be coded, whose motion vectors are to be stored within the memory, and so on.

Fourth Embodiment

Figure 19:
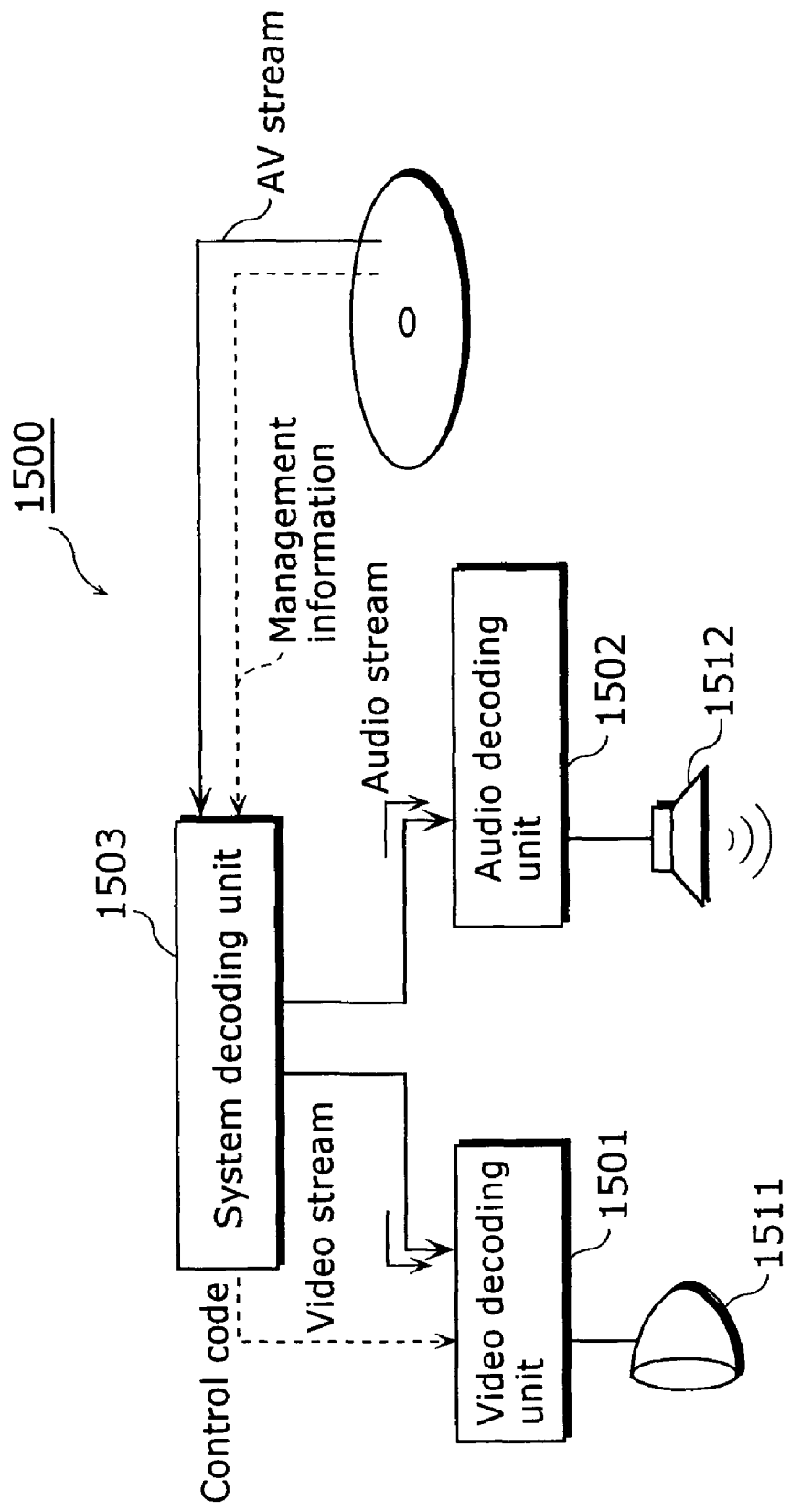
FIG. 19 is a block diagram showing the outline configuration of a reproduction apparatus in the fourth embodiment.

Hereinafter, a reproduction apparatus for reproducing an AV stream recorded on a recording medium, as well as a moving picture decoding apparatus included in the said recording apparatus shall be explained. FIG. 19 is a block diagram showing the outline configuration of a reproduction apparatus 1500 in the fourth embodiment. The reproduction apparatus 1500 is a reproduction apparatus that reads out a coded AV stream, and management information for managing the reproduction of the AV stream, from the recording medium 400, and reproduces video data accompanied by sound. It includes a video decoding unit 1501, an audio decoding unit 1502, a system decoding unit 1503, a monitor 1511, as well as a speaker 1512. The system decoding unit 1503 reads out management information and a coded AV stream from the recording medium, and extracts control codes from the management information for output to the video decoding unit 1501. In addition, the video stream and audio stream read out are separated and outputted to the video decoding unit 1501 and the audio decoding unit 1502, respectively. In the case where it is indicated in the control codes obtained from the system decoding unit 1503 that a limitation has been set for the data to be stored within the memory, during the decoding of the video stream obtained from the system decoding unit 1503, the video decoding unit 1501 stores into the memory, the motion vectors of the single reference picture decoded immediately before the current picture to be decoded, and decodes the current picture to be decoded. The video decoding unit 1501 decodes each picture included in the video stream, outputs each decoded picture in display order, and outputs a video signal for displaying a moving picture to the monitor 1511. The audio decoding unit 1502 decodes the audio stream obtained from the system decoding unit 1503, generates an audio signal, and outputs the generated audio signal to the speaker 1512. The monitor 1511 displays the video signal generated by the video decoding unit 1501. The speaker 1512 reproduces the audio signal generated by the audio decoding unit 1502 in the form of sound.

Figure 20:
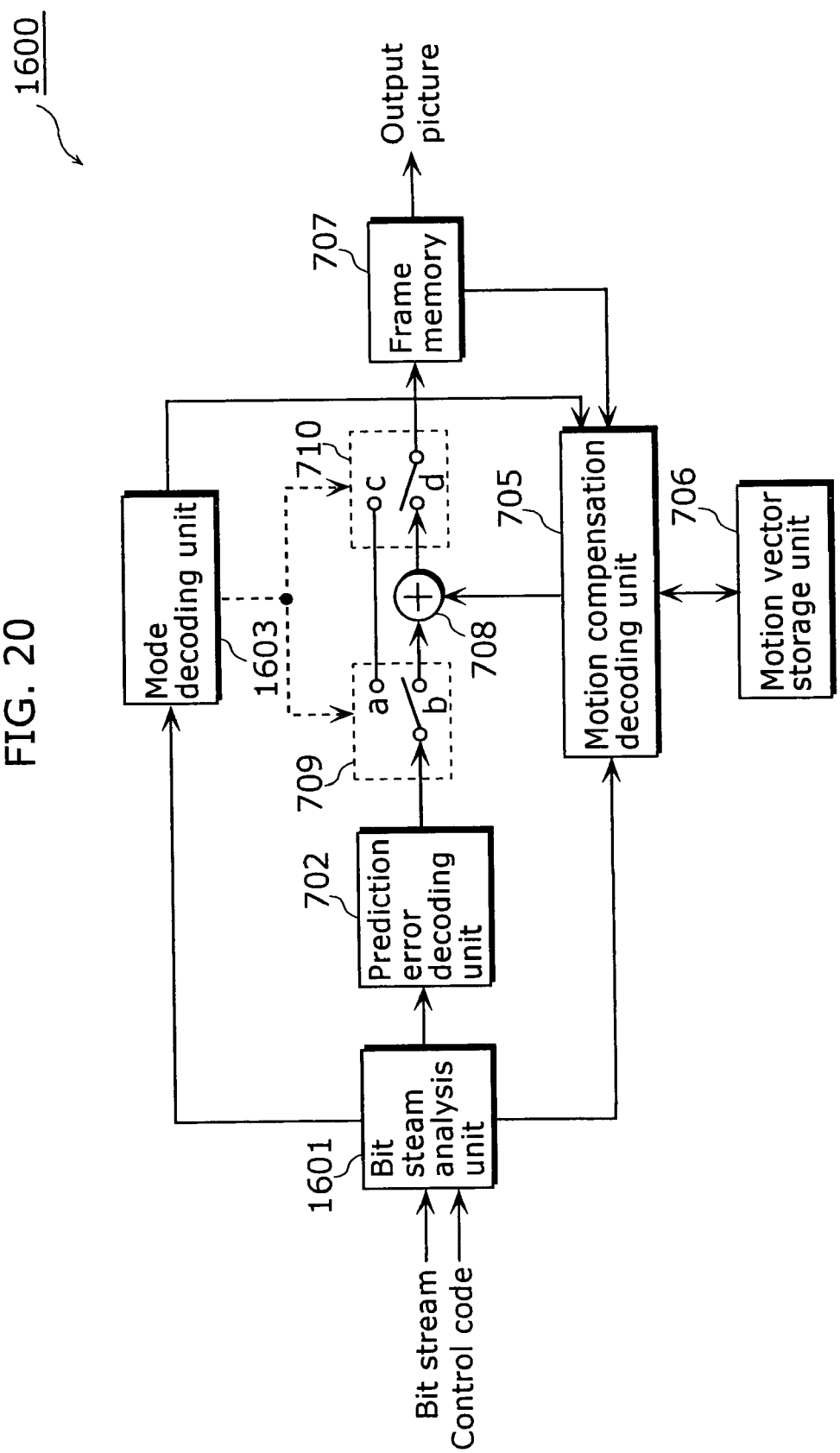
FIG. 20 is a block diagram showing the configuration of a moving picture decoding apparatus that corresponds to the video decoding unit shown in FIG. 19.

FIG. 20 is a block diagram showing the configuration of a moving picture decoding apparatus 1600 that corresponds to the video decoding unit 1501 shown in FIG. 19. The moving picture decoding apparatus 1600 is a moving picture decoding apparatus that, in the case where it is indicated in the control codes inputted from an external source that a limitation has been set for the storage of data within the memory, stores into the memory the motion vectors of the single reference picture decoded immediately before the current picture to be decoded, and decodes a bit stream. It includes a prediction error decoding unit 702, a motion compensation decoding unit 705, a motion vector storage unit 706, a frame memory 707, an addition unit 708, a switch 709, a switch 710, a bit stream analysis unit 1601, as well as a mode decoding unit 1603. In the same diagram, since the structural components that are the same as those in the moving picture decoding apparatus 700 shown in FIG. 11 are already explained, the same reference numbers shall be assigned and the explanations shall not be repeated. The bit stream analysis unit 1601 outputs control codes inputted from an external source, to the mode decoding unit 1603. The bit stream analysis unit 1601 extracts mode selection information, motion vector information, and so on, from an inputted bit stream. It outputs the extracted mode selection information to the mode decoding unit 1603, and the motion vector information to the motion compensation decoding unit 705. In addition, it outputs prediction error coding data to the prediction error decoding unit 702. The mode decoding unit 1603 controls the motion compensation decoding unit 705 to store into the motion vector storage unit 706, the motion vectors of the single reference picture decoded immediately before the current picture to be decoded, in the case were it is indicated in the control codes inputted from the bit stream analysis unit 1601, that a limitation has been set for the data to be stored within the memory, or in the case where it is indicated that the inputted video stream was coded under some form of limitation.

For the moving picture decoding apparatus 1600, the number of motion vectors to be stored in the motion vector storage unit 706 and the number of pixel values to be stored into the frame memory 707, shall be the same as the example shown in FIG. 17B.

As described above, with the moving picture decoding apparatus 1600 in the fourth embodiment, even in the case where a video stream recorded on a recording medium is decoded, the effect of being able to decode a bit stream with a high coding efficiency is achieved, while economizing on the memory resources of a moving picture decoding apparatus.

In addition, in the above-mentioned fourth embodiment, the case where the moving picture decoding apparatus 1600 decodes a video stream recorded on a recording medium is explained. However, in the present invention, it is not limited as such. The moving picture decoding apparatus in the present invention may also decode a video stream within a broadcast packet distributed for digital television broadcasts. In this case, the moving picture decoding unit 1600 is included in a digital television (DTV) or STB, and so on, that receive digital television broadcasts, for example. The broadcast packet shown in FIG. 18 is received by DTV, STB, and so on, and is separated into individual management information, audio data, as well as video data packets. From the separated management information, control codes indicating that some limitation has been set on the data to be stored within the memory, is further extracted and inputted to the moving picture decoding apparatus 1600. In addition, the video streams and audio streams extracted from each packet are inputted to the moving picture decoding apparatus 1600 and audio decoding apparatus, and decoded synchronously, in real time. Since the configuration, as well as the operation of such moving picture decoding apparatus 1600 is the same as that of the moving picture decoding apparatus 1600 shown in FIG. 20, the explanation shall not be repeated.

As described above, with the moving picture decoding apparatus 1600 in the present embodiment, even in the case where a video stream within a broadcast packet distributed for digital television broadcasts, and the like, is coded, the effect of being able to decode a bit stream with a high coding efficiency is achieved, while economizing on the memory resources of a moving picture decoding apparatus.

Furthermore, even in the above-mentioned fourth embodiment, control codes shall not be limited to the case where a limitation being set for data to be stored within memory is indicated. They may also just be information merely indicating that a bit stream generated, was coded under some form of limitation. Moreover, these control codes may also be flags, or the like, indicating, for example "no limitations" when the value is "0", and "with limitations" when the value is "1". Moreover, these control codes may also be codes indicating "with limitations", in the presence of descriptions in a specified area within the management information, or "no limitations", in the absence of such descriptions. Of course, it goes without saying that, by referring to a table stored in the memory beforehand, the control codes may also ones that enable the identification of the presence of some limitation set on data to be stored in memory, or the number of P-pictures coded immediately before the current picture to be coded, whose motion vectors are to be stored within the memory, and so on.

Fifth Embodiment

Each picture, composing a moving picture, signifies a single unit for coding that implies both a frame and a field. In the previously mentioned first to fourth embodiments, the case where all pictures are in the frame structure is explained. However, even in the case where pictures are handled on a per-field basis, the same effect can be attained by applying the invention explained above. Hereinafter, in the case where the method explained in the aforementioned embodiment is applied to interlaced pictures, an embodiment, different from the previously mentioned first to fourth embodiments, shall be considered. Here, an interlaced picture is a picture where one frame is constructed from two fields with different times (time stamps). In the coding and decoding of an interlaced picture, it is possible to process a single frame directly as a frame, or as two fields, or to process respective blocks within a frame, in the frame structure or field structure.

Furthermore, whether each picture shall be coded in the frame structure or field structure may, for example, be decided on adaptively by the coding control unit 110, shown in FIG. 5. In determining whether to code in the frame structure or field structure, a method exists, for example, where the variance of pixel values within a picture are obtained by the frame structure and field structure, with the structure with the smaller variance being selected. Moreover, although a method in which each picture is coded either in the frame structure or field structure, on a per-block basis may also be considered, the case of switching between frame structure and field structure, on a per-picture basis, shall be explained here. First, the assignment of picture numbers and reference indices in the case where pictures in the field structure are included in a moving picture shall be explained, after which, specific explanation of the fifth embodiment shall be done.

Figure 2A:
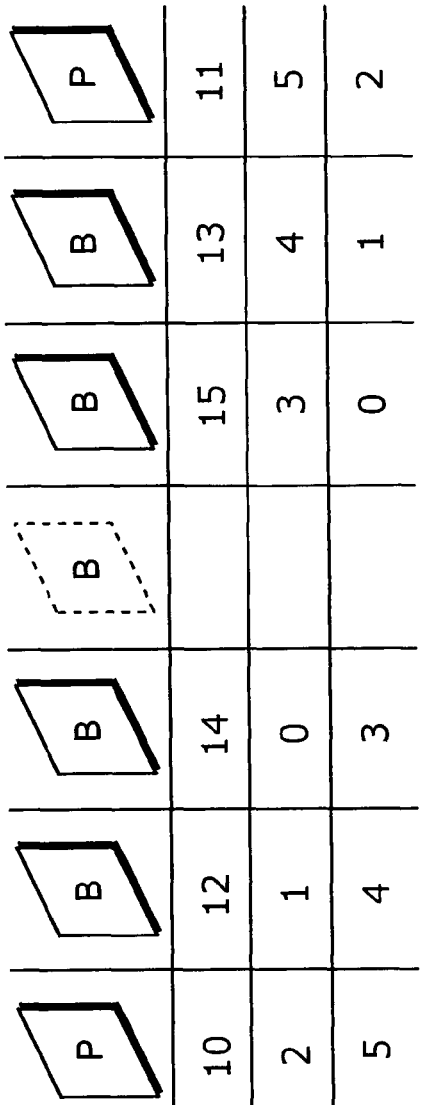
FIG. 2 is an explanatory chart showing an example of the assignment of picture numbers, as well as reference indices for each picture inputted.
Figure 2B:
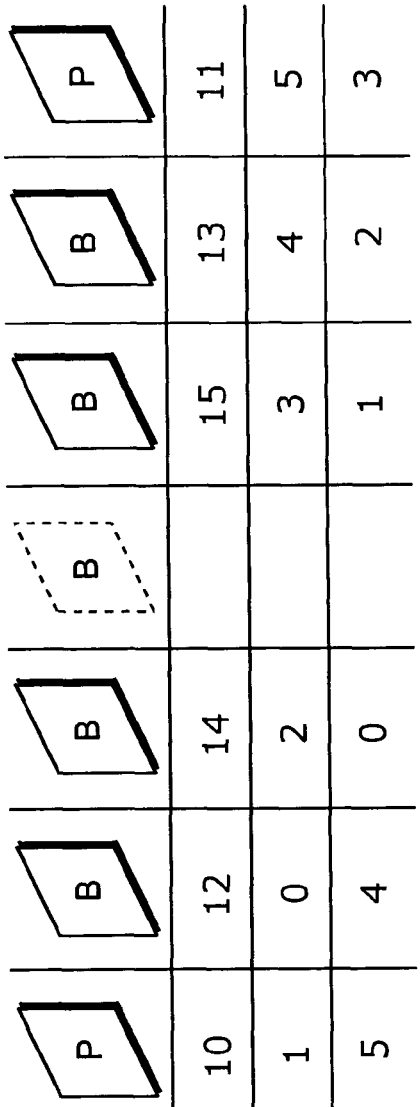
Figure 4A:
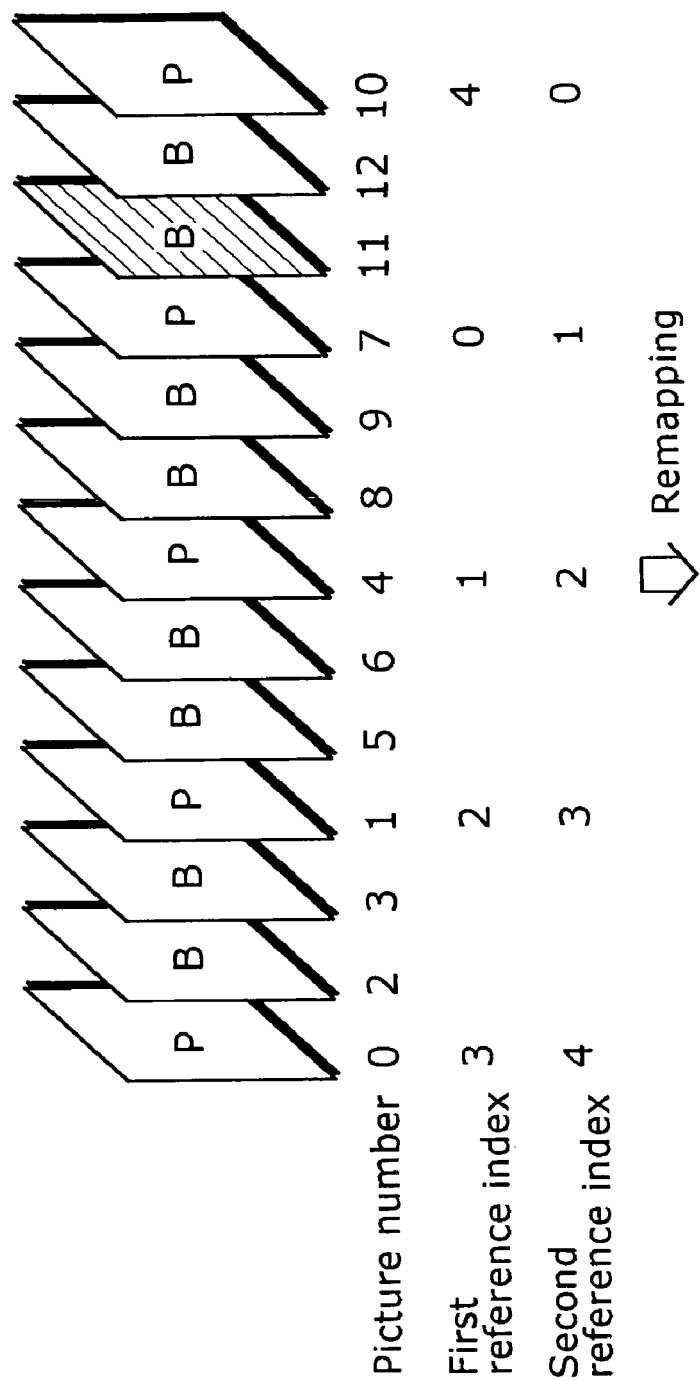
FIG. 4A is a diagram showing an example default setting of reference indices for a current picture to be coded B11, where a B-picture is coded with four preceding P-pictures and a single subsequent P-picture as reference pictures.
Figure 4B:
FIG. 4B is a diagram showing an example of the reference indices for the picture B11 in the case where a remapping has been performed on the reference indices shown in FIG. 4A.

In FIG. 2, picture numbers and reference indices are shown in the case where all pictures composing a moving picture are in the frame structure. However, using FIG. 21 and FIG. 22, the case where pictures making up a moving picture are of mixed frame and field structure shall be explained.

Figure 21:
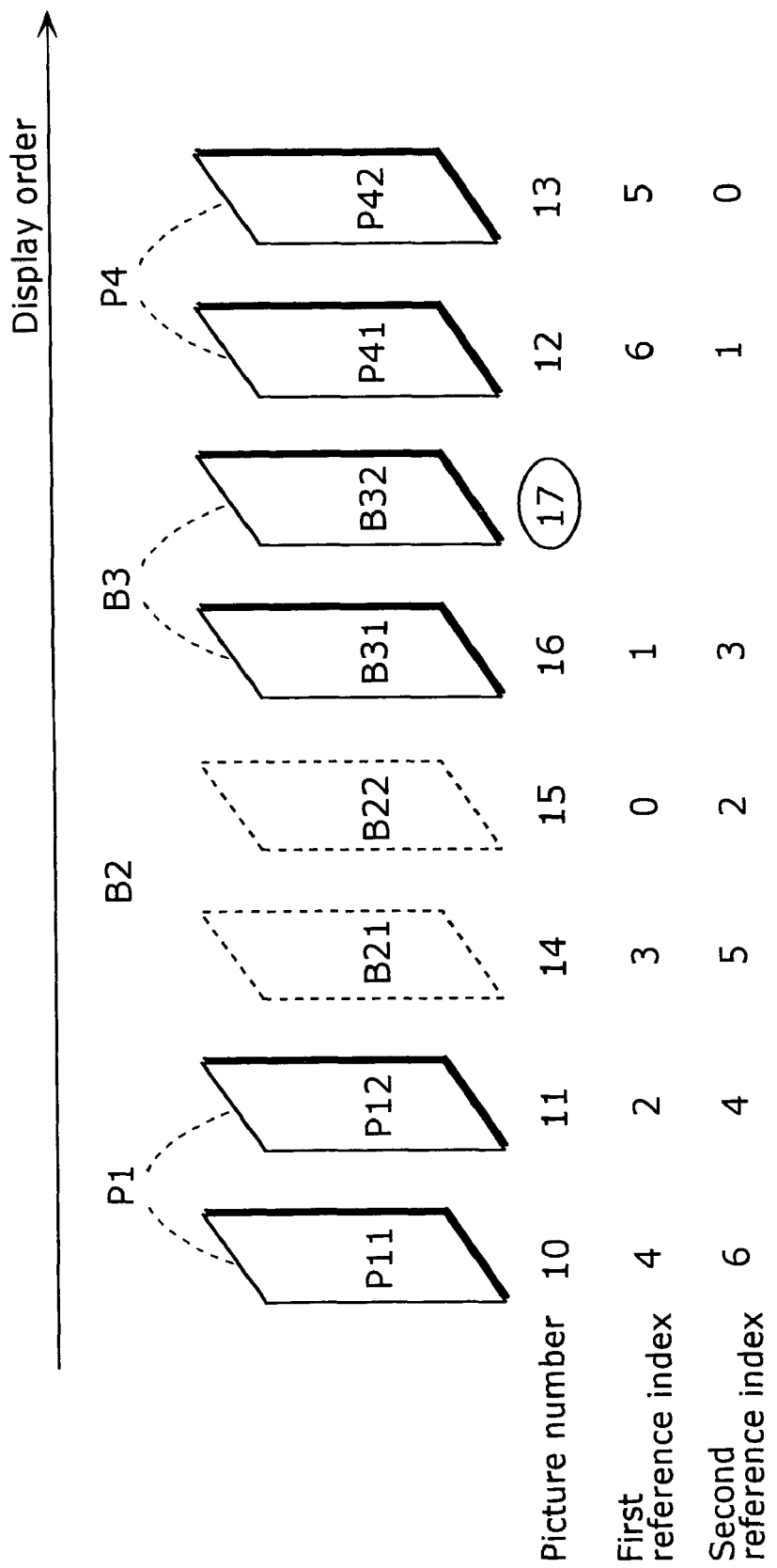
FIG. 21 is a diagram showing an example of the reference relationship between pictures in the case where the current picture to be coded or decoded is in the field structure.

FIG. 21 is a diagram showing an example of the reference relationship between pictures in the case where the current picture to be coded or decoded is in the field structure. Hereinafter, the field configured from the odd numbered lines of a frame shall be known as a "top field", and the field configured from the even numbered lines of a frame shall be known as a "bottom field". In addition, in the present embodiment, the case is explained where the top field is the field ahead, in the display order of pictures in the field structure, and the bottom field is the field behind, in the display order of pictures in the field structure. However, even if these sequences are switched, the same effect may be attained through the same operation as that in the present invention. In the case where the current picture to be coded or decoded is in the field structure, all the reference pictures shall be handled in the field structure. FIG. 21 shows the case where a field B32 is the current picture to be coded or decoded in the case where a picture B3 is coded or decoded in the field structure, and the case where a picture P1, B3, and P4 are coded or decoded in the field structure and a picture B2 is coded or decoded in the frame structure, wherein the reference picture B2 in the frame structure, is treated as two fields, B21 and B22. In addition, picture numbers are assigned in the order of coding or decoding. In the default setting, the first reference index is assigned to a picture in the following order of priority: the picture ahead of the current picture to be coded or decoded in display order, the picture close to the current picture to be coded or decoded in coding or decoding order, the picture with the same parity as the current picture to be coded or decoded. Using FIG. 21 to explain specifically, first, the value "0" is assigned as the reference index to the field B22, being a field ahead of the field B32 in display order, having the same parity, and being the closest to the field B32 in coding or decoding order. Next, the value "1" is assigned as the reference index to the field B31, being a field ahead of the field B32 in display order, having different parity but being the closest to the field B32 in coding or decoding order.

Figure 22:
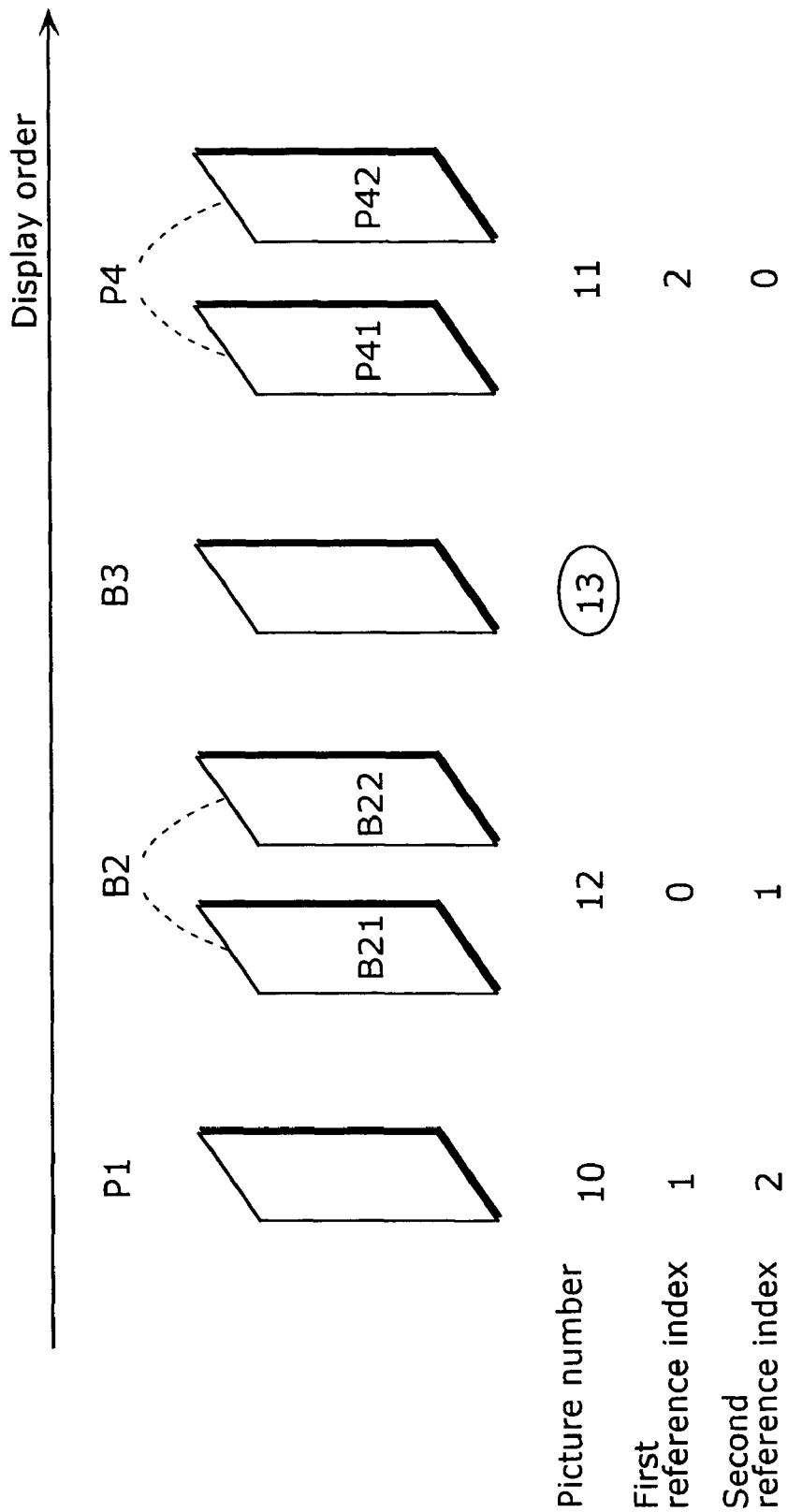
FIG. 22 is a diagram showing an example of the reference relationship between pictures in the case where the current picture to be coded or decoded is a frame.

Here, parity is a value indicating the first (top) field and second (bottom) field. In a bit stream of a moving picture, parity information may be coded or decoded, for example, on a per-slice basis FIG. 22 is a diagram showing an example of the reference relationship between pictures in the case where the current picture to be coded or decoded is a frame. In the case where the current picture to be coded or decoded is a frame, all reference pictures shall be treated as frames. As in FIG. 22, in the case of coding or decoding for the pictures B2 and P4 in the field structure, and the pictures P1 and B3 in the frame structure, the fields B21, B22, P41, P42 coded or decoded in the field structure shall be treated as the two reference frames, B2 and P4. Moreover, the assignment of picture numbers and reference indices shall be as explained in FIG. 2A and FIG. 2B.

Figure 23:
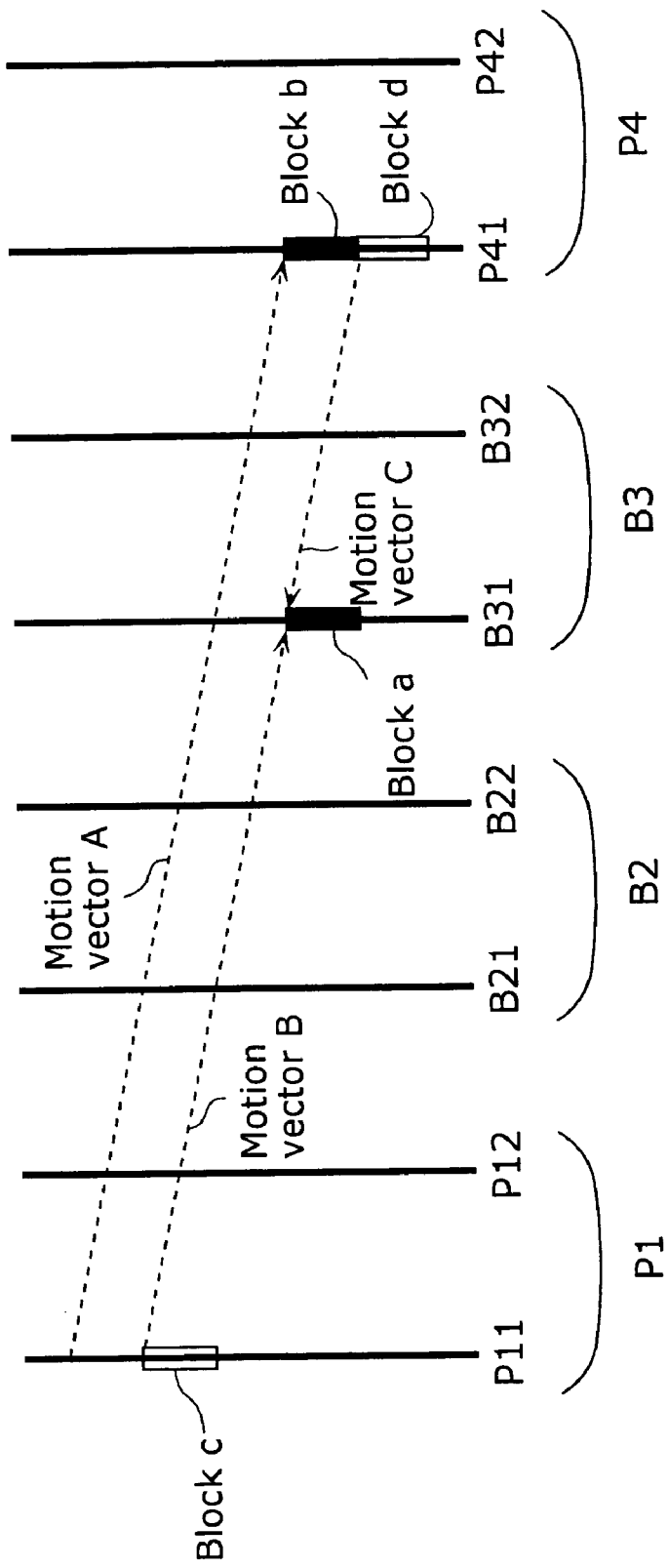
FIG. 23 is a diagram showing the temporal sequence of respective frames during the coding or decoding of a moving picture.

FIG. 23 is a diagram showing the temporal sequence of respective frames during the coding or decoding of a moving picture. In FIG. 23, the frames P1 and P4 are processed as P-pictures, and the frames B2 and B3 are processed as B-pictures. In addition, a single frame may be treated as 2 fields. For example, the frame P1 may be treated as the fields P11 and P12, the frame B2 as the fields B21 and B22, the frame B3 as the fields B31 and B32, and the frame P4 as the fields P41 and P42. Furthermore, it is assumed that each frame is coded or decoded adaptively, in either the frame structure or field structure.

Hereinafter, the fifth embodiment shall be explained specifically. The point of difference between the fifth embodiment and the previously mentioned first to fourth embodiments is the storage of motion vectors for each parity, as a method for reducing the storage size of motion vectors that must be stored for direct mode.

In FIG. 23, coding or decoding is performed in the units assigned by the symbols on the upper-row, among the symbols indicating pictures. For example, in FIG. 23, all pictures are processed on a per-field basis. First, direct mode in the case where pictures composing a moving picture are treated in the field mode shall be explained using FIG. 23.

It is assumed that the current picture to be processed is the field B31. In other words, the frame B3 is processed in the field structure. Moreover, the field B31 shall use as reference pictures, the field P11, the field P12, the field P41, or the field P42. Coding or decoding for these reference pictures is already completed. Furthermore, it is assumed that the frame P1 and the frame P4 are processed on a per-field basis.

Now, the case where a block "a" in the field B31 is processed in direct mode shall be considered. In this case, the motion vectors of the block "b", being the block co-located with the block "a", inside the field P41, being the reference picture with the second reference index as "0" (here, it is assumed that the reference index is assigned by default), is used. Hereinafter, these motion vectors shall be called "reference motion vectors".

Here, as in FIG. 23, the case where the block "b" is processed using the motion vector "A", where this motion vector "A" refers to the field P11, shall be explained. In this case, using the motion vectors obtained by a specified method of calculation from the reference motion vector "A", motion compensation is performed for the block "a", on the preceding reference field, the field P11 (the field pointed out by the reference motion vector "A"), and the subsequent reference field, the field P41 (the field where the block "b" belongs). In this case, the motion vectors to be used in the processing of the block "a" are assumed to be the motion vector "B" for the field P11, and the motion vector "C" for the field P41. In this instance, assuming the size of the motion vector "A" to be MV1, the size of the motion vector "B" to be MVf1, and the size of the motion vector "C" to be MVb1, MVf1 and MVb1 can be obtained through the Equation 3 and Equation 4, respectively.

$$MVf1 = N1 \times MV1/D1 \quad \text{(Equation 3)}$$

$$MVb1 = -M1 \times MV1/D1 \quad \text{(Equation 4)}$$

Hereinafter, the values of N1, M1, and D1 shall be known as scaling coefficients. It is assumed that scaling coefficients are values set on a per-field basis. For example, in this case, the scaling coefficients can be set based on the temporal distances between each field. For example, by setting the temporal distance from the field P11 to the field P41 as D1, the temporal distance from the field P11 to the field B31 as N1, and the temporal distance from the field B31 to the field P41 as M1, MVf1 and MVb1 shall be motion vectors parallel to MV. Here, as a method of determining the values of scaling coefficients, a method exists that generates values on both the coding-side and decoding side according to the same rule (i.e., generating from time information (time stamp)). Another method exists where during coding, the value is set and described as related information within a bit stream or as the attached information of a bit stream, and then, during decoding, the scaling coefficients are obtained from the bit stream or the attached information of the bit stream. Then, Equations 3 and 4 may be used to calculate MVf1 and MVb1, in the decoding of the blocks coded in direct mode.

Now, the operation of the motion vector storage unit 116 shall be explained. The number of motion vectors to be stored in the motion vector storage unit 116 is designated by the coding control unit 110. Moreover, here, the motion vectors of one top field and the motion vectors of one bottom field are be stored at a time.

In this case, for determining the motion vectors to be stored, there is a method that stores the motion vectors of the reference picture coded or decoded immediately before the current picture in the coding or decoding order, among reference pictures. Here, the motion vectors already stored in the motion vector storage unit 116 may be overwritten, in sequence, each time a coding mode is determined.

Figure 24A:
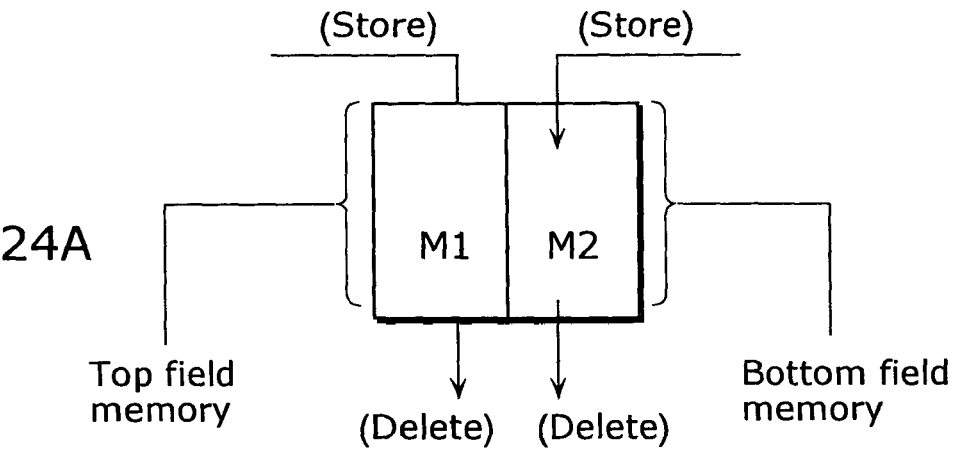
FIG. 24A is a schematic diagram for explaining the operation of a memory, in the case where the memory address for storing motion vectors is for storing motion vectors of one picture at a time.

Specifically, as shown in FIG. 24A, the motion vector storage unit 116 is controlled in the same manner as a first-in, first-out (FIFO) memory, where the newest pictures shall be stored at all times. Memory contents having the oldest storage times are cancelled in sequence, as new items are stored. In addition, in FIG. 24A, the case where only the motion vectors used in the coding or decoding of an I-picture or P-picture are stored, is shown. This is because the case where only I-pictures or P-pictures being referred to by B-pictures processed using direct mode is presupposed. In cases like where a B-picture refers to another B-picture, the motion vectors used during the coding or decoding of the B-picture used as a reference picture, may also be stored.

In coding or decoding for the field B31, the motion vectors during the coding or decoding of the field P41 are stored in the memory address M1, and it is possible to derive the motion vector "B", and the motion vector "C" using the motion vector "A" stored in the memory address M1. In addition, the motion vectors during the coding or decoding of the field P42 are stored in the memory address M2.

Figure 24B:
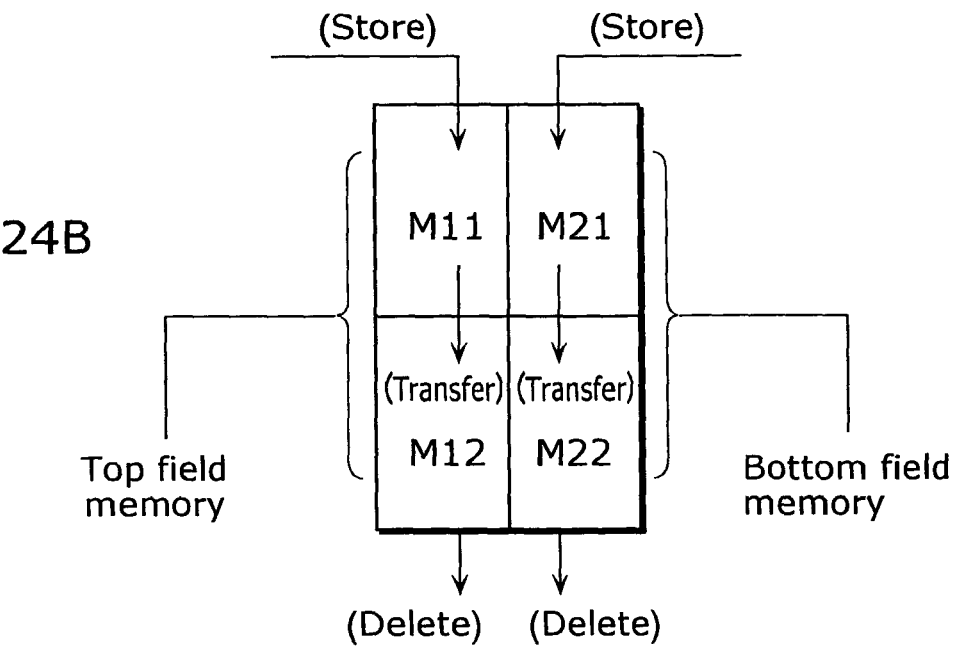
FIG. 24B is a schematic diagram for explaining the operation of a memory, in the case where the motion vectors of a top field and motion vectors of a bottom field are stored, two fields at a time.

As another example for the motion vector storage unit 116, as shown in FIG. 24B, the motion vectors of two top fields and the motion vectors of two bottom fields may also be stored at a time. In this case, the motion vector storage unit 116 is controlled in the same manner as a first-in, first-out (FIFO) memory, and the motion vectors stored in the memory address M11 is transferred to the memory address M12 if motion vectors shall be stored anew. The motion vectors stored in the memory address M12 shall be deleted. It is the same for the memory addresses M21 and M22.

Moreover, in the case where storage areas storing motion vectors for a plurality of pictures on a per-parity basis exist, especially with regard to areas for unnecessary pictures, it is also possible to specifically release such areas for use. In addition, the physical layout of the memory to be used need not be on a sequential layout. The usage of memory area may be determined based on a FIFO-type operation.

Furthermore, in the explanation for FIG. 24A and FIG. 24B, the case where the current pictures to be coded or decoded, are all fields is described. However, in the case where the current picture to be coded or decoded is a frame, the motion vectors used during motion compensation for such current picture to be coded or decoded may be stored in the memory address M1 and memory address M2, in FIG. 24A. Likewise, in FIG. 24B, they may be stored in the memory addresses M11 and M21. In the case where the current picture to be coded or decoded is a field and the reference picture is a frame, the reference picture shall be treated as a field. Furthermore, in direct mode, the motion vectors of the reference field with the reference index as "0" is used. However in this case, if the reference field with the reference index as "0" was originally processed in the frame structure, the two fields included in such frame shall be considered as having the same motion vectors as those in the frame structure. As such, by storing the motion vectors processed in the frame structure in both the memory addresses M1 and M2, it is possible to obtain the motion vectors needed for use in direct mode without concern as to whether the reference picture was processed in the field structure or frame structure.

On the other hand, in the case where a picture, the same as the frame being the reference picture, is not treated as being in either the top field or bottom field, in other words, for example, in the case where the motion vectors used during the motion compensation of the frame being the reference picture, when such frame is the current frame to be coded or decoded, are stored in the memory address for the top field, there is a possibility of mistaking the motion vector to be referred to due to the reassignment of reference indices (since changing reference indices (remapping) is possible). Moreover, in this way, even in the case where a picture, the same as the frame being the reference picture, is not treated as being in either the top field or bottom field, if the memory address for storing motion vectors is for one picture, as shown in FIG. 24A, the problem of mistaking the motion vector to be referred to should not arise often even if reference indices are re-assigned.

In this manner, by controlling so that motion vectors are stored on a field parity basis, the motion vectors necessary for direct mode shall not be overwritten, even in the case where a picture is processed in the field structure.

In addition, it is possible to adaptively combine the present invention explained in the aforementioned first and second embodiments with the controlling for the storage of motion vectors on a field parity basis. Furthermore, by controlling in such a way that motion vectors are stored on a field parity basis, the number of motion vectors to be stored is limited, and a reduction in memory size is made possible. Also, even in the case where a picture is processed in the field structure, there is no overwriting of the motion vectors necessary for direct mode. And, the motion vectors used during the coding or decoding of the two fields (top field and bottom field) belonging to the same frame, may be stored as one pair. Whether fields belong to the same frame or not may be determined from information showing, for example, the continuity of picture numbers and parity. Alternatively, it can be determined from information showing the continuity of the frame P1, the frame B2, the frame B3, and the frame P4. Furthermore, although the case where switching from coding or decoding in either the frame structure or field structure, done on a per-picture basis, is explained in the present embodiment, switching from coding or decoding in either the frame structure or field structure may also be done on a per-block basis within a picture. In this case, the motion vectors of a block processed in the frame structure are stored in both the top field motion vector memory and the bottom field motion vector memory, and the motion vectors for blocks in the field structure may be stored in the motion vector memory for the applicable parity.

Sixth Embodiment

In addition, by recording a program for realizing the layout of the moving picture coding method or the moving picture decoding method as shown in each of the above-mentioned embodiments, on a storage medium such as a flexible disk, it becomes possible to perform the processing as shown in each of the above embodiments easily in an independent computer system.

Figure 25A:
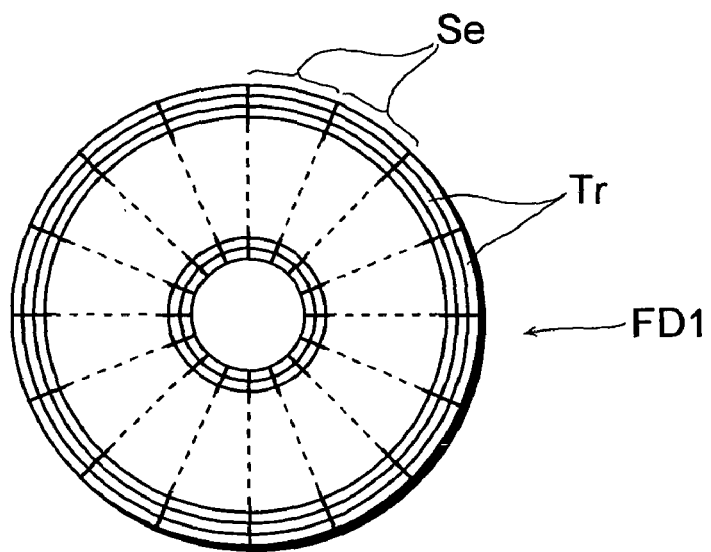
FIG. 25A shows an example of a physical format of the flexible disk, as a recording medium itself.
Figure 25B:
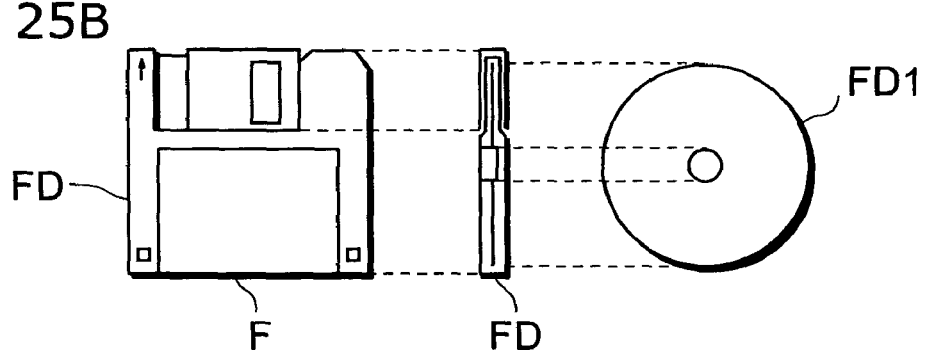
FIG. 25B shows the front view of a flexible disk, a schematic cross-section, as well as a flexible disk.
Figure 25C:
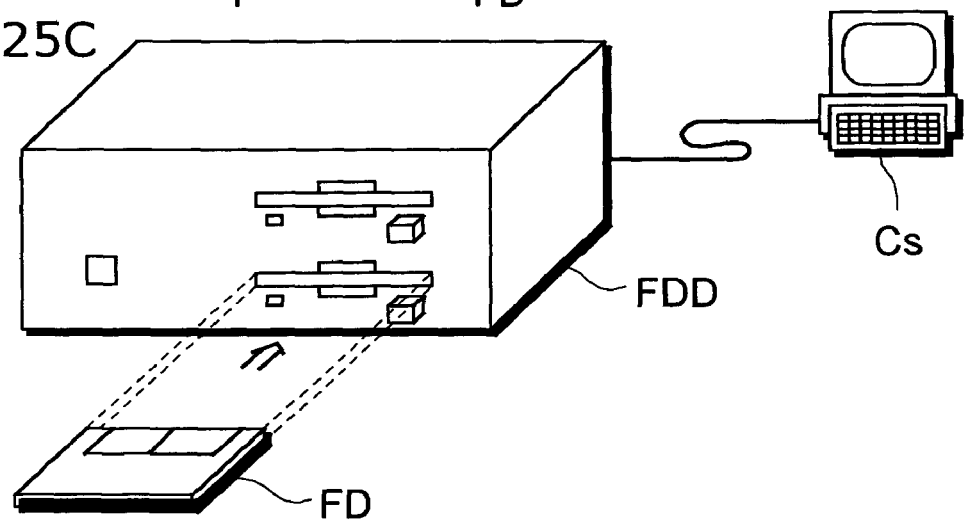
FIG. 25C shows the configuration for recording and reproducing the program on and from the flexible disk FD.

FIG. 25A to 25C are explanatory illustrations of a storage medium for the storage of a program for realizing the moving picture coding method and the moving picture decoding method in the first embodiment to fifth embodiments by a computer system.

FIG. 25B shows the front view of a flexible disk and the schematic cross-section, as well as a flexible disk, and FIG. 25A shows an example of a physical format of the flexible disk as a recording medium itself. The flexible disk FD is contained in a case F, a plurality of tracks Tr are formed concentrically on the surface of the said disk in the radius direction from the periphery, and each track is divided into 16 sectors Se in the angular direction. Therefore, in the flexible disk storing the above-mentioned program, the moving picture coding method and the moving picture decoding method as the above program are recorded in an area allocated for it on the above flexible disk FD.

In addition, FIG. 25C shows the configuration for recording and reproducing the program on and from the flexible disk FD. For recording the program on the flexible disk FD, the computer system Cs writes the moving picture coding method and the moving picture decoding method as the program on the flexible disk FD via a flexible disk drive FDD. For constructing the above moving picture coding method and the moving picture decoding method in the computer system by the program recorded on the flexible disk, the program is read out from the flexible disk via the flexible disk drive and transferred to the computer system.

Note that the above explanation is made on the assumption that a recording medium is a flexible disk, but the same processing can also be performed using an optical disk. In addition, the recording medium is not limited to these, but any other mediums such as a CD-ROM, memory card, and a ROM cassette can be used in the same manner if a program can be recorded on them.

Seventh Embodiment

Further, the applications of the moving picture coding method and the moving picture decoding method as shown in the above embodiments and a system using them shall be explained here.

Figure 26:
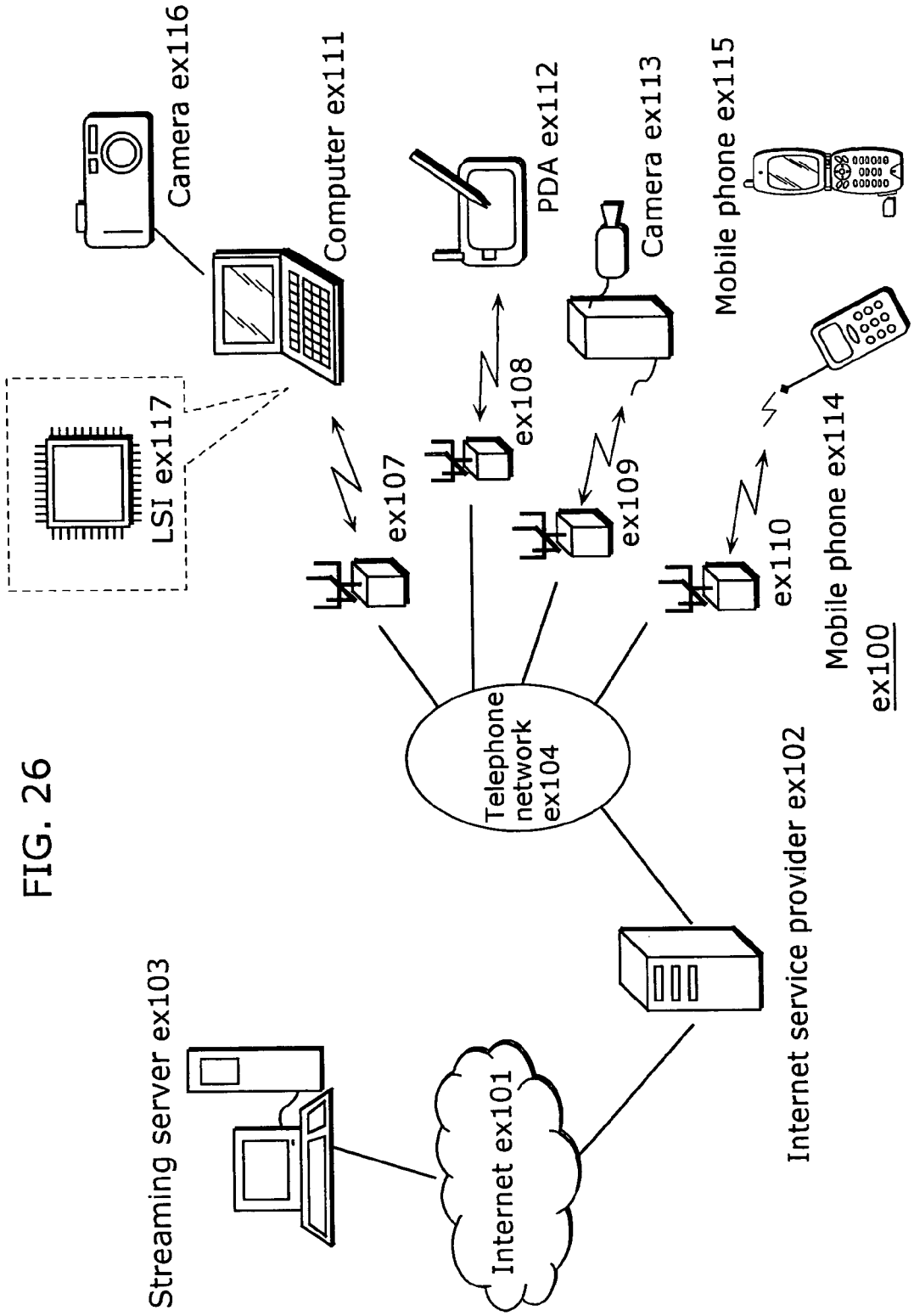
FIG. 26 is a block diagram showing the overall configuration of a content providing system ex100 for realizing content distribution service.

FIG. 26 is a diagram showing the overall configuration of a content providing system ex100 for realizing content distribution service. The area for providing communication service is divided into cells of desired size, and base stations ex107 to ex110 which are fixed wireless stations are placed in respective cells.

In this content providing system ex100, various devices such as a computer ex111, a personal digital assistant (PDA) ex112, a camera ex113, a mobile phone ex114 and a camera-equipped mobile phone ex115 are connected to the Internet ex101, via an Internet service provider ex102, a telephone network ex104 and base stations ex107 to ex110, for example.

However, the content providing system ex100 is not limited to the combination as shown in FIG. 26, and may be connected to a combination of any of them. Also, each device may be connected directly to the telephone network ex104, not through the base stations ex107 to ex110 which are the fixed wireless stations.

The camera ex113 is a device such as a digital video camera capable of shooting moving pictures. The mobile phone may be any of a mobile phone of a Personal Digital Communications (PDC) system, a Code Division Multiple Access (CDMA) system, a Wideband-Code Division Multiple Access (W-CDMA) system or a Global System for Mobile Communications (GSM) system, a Personal Handyphone System (PHS) and the like.

Also, a streaming server ex103 is connected to the camera ex113 via the base station ex109 and the telephone network ex104, which enables live distribution or the like using the camera ex113 based on the coded data transmitted from the user. The coding of the data shot by the camera may be performed by the camera ex113, the server for transmitting the data, or the like. Also, the moving picture data shot by a camera ex116 may be transmitted to the streaming server ex103 via the computer ex111. The camera ex116 is a device such as a digital camera capable of shooting still and moving pictures. In this case, either the camera ex116 or the computer ex111 may code the moving picture data. An LSI ex117 included in the computer ex111 or the camera ex116 performs coding processing. Note that software for coding and decoding moving pictures may be integrated into any type of a storage medium (such as a CD-ROM, a flexible disk and a hard disk) that is a recording medium which can be read by the computer ex111 or the like. Furthermore, the camera-equipped mobile phone ex115 may transmit the moving picture data. This moving picture data is the data coded by the LSI included in the mobile phone ex115.

In this content providing system ex100, contents (such as a video of a live music performance) shot by users using the camera ex113, the camera ex116 or the like are coded in the same manner as in the above embodiments and transmitted to the streaming server ex103, while the streaming server ex103 makes stream distribution of the above content data to the clients at their request. The clients include the computer ex111, the PDA ex112, the camera ex113, the mobile phone ex114, and so on, capable of decoding the above-mentioned coded data. The content providing system ex100 is a system in which the clients can thus receive and reproduce the coded data, and further can receive, decode and reproduce the data in real time so as to realize personal broadcasting.

When each device in this system performs coding or decoding, the moving picture coding apparatus or the moving picture decoding apparatus as shown in each of the above-mentioned embodiments may be used.

A mobile phone will be explained as an example thereof.

Figure 27:
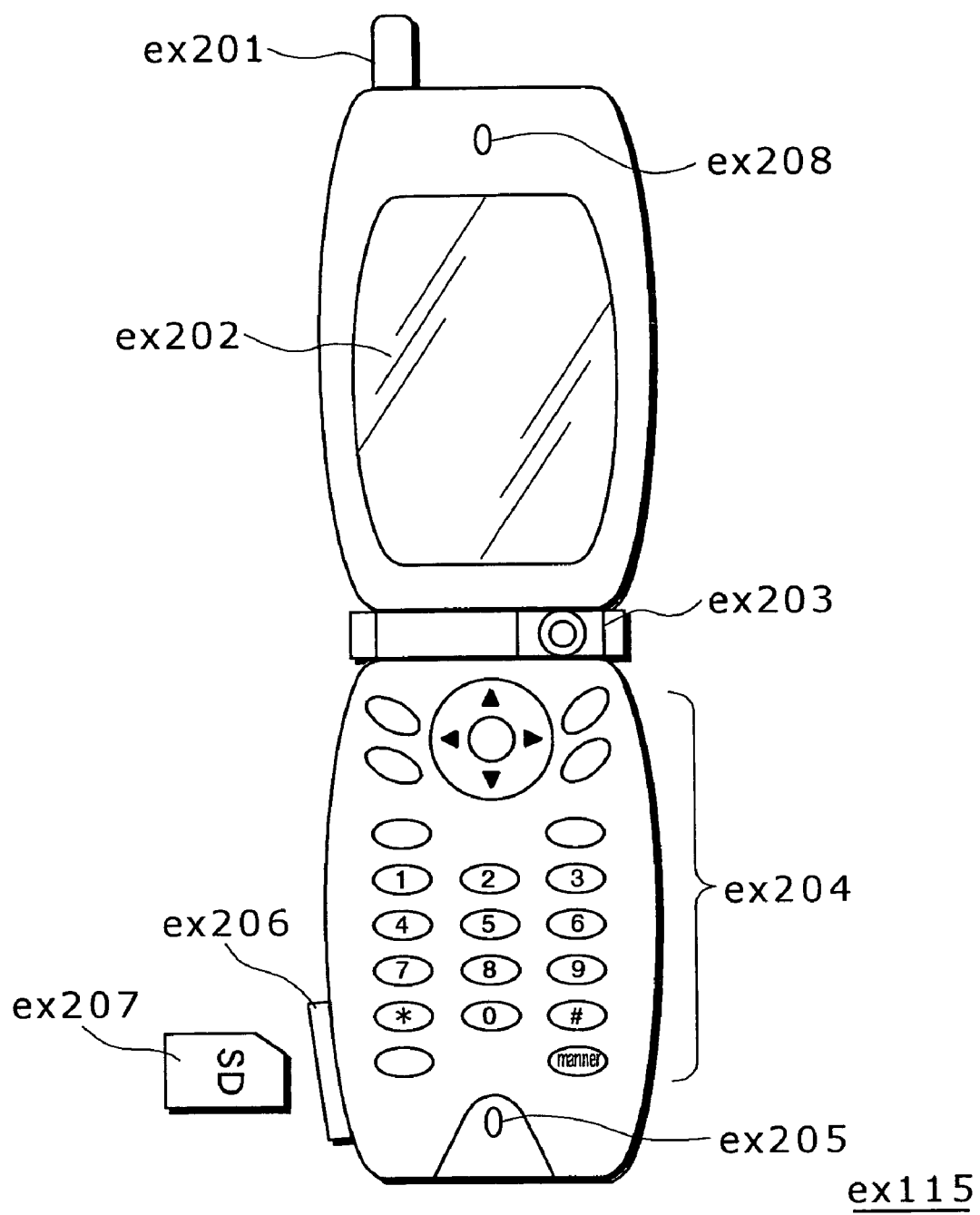
FIG. 27 is a diagram showing a mobile phone ex115 which uses the moving picture coding method and the moving picture decoding method as explained in the embodiments.

FIG. 27 is a diagram showing a mobile phone ex115 which uses the moving picture coding method and the moving picture decoding method as explained in the above embodiments. The mobile phone ex115 has an antenna ex201 for sending and receiving radio waves between the base station ex110, a camera unit ex203 such as a CCD camera capable of shooting video and still pictures, a display unit ex202 such as a liquid crystal display for displaying the data obtained by decoding video shot by the camera unit ex203, video received by the antenna ex201, or the like, a main body including a set of operation keys ex204, a voice output unit ex208 such as a speaker for outputting voices, a voice input unit ex205 such as a microphone for inputting voices, a storage medium ex207 for storing coded or decoded data, such as data of moving or still pictures shot by the camera, and data of text, moving pictures or still pictures of received e-mails, and a slot unit ex206 for attaching the storage medium ex207 into the mobile phone ex115. The storage medium ex207 includes a flash memory element, a kind of Electrically Erasable and Programmable Read Only Memory (EEPROM) that is an electrically rewritable and erasable nonvolatile memory, in a plastic case such as an SD card.

Further, the mobile phone ex115 will be explained with reference to FIG. 28. In the mobile phone ex115, a power supply circuit unit ex310, an operation input control unit ex304, a picture coding unit ex312, a camera interface unit ex303, an Liquid Crystal Display (LCD) control unit ex302, a picture decoding unit ex309, a multiplex/demultiplex unit ex308, a record/reproduce unit ex307, a modem circuit unit ex306 and a voice processing unit ex305, are connected to a main control unit ex311, and to each other, via a synchronous bus ex313. The main control unit ex311 is for the overall controlling of each unit of the main body including the display unit ex202 and the operation keys ex204.

When a call-end key or a power key is turned ON by a user's operation, the power supply circuit unit ex310 supplies respective units with power from a battery pack so as to activate the camera-equipped digital mobile phone ex115 to a ready state.

In the mobile phone ex115, under the control of the main control unit ex311 including a CPU, ROM, RAM and the like, the voice processing unit ex305 converts the voice signals received by the voice input unit ex205 in conversation mode into digital voice data, the modem circuit unit ex306 performs spread spectrum processing of the digital voice data, and the send/receive circuit unit ex301 performs digital-to-analog conversion and frequency transformation of the data, so as to transmit the result via the antenna ex201. Also, in the mobile phone ex115, the data received by the antenna ex201 in conversation mode is amplified and performed of frequency transformation and analog-to-digital conversion, the modem circuit unit ex306 performs inverse spread spectrum processing of the data, and the voice processing unit ex305 converts it into analog voice data, so as to output the result via the voice output unit ex208.

Furthermore, when transmitting an e-mail in data communication mode, the text data of the e-mail inputted by operating the operation keys ex204 on the main body is sent out to the main control unit ex311 via the operation input control unit ex304. In the main control unit ex311, after the modem circuit unit ex306 performs spread spectrum processing of the text data and the send/receive circuit unit ex301 performs digital-to-analog conversion and frequency transformation of it, the result is transmitted to the base station ex110 via the antenna ex201.

When picture data is transmitted in data communication mode, the picture data shot by the camera unit ex203 is provided to the picture coding unit ex312 via the camera interface unit ex303. When the picture data is not transmitted, the picture data shot by the camera unit ex203 can also be displayed directly on the display unit 202 via the camera interface unit ex303 and the LCD control unit ex302.

The picture coding unit ex312, including the picture coding apparatus explained in the present invention, compresses and codes the picture data provided from the camera unit ex203 by the coding method used for the picture coding apparatus as shown in the above-mentioned embodiments so as to transform it into coded picture data, and sends it out to the multiplex/demultiplex unit ex308. At this time, the mobile phone ex115 sends out the voices received by the voice input unit ex205 during picture pickup by the camera unit ex203, to the multiplex/demultiplex unit ex308 as digital voice data via the voice processing unit ex305.

The multiplex/demultiplex unit ex308 multiplexes the coded picture data provided from the picture coding unit ex312 and the voice data provided from the voice processing unit ex305 by a predetermined method, and the modem circuit unit ex306 then performs spread spectrum processing of the resulting multiplexed data, and the send/receive circuit unit ex301 performs digital-to-analog conversion and frequency transformation on the result, for transmitting via the antenna ex201.

As for receiving data of a moving picture file which is linked to a Website or the like in data communication mode, the modem circuit unit ex306 performs inverse spread spectrum processing of the data received from the base station ex110 via the antenna ex201, and sends out the resulting multiplexed data to the multiplex/demultiplex unit ex308.

In order to decode the multiplexed data received via the antenna ex201, the multiplex/demultiplex unit ex308 demultiplexes the multiplexed data into a coded bit stream of picture data and a coded bit stream of voice data, and provides the coded picture data to the picture decoding unit ex309 and the voice data to the voice processing unit ex305 respectively, via the synchronous bus ex313.

Next, the picture decoding unit ex309, including the picture decoding apparatus explained in the present invention, decodes the coded bit stream of the picture data by the decoding method paired with the coding method as shown in the above-mentioned embodiments, so as to generate reproduced moving picture data, and provides this data to the display unit ex202 via the LCD control unit ex302, and thus moving picture data included in a moving picture file linked to a Website, for instance, is displayed. At the same time, the voice processing unit ex305 converts the voice data into analog voice data, and provides this data to the voice output unit ex208, and thus voice data included in a moving picture file linked to a Website, for instance, is reproduced.

Figure 29:
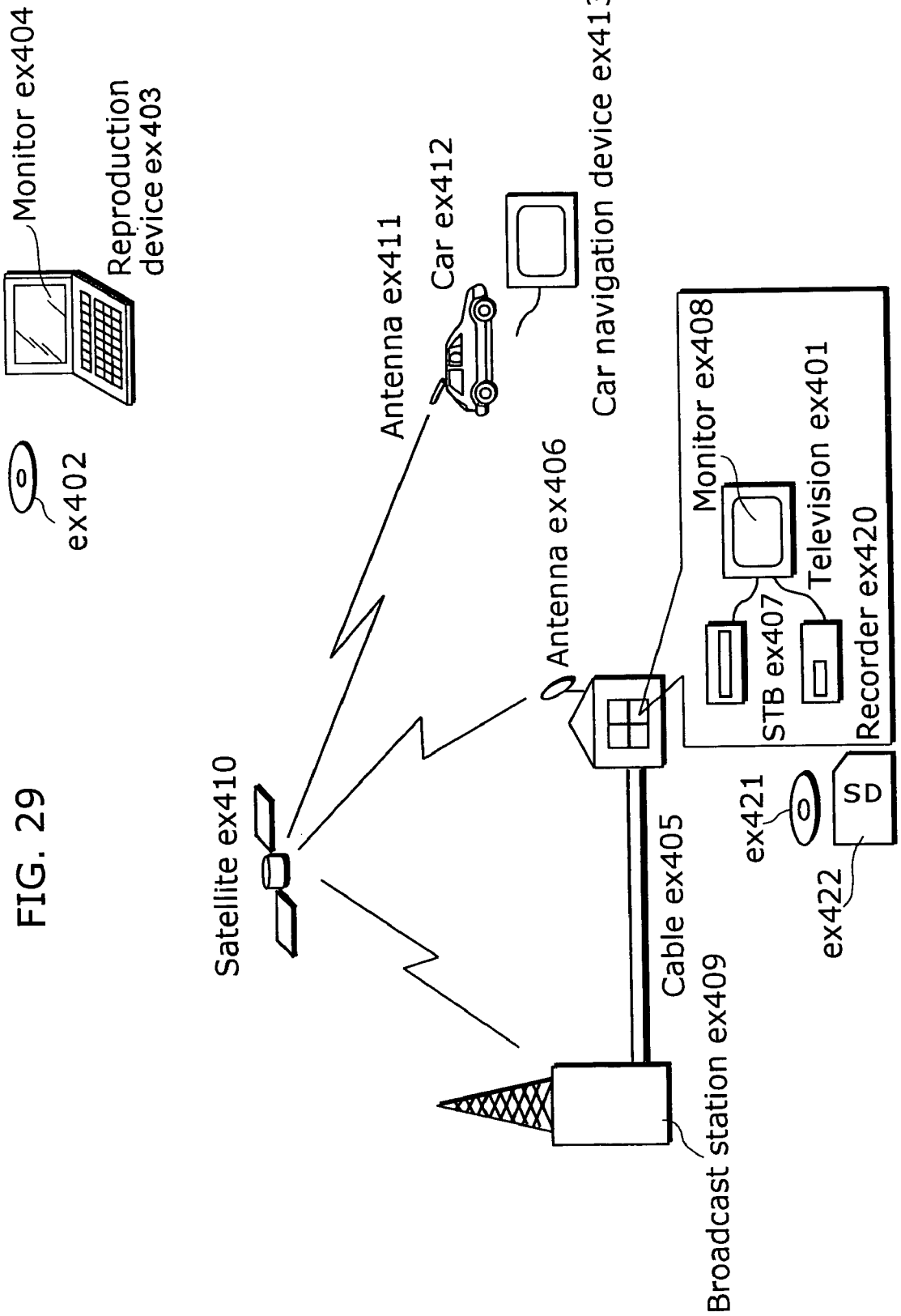
FIG. 29 is an illustration showing an example of a digital broadcasting system.

The present invention is not limited to the above-mentioned system. Satellite or ground-based digital broadcasting has been in the news lately, and at least either the picture coding apparatus or the picture decoding apparatus in the above-mentioned embodiments can be incorporated into such a digital broadcasting system as shown in FIG. 29. More specifically, a coded bit stream of video information is transmitted from a broadcast station ex409 to a communication or broadcast satellite ex410 via radio waves. Upon receipt of it, the broadcast satellite ex410 transmits radio waves for broadcasting, a home antenna ex406 with a satellite broadcast reception function receives the radio waves, and an apparatus such as a television (receiver) ex401 or a set top box ex407 decodes the coded bit stream for reproduction. The picture decoding apparatus as shown in the above-mentioned embodiments can be implemented in a reproduction device ex403 for reading and decoding a coded bit stream recorded on a storage medium ex402 such as a CD and DVD that is a recording medium. In this case, the reproduced video signals are displayed on a monitor ex404. It is also conceived to implement the moving picture decoding apparatus in the set top box ex407 connected to a cable ex405 for cable television or the antenna ex406 for satellite and/or ground-based broadcasting so as to reproduce them on a monitor ex408 of the television. The moving picture decoding apparatus may be incorporated into the television, not in the set top box. Or, a car ex412 having an antenna ex411 which can receive signals from the satellite ex410, the base station ex107 or the like, for reproducing moving pictures on a display apparatus such as a car navigation device ex413 or the like in the car ex412.

Furthermore, the picture coding apparatus as shown in the above-mentioned embodiments can code picture signals for recording them on a recording medium. As a concrete example, there is a recorder ex420 such as a DVD recorder for recording picture signals on a DVD disk ex421 and a disk recorder for recording them on a hard disk. They can also be recorded on an SD card ex422. If the recorder ex420 includes the moving picture decoding apparatus as shown in the above-mentioned embodiments, the picture signals recorded on the DVD disk ex421 or the SD card ex422 can be reproduced for display on the monitor ex408.

Figure 28:
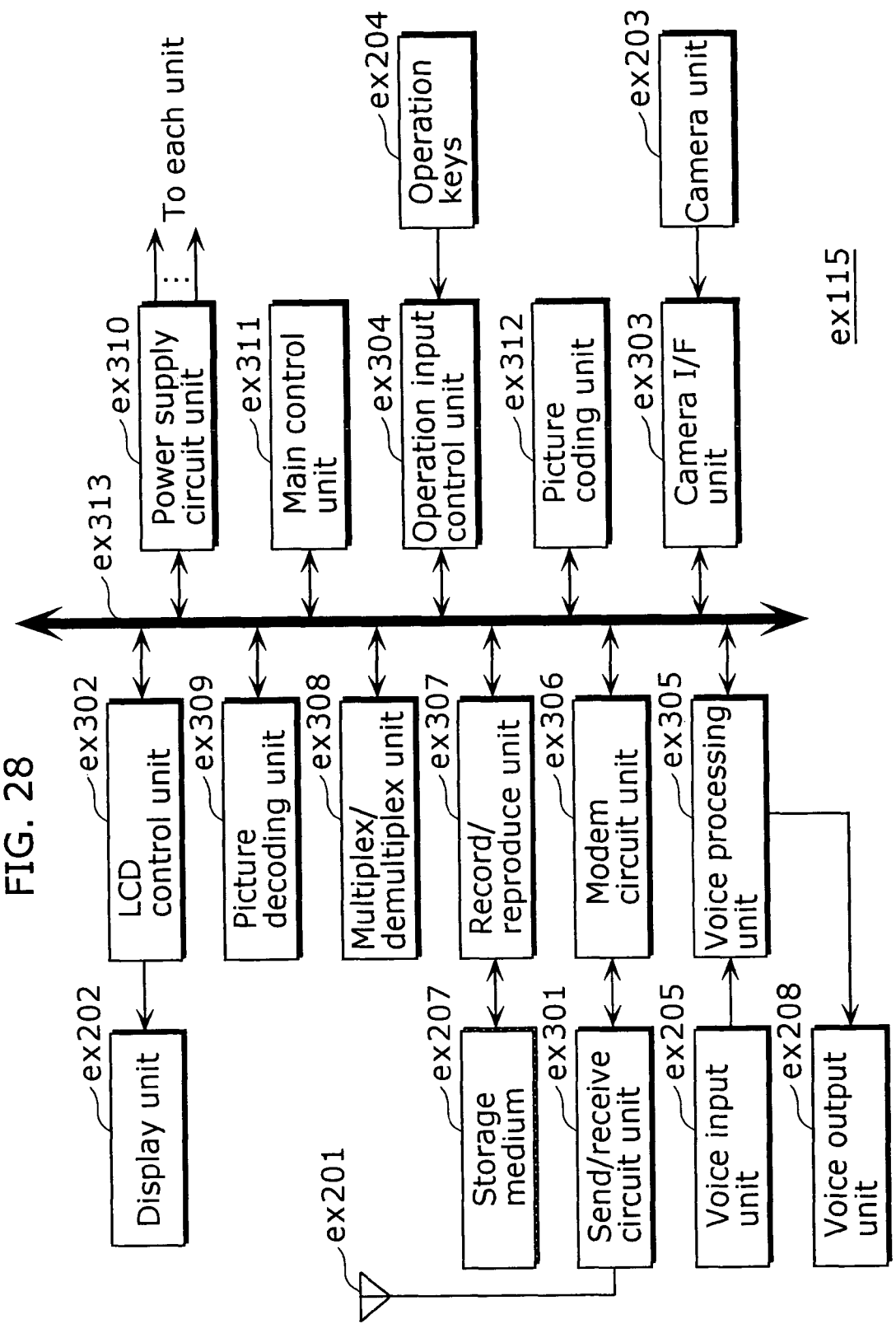
FIG. 28 is a block diagram showing the configuration of a mobile phone.

Note that as the configuration of the car navigation device ex413, the configuration without the camera unit ex203, the camera interface unit ex303 and the picture coding unit ex312, out of the units as shown in FIG. 28, is conceivable. The same applies to the computer ex111, the television (receiver) ex401 and others.

Moreover, three types of implementations can be conceived for a terminal such as the above-mentioned mobile phone ex114; a sending/receiving terminal equipped with both an encoder and a decoder, a sending terminal equipped with an encoder only, and a receiving terminal equipped with a decoder only.

As described above, it is possible to use the moving picture coding method or the moving picture decoding method as shown in the above embodiments in any of above-mentioned devices and systems, and thus the effects explained in the above embodiments can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The moving picture coding apparatus according to the present invention is useful as a moving picture coding apparatus included in a personal computer, a PDA, a broadcast station for digital broadcasts, a mobile phone, and the like, with a communication function.

In addition, the moving picture decoding apparatus according to the present invention is useful as a moving picture decoding apparatus included in a personal computer, a PDA, an STB that receives digital broadcasts, a mobile phone, and the like, with a communication function.

The invention claimed is:

1. A moving picture coding method executed by a moving picture coding apparatus, for coding a moving picture with motion compensation using a motion vector, the moving picture coding apparatus including a storage area for storing at least one motion vector used in motion compensation of a current picture to be coded, the moving picture being a sequence of pictures, each of the pictures being made up of a plurality of blocks, the method comprising:

a step of generating limitation information indicating a limitation on an amount of motion vector data to be stored in the storage area in the case where the at least one motion vector used in the motion compensation of the current picture to be coded is stored, in the storage area, for use when a picture to be coded after the current picture to be coded is coded in direct mode;

a step of coding the generated limitation information;

a step of judging whether the current picture to be coded is a top field or a bottom field, in the case where the current picture to be coded is one of the fields of an interlaced picture, the fields being composed of the top field and the bottom field; and a step of
(i) storing, into a top field storage area, the at least one motion vector used in motion compensation of the current picture to be coded, the top field storage area having a storage amount that is limited according to the limitation information, in the case where the current picture to be coded is judged to be the top field, and
(ii) storing, into a bottom field storage area, the at least one motion vector used in motion compensation of the current picture to be coded, the bottom field storage area having a storage amount that is limited according to the limitation information, in the case where the current picture to be coded is judged to be the bottom field, wherein the top field storage area and the bottom field storage area are included in the storage area.

2. The moving picture coding method according to claim 1, wherein the motion vector to be stored into the top field storage area and the motion vector to be stored into the bottom field storage area are the motion vectors used in coding of the top field and the bottom field belonging to one frame.

3. The moving picture coding method according to claim 1, further comprising a step of storing the motion vectors used in motion compensation of the current picture to be coded, into the top field storage area and the bottom field storage area, in the case where the current picture to be coded is coded in a frame structure.

4. The moving picture coding method according to claim 1, wherein in the step of coding the limitation information, the limitation information is coded as header information within a bit stream of the moving picture.

5. The moving picture coding method according to claim 4, wherein the header information is one of the following: header information contained in a header of the entire bit stream; header information contained in a header of each picture; and header information contained in a header of each slice.

6. The moving picture coding method according to claim 1, wherein in the step of coding the limitation information, the limitation information is coded as management information which is different information from a bit stream of a moving picture.

7. The moving picture coding method according to claim 1, further comprising a step of storing the at least one motion vector into a storage area based on the limitation information.

8. The moving picture coding method according to claim 1, wherein the limitation information is information indicating the number of pictures or the number of macroblocks.

9. The moving picture coding method according to claim 1, wherein the limitation information is information indicating the number of preceding pictures whose one or more motion vectors are to be stored into a storage area, the preceding pictures preceding a picture containing the current block to be coded, either in picture coding order or picture display order.

10. The moving picture coding method according to claim 1, further comprising a step of coding field information indicating whether the current picture to be coded is the top field or the bottom field.

11. A moving picture decoding method executed by a moving picture decoding apparatus, for decoding a moving picture with motion compensation using a motion vector, the moving picture decoding apparatus including a storage area for storing a motion vector used in motion compensation of a current picture to be decoded, the moving picture being a sequence of pictures, each of the pictures being made up of a plurality of blocks, the method comprising:

a step of extracting, from a bit stream, limitation information indicating a limitation on an amount of motion vector data to be stored in the storage area in the case where the at least one motion vector used in the motion compensation of the current picture to be decoded is stored, in the storage area, for use when a picture to be decoded after the current picture to be decoded is decoded in direct mode;

a step of judging whether the current picture to be decoded is a top field or a bottom field, in the case where the current picture to be decoded is one of the fields of an interlaced picture, the fields being composed of the top field and the bottom field; and a step of
(i) storing, into a top field storage area, the at least one motion vector used in motion compensation of the current picture to be decoded, the top field storage area having a storage amount that is limited according to the limitation information, in the case where the current picture to be decoded is judged to be the top field, and
(ii) storing, into a bottom field storage area, the at least one motion vector used in motion compensation of the current picture to be decoded, the bottom field storage area having a storage amount that is limited according to the limitation information, in the case where the current picture to be decoded is judged to be the bottom field, wherein the top field storage area and the bottom field storage area are included in the storage area.

12. The moving picture decoding method according to claim 11,
wherein the motion vector to be stored into the top field storage area and the motion vector to be stored into the bottom field storage area are the motion vectors used in decoding of the top field and the bottom field belonging to one frame.

13. The moving picture decoding method according to claim 11, further comprising a step of storing the motion vectors used in motion compensation of the current picture to be decoded, into the top field storage area and the bottom field storage area, in the case where the current picture to be decoded is coded in a frame structure.

14. The moving picture decoding method according to claim 11,
wherein the step of extracting further comprises extracting, from the bit stream, field information indicating whether the current picture to be decoded is the top field or the bottom field, and wherein in the step of storing the at least one motion vector, the at least one motion vector is stored into a storage area, based on the limitation information and the field information.

15. The moving picture decoding method according to claim 14,
wherein the limitation information is information indicating the number of pictures or the number of macroblocks.

16. The moving picture decoding method according to claim 14,
wherein the limitation information is information indicating the number of preceding pictures whose one or more motion vectors are to be stored into a storage area, the preceding pictures preceding a picture containing the current block to be decoded, either in picture decoding order or picture display order.

17. The moving picture decoding method according to claim 14,
wherein the limitation information is included in header information of the bit stream, the header information being one of the following: header information contained in a header of the entire bit stream; header information contained in a header of each picture; and header information contained in a header of each slice.

18. A moving picture coding method for coding a moving picture with motion compensation using a motion vector, the moving picture being a sequence of pictures, each of the pictures being made up of a plurality of blocks, the method comprising:

a step of generating limitation information indicating a limitation on a storage amount of at least one motion vector used in motion compensation of a current picture to be coded;

a step of coding the generated limitation information;

a step of judging whether the current picture to be coded is a top field or a bottom field, in the case where the current picture to be coded is one of the fields of an interlaced picture, the fields being composed of the top field and the bottom field; and a step of storing, into a top field storage area, the at least one motion vector used in motion compensation of the current picture to be coded and whose storage amount is limited according to the limitation information, in the case where the current picture to be coded is judged to be the top field, and storing, into a bottom field storage area, the at least one motion vector used in motion compensation of the current picture to be coded and whose storage amount is limited according to the limitation information, in the case where the current picture to be coded is judged to be the bottom field, the motion vector being stored for use when a picture to be coded after the current picture to be coded is coded in direct mode, wherein in the step of storing the at least one motion vector, motion vectors of a number of pictures which is less than the number of pictures that can be referred to by the current picture to be coded are stored into the top field storage and the bottom field storage area, based on the limitation information.

19. A moving picture decoding method for decoding a moving picture with motion compensation using a motion vector, the moving picture being a sequence of pictures, each of the pictures being made up of a plurality of blocks, the method comprising:

a step of extracting, from a bit stream, limitation information indicating a limitation on a storage amount of at least one motion vector used in motion compensation of a current picture to be decoded;

a step of judging whether the current picture to be decoded is a top field or a bottom field, in the case where the current picture to be decoded is one of the fields of an interlaced picture, the fields being composed of the top field and the bottom field; and a step of storing, into a top field storage area, the at least one motion vector used in motion compensation of the current picture to be decoded and whose storage amount is limited according to the limitation information, in the case where the current picture to be decoded is judged to be the top field, and storing, into a bottom field storage area, the at least one motion vector used in motion compensation of the current picture to be decoded and whose storage amount is limited according to the limitation information, in the case where the current picture to be decoded is judged to be the bottom field, the motion vector being stored for use when a picture to be decoded after the current picture to be decoded is decoded in direct mode, wherein in the step of storing the at least one motion vector, motion vectors of a number of pictures which is less than the number of pictures that can be referred to by the current picture to be decoded are stored into the top field storage and the bottom field storage area, based on the limitation information.

* * * * *